US012737663B2

(12) United States Patent
Aharonov et al.

(10) Patent No.: US 12,737,663 B2
(45) Date of Patent: Sep. 15, 2026

(54) METHODS AND SYSTEMS FOR MULTI-TYPE PROBABILISTIC QUANTUM ERROR MITIGATION

(71) Applicant: QEDMA Quantum Computing LTD., Tel-Aviv (IL)

(72) Inventors: Dorit Aharonov, Jerusalem (IL); Omri Golan, Rehovot (IL); Barak Katzir, Haifa (IL); Oded Kenneth, Tel-Aviv (IL); Yotam Yona Lifshitz, Shimshit (IL); Netanel Hanan Lindner, Aviel (IL); Ittai Rubinstein, Ramat Hasharon (IL); Gili Schul Ganz, Zur Hadassa (IL); Maor Shutman, Tel-Aviv (IL)

(73) Assignee: QEDMA Quantum Computing LTD., Tel-Aviv (IL)

( * ) Notice: Subject to any disclaimer, the term of this patent is extended or adjusted under 35 U.S.C. 154(b) by 179 days.

(21) Appl. No.: 18/752,007

(22) Filed: Jun. 24, 2024

(65) Prior Publication Data

US 2026/0094043 A1 Apr. 2, 2026

Related U.S. Application Data

(60) Provisional application No. 63/524,046, filed on Jun. 29, 2023.

(51) Int. Cl.
*G06N 10/70* (2022.01)

(52) U.S. Cl.
CPC .................................... *G06N 10/70* (2022.01)

(58) Field of Classification Search
None
See application file for complete search history.

(56) References Cited

U.S. PATENT DOCUMENTS 10,031,791 B1 7/2018 Wallman et al.
10,360,088 B2 7/2019 Wallman et al.
(Continued)

FOREIGN PATENT DOCUMENTS

CN 114492823 A 5/2022
CN 115310618 A 11/2022

OTHER PUBLICATIONS

Piveteau, et al., "Quasiprobability Decompositions With Reduced Sampling Overhead", NPJ Quantum Information, 8, Article 12, Nov. 10, 2021, [retrieved on Oct. 21, 2025], Retrieved from <https://arxiv.org/pdf/2101.09290> , pp. 1-9.
(Continued)

*Primary Examiner* — Mujtaba M Chaudry
(74) *Attorney, Agent, or Firm* — Ballard Spahr LLP

(57) ABSTRACT

A computer implemented method, for mitigating errors in a quantum circuit comprising at least one occurrence of a quantum logic operation G. The method includes computing a set of coefficients $\{c_p\}$, associated with a set of basis operations $\mathcal{B}=\{B_p\}$, to obtain a quasi-probability decomposition $G_0 \approx \Sigma_p c_p B_p$ on the set of basis operations $\mathcal{B}$. The quasi-probability decomposition is of a target version of the quantum logic operation G, denoted $G_0$. The set of basis operations $\{B_p\}$ forms a multi-type basis, constructed from the quantum logic operation G and elements of a set of mitigation operations $\mathcal{S}$. The decomposition is computed so as to reach a decomposition target, being based on at least one of a decomposition accuracy target, and a decomposition sampling overhead target. The method includes implementing the quasi-probability decomposition on the quantum processor.

19 Claims, 11 Drawing Sheets

(56) References Cited

U.S. PATENT DOCUMENTS

| | | | | |
|---|---|---|---|---|
| 11,308,252 | B1* | 4/2022 | Piveteau | G06F 30/39 |
| 12,271,783 | B2* | 4/2025 | Safavi-Naeini | G06N 10/20 |
| 12,443,868 | B2* | 10/2025 | Piveteau | G06F 17/11 |
| 2022/0092460 | A1* | 3/2022 | Piveteau | G06N 10/70 |
| 2022/0147857 | A1* | 5/2022 | Wang | G06N 10/70 |
| 2022/0156443 | A1* | 5/2022 | Chamberland | G06N 10/00 |
| 2022/0327410 | A1* | 10/2022 | Chamberland | G06F 11/1012 |
| 2022/0358182 | A1* | 11/2022 | Nation | G06F 11/00 |
| 2023/0196172 | A1 | 6/2023 | Paetznick et al. | |
| 2024/0152795 | A1* | 5/2024 | van den Berg | G06N 10/40 |

OTHER PUBLICATIONS

Golan. Reset-free Error Mitigation of Non-Clifford Gates. Oct. 25, 2022.

Jnane et al. Quantum Error Mitigated Classical Shadows. PRX Quantum [Online] vol. 5, No. 1, May 8, 2023.

Tran et al. Locality and Error Mitigation of Quantum Circuits. Mar. 11, 2023.

Endo, et al., “Practical Quantum Error Mitigation for Near-Future Applications”, Physical Review X, 8, 2018, pp. 031027-1-031027-21; DOI: 10.1103/PhysRevX.8.031027.

Temme et al. “Error Mitigation for Short-Depth Quantum Circuits” v3, Nov. 6, 2017, pp. 1-15, Source: https://arxiv.org/pdf/1612.02058v3.

* cited by examiner

100

Computing 110
Decomposition 120
$G_0 \approx \sum_p c_p B_p$
$G = G_0 e^{L_b}$
Target 130
$\varepsilon$
$W$
Implementing 140
$B_1$
$B_2$
$B_3$
127
Types selected ≥2
122
$G$
123
$GS_i$
$S_i \in \mathcal{S}_1$
124
$S_j G$
$S_j \in \mathcal{S}_2$
125
$S_k G S_l$
$S_k \in \mathcal{S}_3$
$S_l \in \mathcal{S}_4$
126
$S_m$
$S_m \in \mathcal{S}_5$
$\{B_p\}$
121

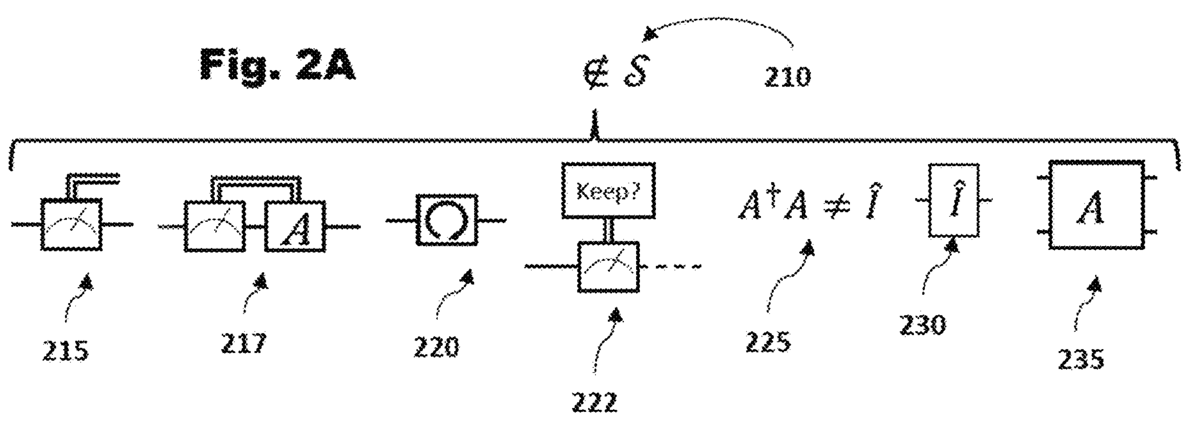

Fig. 2B

240 $\exists\ v \in \{1, \ldots, 5\}: dim\left(span(\mathcal{S}_v)\right) \approx 10^n$ 245 $\exists\ v \in \{1, \ldots, 5\}: dim\left(span(\mathcal{S}_v)\right) < |\mathcal{S}_v|$ 250 $\exists s \in \mathcal{S} | s = U^{r \times r} \otimes \hat{I}^{(n-r)\times(n-r)}$ 255 $$\left.\begin{array}{c} \forall s \in \mathcal{S} |\ s = U^{r \times r} \otimes \hat{I}^{(n-r)\times(n-r)} \\ \exists v \in \{1, \ldots, 5\} |\ |\mathcal{S}_v| = \binom{n}{r} 10^r \end{array}\right\} \wedge$$

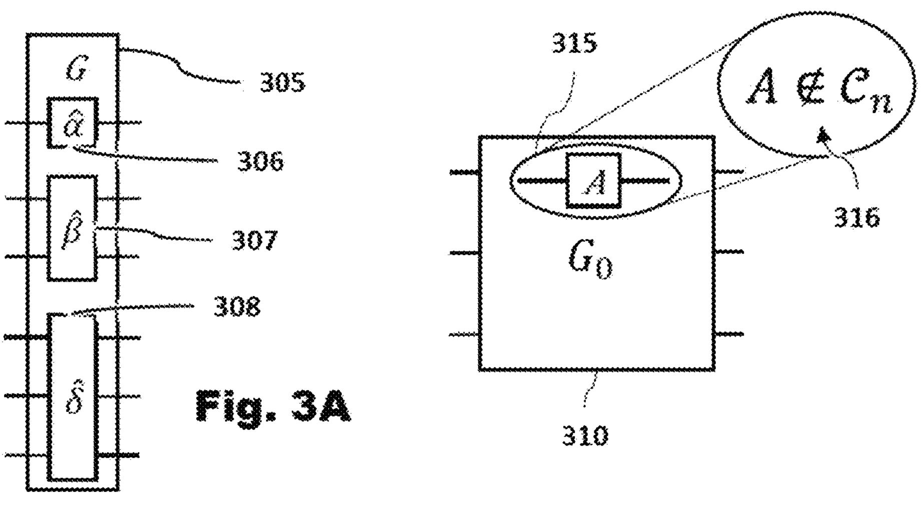

Fig. 3B

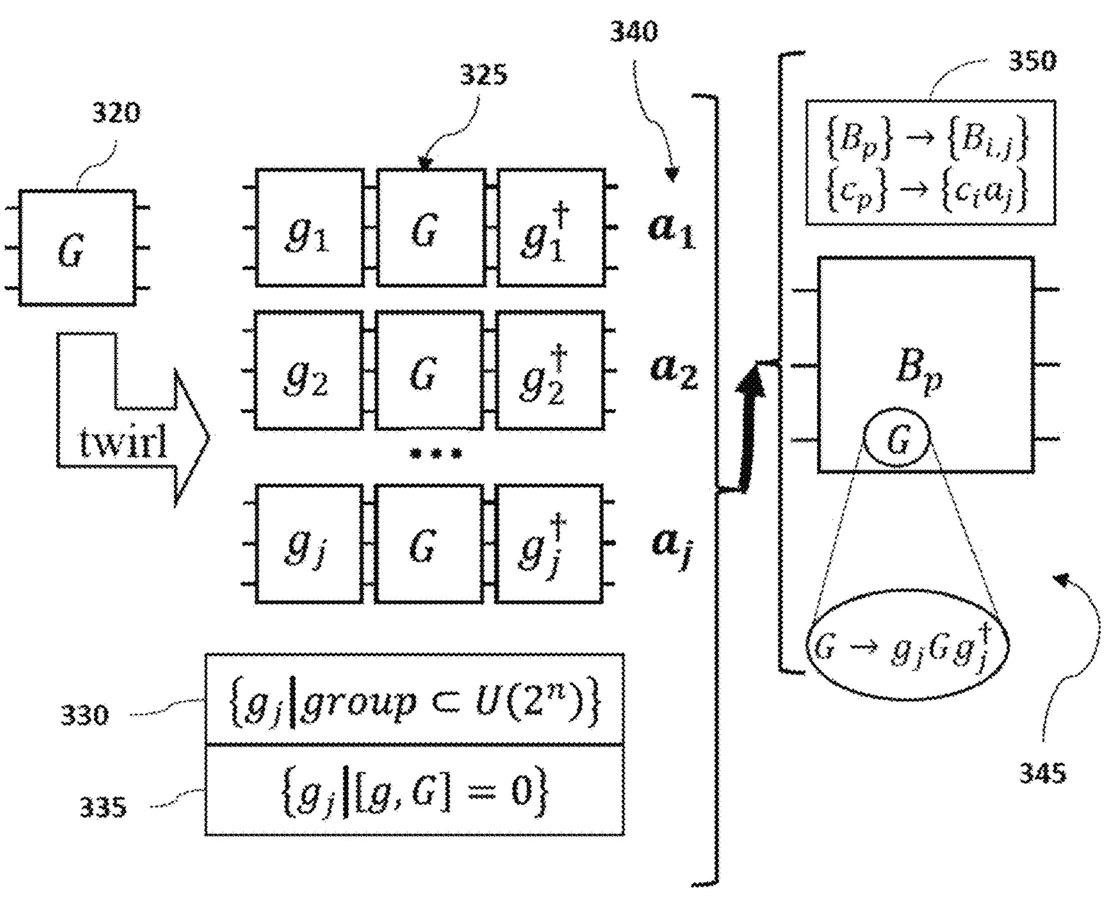
Fig. 3E
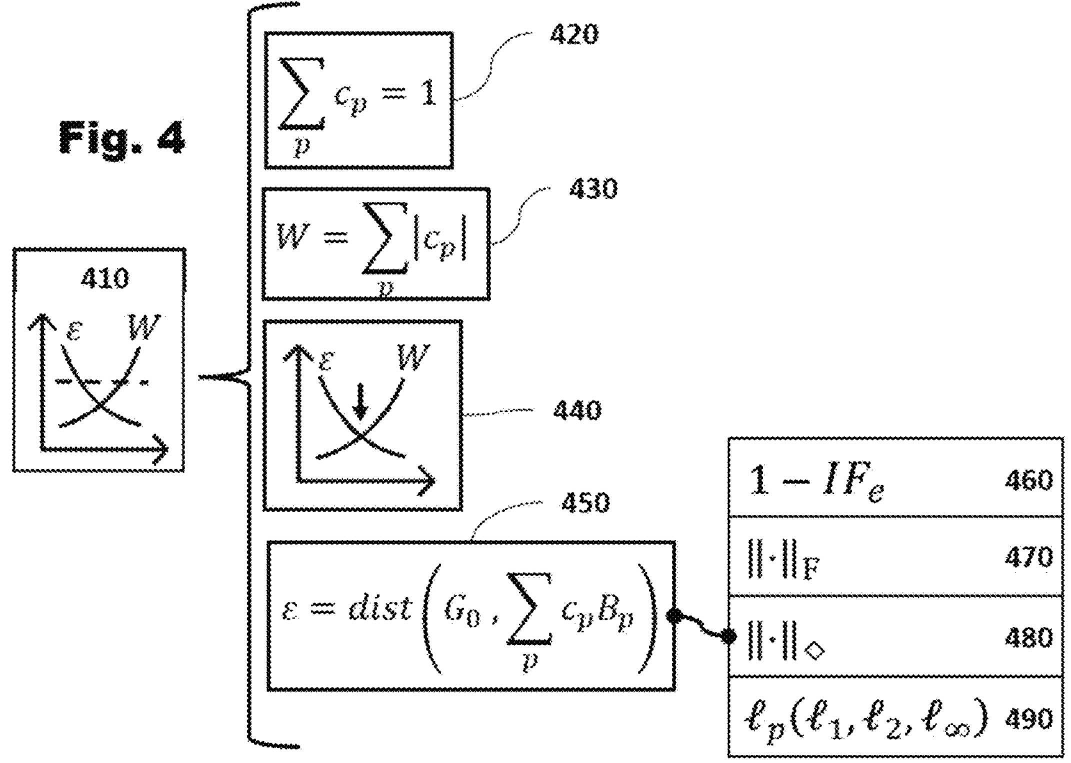

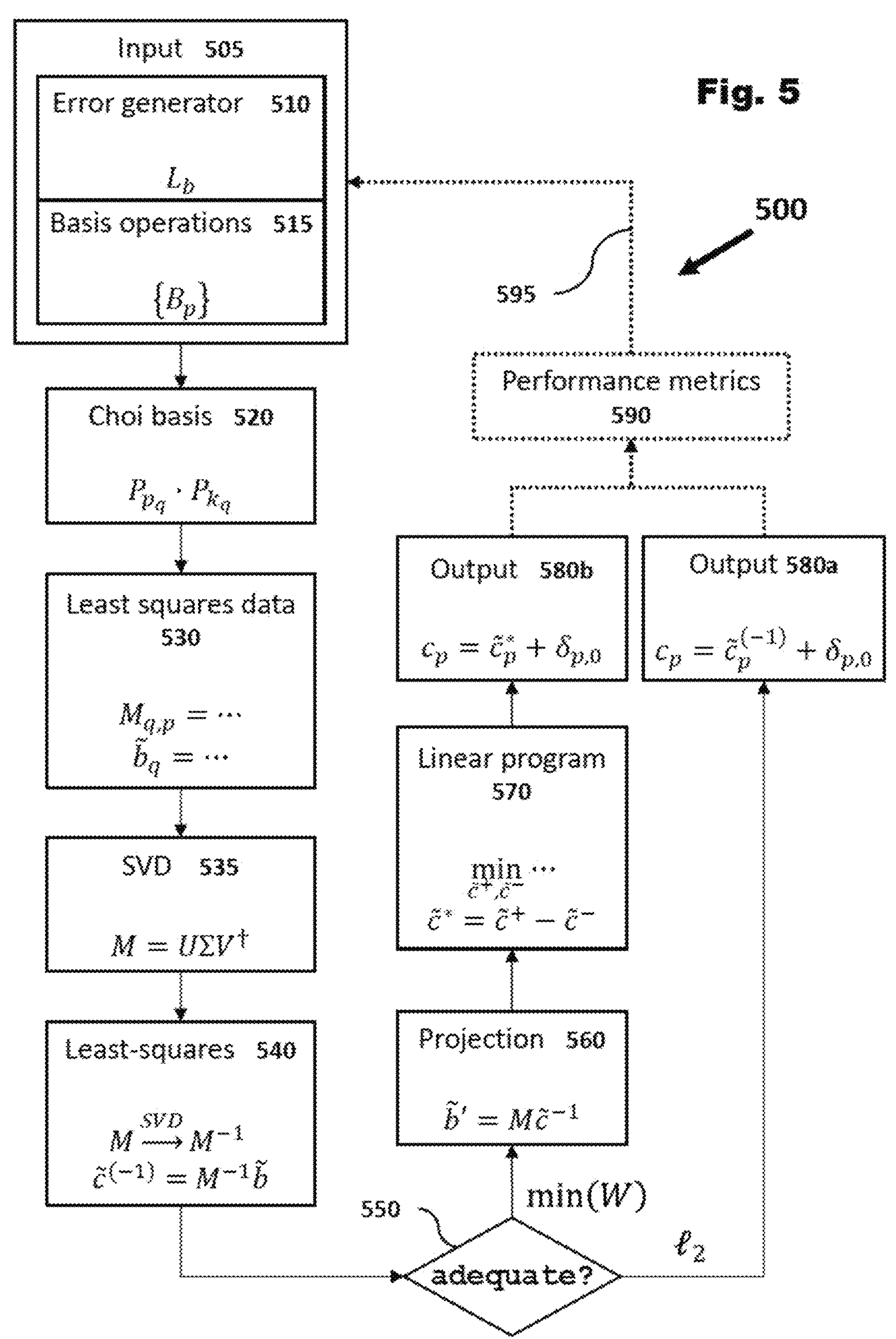

Input 505
Error generator 510
$L_b$
Basis operations 515
$\{B_p\}$
Fig. 5
500
595
Performance metrics 590
Choi basis 520
$P_{p_q} \cdot P_{k_q}$
Least squares data 530
$M_{q,p} = \cdots$
$\tilde{b}_q = \cdots$
SVD 535
$M = U\Sigma V^\dagger$
Least-squares 540
$M \xrightarrow{SVD} M^{-1}$
$\tilde{c}^{(-1)} = M^{-1}\tilde{b}$
Output 580b
$c_p = \tilde{c}_p^* + \delta_{p,0}$
Output 580a
$c_p = \tilde{c}_p^{(-1)} + \delta_{p,0}$
Linear program 570
$\min_{\tilde{c}^+,\tilde{c}^-} \cdots$
$\tilde{c}^* = \tilde{c}^+ - \tilde{c}^-$
Projection 560
$\tilde{b}' = M\tilde{c}^{-1}$
550
$\min(W)$
$\ell_2$
adequate?

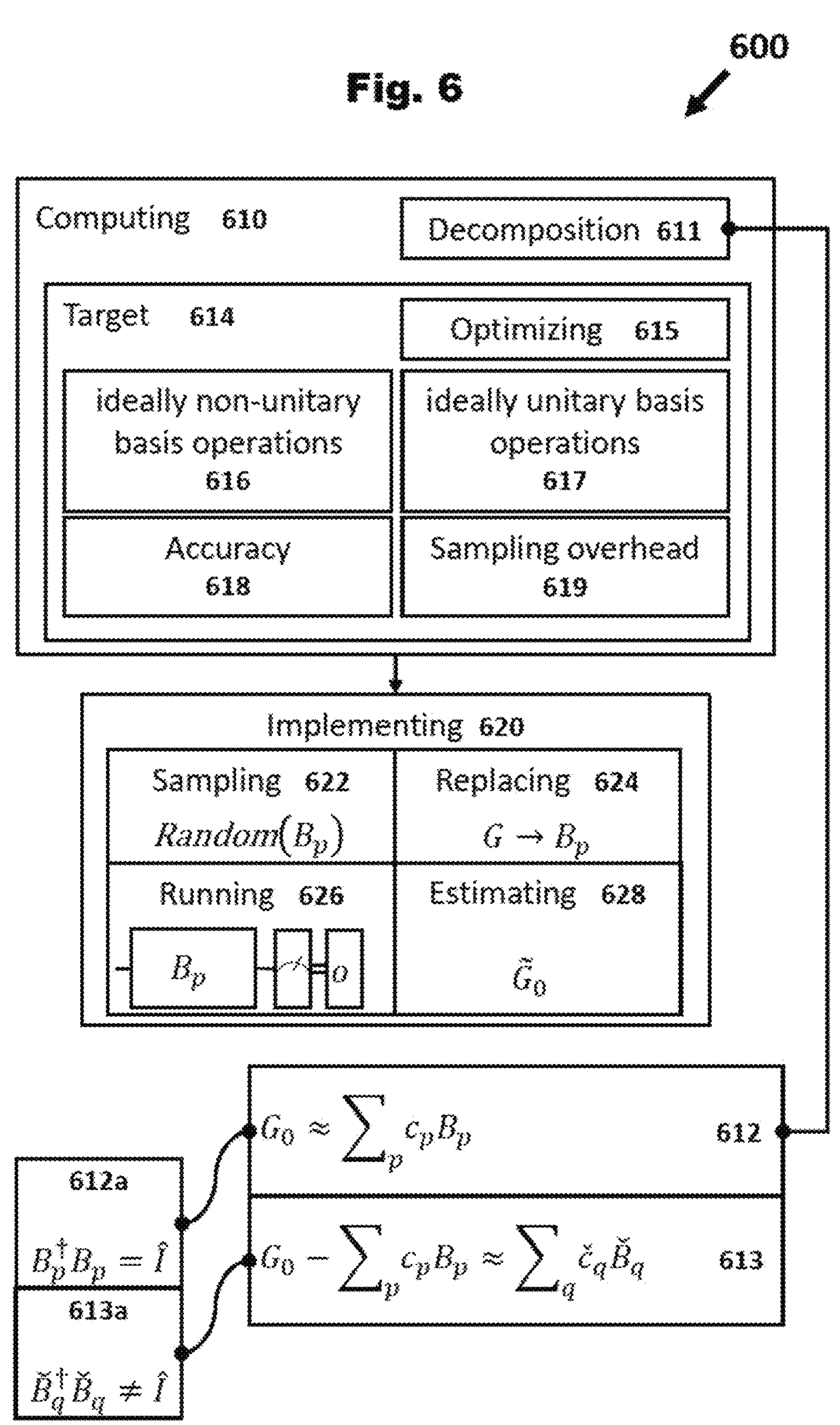

600
Fig. 6
Computing 610
Decomposition 611
Target 614
Optimizing 615
ideally non-unitary basis operations 616
ideally unitary basis operations 617
Accuracy 618
Sampling overhead 619
Implementing 620
Sampling 622
$Random(B_p)$
Replacing 624
$G \to B_p$
Running 626
$B_p$
$o$
Estimating 628
$\tilde{G}_0$
$G_0 \approx \sum_p c_p B_p$
612
612a
$B_p^\dagger B_p = \hat{I}$
$G_0 - \sum_p c_p B_p \approx \sum_q \check{c}_q \check{B}_q$
613
613a
$\check{B}_q^\dagger \check{B}_q \neq \hat{I}$

700

705
Cir
G
G
φ
ψ
α
β
γ
710
$\langle\langle E_i | \cdots G \cdots | \rho \rangle\rangle \Rightarrow e^{L_b}$
$\langle\langle E_i | \cdots \{B_p\} \cdots | \rho \rangle\rangle$
720
ε
W
i
740
$\{Cir_Q\}$
$B_{p,1}^{(Q)}$
$B_{p,2}^{(Q)}$
$\tilde{s}_Q = \prod_l \mathrm{sign}\left(c_l^{(Q)}\right)$
730
$w_p = \frac{|c_p|}{W}$
750
$Cir_Q$
$o_Q$
no
$N_s?$
yes
770
$N_c?$
yes
no
760
790
$Cir \approx W \cdot \langle \tilde{s}_Q o_Q \rangle_{N_s, N_c}$
780

METHODS AND SYSTEMS FOR MULTI-TYPE PROBABILISTIC QUANTUM ERROR MITIGATION

CROSS REFERENCE TO RELATED APPLICATIONS

This application claims priority to U.S. Provisional Patent Application No. 63/524,046 filed Jun. 29, 2023, entitled "Methods and Systems for Multi-Type Probabilistic Quantum Error Mitigation," which is incorporated herein by reference in its entirety.

TECHNOLOGICAL FIELD

The present disclosure relates to the field of quantum computing, specifically to the field of quantum error mitigation.

BACKGROUND

Quantum computers are expected to dramatically extend the range of computational problems that can be solved efficiently, with far reaching applications across a wide range of industries and academic disciplines. However, the development of quantum computers capable of realizing this potential relies crucially on the reduction of errors—differences between the actual and ideal implementations of quantum logic operations.

Certain types of errors, namely coherent errors (including stochastic coherent errors and coherent interactions with an environment, below the relevant correlation time) can be significantly reduced via Quantum Error Suppression (QES). The characteristic feature of QES is that it requires no significant overhead in the number of qubits, circuit depth, or the number of circuit repetitions required to obtain results up to a given statistical error (the total number of 'shots'). A prototypical example of QES is 'dynamical decoupling', where a non-idle quantum circuit implements a better quantum memory than the idle circuit. An additional important example is given by 'Pauli twirling', where a single noisy circuit is replaced by an average over noisy circuits obtained by randomly adding certain Pauli layers. Though a number of distinct circuits must be used, the total number of shots needed is similar to that of the original circuit. In both QES examples, all circuits mentioned are ideally equal, i.e., identical in the absence of errors, and the effect of QES is to average over rotated coherent errors, thus reducing them. Additionally, QES may be performed by accurately characterizing coherent errors and adding small unitary gates to invert these errors.

Other types of errors, namely dissipative errors (in particular due to stochastic coherent errors and coherent interactions with an environment, above the relevant correlation time), cannot be eliminated using QES, i.e., without a significant resource overhead. The long-term strategy for dealing with such errors is Quantum Error Correction (QEC), where quantum information is encoded in a redundant number of qubits, such that errors can be measured and corrected during the computation. However, known QEC schemes require that error rates are below a very low threshold to begin with, and entail a polynomial yet excessive overhead, in the number of qubits and circuit depth. Additionally, QEC requires reliable and efficient adaptive 'syndrome' measurements, including mid-circuit measurements, non-trivial real-time classical logic to decode measurement results, and the ability to apply correction gates conditioned on this logic.

Recently, a family of methods complementary to QEC has been developed for existing quantum processing units (QPUs), which do not yet meet the requirements for QEC. These are known as Quantum Error Mitigation (QEM) methods, and require an overhead in the total number of shots, but with little or no overhead in the number of qubits and circuit depth. The shot overhead of QEM is known to be exponential in the 'total infidelity' IF×V in the noisy circuit to be mitigated, where the circuit volume V is the total number of noisy gates and IF is the infidelity per gate. Thus, while QEM is exponential in the circuit volume, the shot overhead is moderate for circuits with V up to a few times 1/IF, which grows as hardware improves and infidelities are lowered. Currently, state-of-the-art QPUs have 2-qubit gate infidelities IF~$10^{-3}$-$10^{-2}$ (and single-qubit gate infidelities an order of magnitude lower). Thus, QEM currently allows for noise-free outcomes of circuits with hundreds to thousands of 2-qubit gates, approaching volumes which are well beyond the reach of classical simulation—a necessary condition for quantum algorithmic advantage. QEM not only allows for reducing errors on current and near-future hardware, but can also be combined with QEC, smoothing the otherwise sharp transition from noisy QPUs to error-corrected QPUs as hardware evolves.

A notable method for QEM is known as 'probabilistic error cancellation' (PEC), or as the 'quasi-probability method' (QP method). To the best of Applicants' knowledge, this is the only known QEM method which is theoretically guaranteed to produce un-biased estimators for the outcomes of ideal quantum circuits (assuming the errors are exactly known). The QP method is based on the representation:

$$G_0 = \sum_p c_p B_p \tag{1}$$

of an ideal quantum logic operation $G_0$ as a linear combination of noisy quantum logic operations $\mathcal{B}=\{B_p\}\in G$, including a noisy version G of $G_0$, with coefficients $\{c_p\}$. Under standard assumptions—namely both $G_0$ and all basis elements $B_i$ are assumed to be hermiticity-preserving and trace-preserving—the coefficients $c_p$ are real and normalized, $\Sigma_p c_p=1$, and therefore define a quasi-probability (QP) distribution. Eq. 1 may be referred to as a QP representation of the ideal operation $G_0$ in the basis $\mathcal{B}$. To note, the term 'QP decomposition' is interchangeable with the term 'QP representation'.

Eq. 1 represents the unavailable ideal operation $G_0$ as a quasi-expectation value over available noisy operations $B_p$, and may be implemented on a given QPU by replacing the outcome of an ideal quantum circuit containing $G_0$ by an appropriate average over the outcomes of noisy quantum circuits obtained by randomly replacing G with an operation $B_p$, sampled according to the QP representation Eq. 1. Assuming the errors in the operations $\mathcal{B}$ are known, one can set up a linear equation for the coefficients $c_i$. Knowledge of the errors in $\mathcal{B}$ may be obtained via a detailed quantum characterization protocol, such as Gate Set Tomography or Cycle Benchmarking.

The fundamental challenge in applying the QP method is the construction of a basis $\mathcal{B}$ which is expressive enough to mitigate all significant errors, and yet comprised of operations which are natively available on the QPU, and preferably have a short duration and high fidelity. An additional useful feature in case the operations $B_p$ act on a subset of qubits in the ideal circuit (e.g., single- or 2-qubit operations) is that the operations $B_p$ can be applied simultaneously with each other and with other gates in the circuit.

QP bases which are expressive enough to allow for the mitigation of any quantum operation on n qubits, and involve only the noisy operation G and layers of single-qubit operations, have been proposed and used in 2-qubit experiments. However, a practical difficulty with the proposed bases is that they involve non-unitary operations. In particular, the proposed bases involve single-qubit operations such as $\Pi_0:\rho\mapsto|0\rangle\langle 0|\rho|0\rangle\langle 0|$, corresponding to measuring a qubit in the computational basis and post-selecting on the outcome 0. Since the operation $\Pi_0$ is to be used in general locations in the circuit, the relevant measurement is generally a mid-circuit measurement, and post-selection corresponds to replacing the result of the end-of-circuit measurement with 0 unless the mid-circuit measurement gives the outcome 0. As described above, such mid-circuit measurements are a requirement of QEC, but are unavailable on certain existing QPUs. In QPUs where these operations are available, they often have an un-favorable trade-off between their fidelity and duration, in comparison to single-qubit and even two-qubit gates. As an example, in order to obtain a high-fidelity implementation of $\Pi_0$, the mid-circuit measurement is sometimes followed by a reset operation, which includes another mid-circuit measurement followed by an X gate conditioned on the measurement outcome. Alternatively, the reset operation can be implemented using an ancilla qubit and a SWAP gate. In both cases, significant resources are used to implement a high-fidelity $\Pi_0$.

In accordance with the above difficulties, large-scale QEM experiments utilizing the QP method do not make use of non-unitary operations. Instead, these experiments make use of the following mitigation strategy, based on 2-qubit Clifford gates, such as the conditional-not gate CX. Every quantum circuit can be compiled onto alternating layers of CX gates and single-qubit gates. Neglecting errors in single-qubit gates relative to those in CX gates, which is usually a reasonable approximation, the method focuses on the CX layers. These can be Pauli twirled, resulting in a simple Pauli error channel before or equivalently, after) the ideal gate, which can be mitigated with the basis $\mathcal{B}=G\mathcal{P}:=\{GP|P\in\mathcal{P}\}$ where $\mathcal{P}$ denotes the group of Pauli layers, a subgroup of the group of unitary single-qubit gates. In particular, no non-unitary basis elements are used. The above mitigation strategy may be referred to as 'Clifford mitigation'.

For layers of non-Clifford 2-qubit gates, it is unclear how to apply the QP method without the downsides of non-unitary operations. And though non-Clifford 2-qubit gates can be composed using single-qubit gates and 2-qubit Clifford gates, using natively implemented non-Clifford 2-qubit gates usually leads to a significant reduction in the infidelity IF, which translates to a potential reduction in the shot overhead of QEM. Indeed, the above reduction in IF is the reason many quantum hardware manufacturers support native non-Clifford 2-qubit gates. Nevertheless, existing QP methods require either the use of non-unitary operations for the mitigation of non-Clifford gates, or are based on a highly non-optimal composite implementation based on Clifford gates.

GENERAL DESCRIPTION

As described above, state-of-the-art QP methods generally require operations that are expensive in terms of run time, availability, and/or noise. The present disclosure provides a method wherein these drawbacks are rectified. The need for non-unitary operations is reduced, and in some embodiments, eliminated. The need for a non-optimal compilation of multi-qubit gates is also reduced, and in some embodiments, eliminated.

In this disclosure, 'multi-type' QP bases are introduced. These may be defined in terms of a restricted set S of 'mitigation operations' one is willing to use in order to construct QP basis elements, and allow for an optimal mitigation given this restriction. Further, it is demonstrated in numerical simulations that multi-type QP bases allow for the efficient mitigation of errors in quantum circuits compiled using 2-qubit non-Clifford gates, without relying on non-unitary operations, or on a significantly noisier compilation onto 2-qubit Clifford gates. Additionally, a scalable algorithm for the construction of multi-type QP decompositions is introduced—i.e., a classical algorithm for the coefficients $c_p$ in Eq. 1, given a multi-type QP basis $\mathcal{B}$ on n qubits, whose run time is polynomial in n.

A multi-type basis $\mathcal{B}$ may be defined by a noisy operation G (with target version $G_0$), and a user-specified set of 'mitigation operations' $\mathcal{S}$ corresponding to a set of 'simple' quantum operations which are available on the relevant QPU. Given the set $\mathcal{S}$, a multi-type basis $\mathcal{B}$ consists of basis elements $B_p\in\mathcal{B}$ which are subcircuits constructed from G and the elements of $\mathcal{S}$, where each 'type' corresponds to a particular sub-circuit structure. In other words, the different types in a multi-type basis $\mathcal{B}$ may be defined by specific ways of forming compound operations from G and $\mathcal{S}$. The definition of a type can depend, inter alia, on specific mitigation operations used, on the way mitigation operations are combined with the gate G, the number of mitigation operations used, and the ordering of the mitigation operations. As an example, consider the multi-type basis $$\mathcal{B}=\{G\}\cup\mathcal{S}\cup G\mathcal{S}\cup\mathcal{S}G\cup\mathcal{S}G\mathcal{S}, \tag{2}$$

where, e.g., $\mathcal{S}G\mathcal{S}:=\{SG\tilde{S}|S,\ \tilde{S}\in\mathcal{S}\}$. Eq. 2 includes the necessary trivial type given by the noisy gate G, as well as four non-trivial types, involving up to a single instance of G and up to two instances of elements from $\mathcal{S}$. The types $\mathcal{S}^2=\{S\tilde{S}|\ S,\ \tilde{S}\in\mathcal{S}\}$, $G\mathcal{S}^2$ and $\mathcal{S}^2G$ also satisfy the later criterion and may be added, but may be redundant if S is closed under multiplication (at least ideally, i.e., in the absence of noise). The allowed numbers of instances of G and S may be enlarged to include additional types, such as $\mathcal{S}G\mathcal{S}G$ etc. Adding types gives a basis that potentially allows for the mitigation of additional kinds of errors, or the more efficient mitigation of errors that can be mitigated with a simpler basis. Mat e basis constructed from all types (including any number of instances of G and $\mathcal{S}$, at any ordering spans the algebra generated by $\{G\}\cup\mathcal{S}$, and taking a larger number of types gives access to larger vector sub-spaces of this algebra, or allows to span an already attained sub-space more efficiently.

The elements of $\mathcal{S}$ act on the same number of qubits as G. The set $\mathcal{S}$ may be closed under multiplication (forming a semi-group), and additionally under inversion (forming a group), at least ideally. As a simple yet already useful example, $\mathcal{S}$ may be a set of layers of single-qubit unitary gates, and in particular, $\mathcal{S}$ may be the group of Pauli layers $\mathcal{P}$. Another useful example is the case where $G=G_\alpha$ is an element of a parameterized family of gates (where the parameter $\alpha$ may be e.g., a rotation angle), and $\mathcal{S}$ contains additional elements $G_{\alpha'}$ from the family.

The operation G may be a single gate, a layer of gates acting in parallel, or a sub-circuit involving several such layers, that is, $G=L_k \ldots L_1$. The latter case allows for more general multi-type bases, where basis elements $B_i$ correspond to sub-circuits constructed from the set of layers $\mathcal{L}=\{L_1, \ldots, L_k\}$ and the set of mitigation operations $\mathcal{S}$. Each type corresponds to a sub-circuit structure, of the form:

$$\mathcal{L}^{a_1}\mathcal{S}^{b_1} \ldots \mathcal{L}^{a_M}\mathcal{S}^{b_M},$$

with $a_j$, $b_j$, $M\in \mathbb{N}_0$ and e.g., $\mathcal{L}^2\mathcal{S}=\{LL'S|L, L'\in \mathcal{L}, S\in \mathcal{S}\}$.

Given a noisy circuit to be mitigated, there is freedom in decomposing it into sub-circuits G for which QP decompositions are constructed. Taking larger sub-circuits (acting on larger subsets of qubits or larger subsets of layers) allows for the mitigation of errors that may not be mitigated with smaller sub-circuits. First, because larger subcircuits admit more types of basis elements, spanning a potentially larger space of mitigatable errors. And second, because once a decomposition into sub-circuits has been fixed, it may be more challenging to mitigate errors involving different sub-circuits, i.e., crosstalk or temporal correlations between sub-circuits separated in space or time, respectively. On the other hand, multi-type QP decompositions for larger sub-circuits are computationally harder to construct—either the depth or width (but not both) of sub-circuits must be bounded to allow for an efficient computation. In particular, constructing a QP decomposition for the entire circuit is computationally harder than simulating the ideal circuit, and therefore intractable for useful quantum circuits.

It is possible to allow for different sets $\mathcal{S}_1$, $\mathcal{S}_2$, . . . for different instances of $\mathcal{S}$, in which case we define $\mathcal{S}=\mathcal{S}_1\cup\mathcal{S}_2\cup$ . . . . As an example, Eq. 2 may be generalized to $\mathcal{B}\{G\}\cup\mathcal{S}_1\cup G\mathcal{S}_2\cup\mathcal{S}_3 G\cup\mathcal{S}_4 G\mathcal{S}_5$. This can, for example, ensure that the different types are mutually exclusive (even ideally), by excluding certain operations from any of the $\mathcal{S}_1$, $\mathcal{S}_2$, . . . when needed, such as the idle operation, or operations (ideally) commuting with G.

A target operation $G_0$ may have several available noisy implementations, given by a set $\mathcal{G}$, in which case G and $\{G\}$ in Eq. 1 may be replaced with the set $\mathcal{G}$.

In accordance with a first aspect of the presently disclosed subject matter, there is provided a computer implemented method, for mitigating errors in a quantum circuit. The quantum circuit comprises at least one occurrence of a quantum logic operation of a quantum processor, denoted G. The method includes computing a set of coefficients, denoted $\{c_p\}$. The set of coefficients $\{c_p\}$ is associated with a set of basis operations (that may be referred to as subcircuits), denoted $\mathcal{B}=\{B_p\}$. Computing a set of coefficients is done in order to obtain a quasi-probability decomposition $G_0\approx\Sigma_p c_p B_p$ on the set of basis operations $\mathcal{B}$. The quasi-probability decomposition is of a target version of the quantum logic operation G, denoted $G_0$. The set of basis operations $\{B_p\}$ forms a multi-type basis, constructed from the quantum logic operation G and elements of a set of mitigation operations $\mathcal{S}$. The decomposition is computed so as to reach a decomposition target. The decomposition target is based on at least one of a decomposition accuracy target, and a decomposition sampling overhead target. The method further includes implementing the quasi-probability decomposition on the quantum processor. The implementation of the quasi-probability decomposition is to estimate an outcome of a target quantum circuit, in which the target version $G_0$ of the quantum operation G replaces the at least one occurrence of the quantum operation G.

According to an embodiment of the present disclosure, the implementation of the quasi-probability decomposition includes sampling the set of basis operations $\{B_p\}$ based on said set of coefficients $\{c_p\}$. The sampling is in order to obtain at least one corresponding set of sampled operations. The sampling is performed for each of the at least one occurrence of the quantum operation G in the quantum circuit. The implementation of the quasi-probability decomposition further includes running a set of sampled quantum circuits on the quantum processor. The set of sampled quantum circuits is determined by replacing the at least one occurrence of G in the quantum circuit, by one sampled operation of the corresponding set of sampled operations. The running of a set of sampled quantum circuits is to obtain sampled quantum circuit outcomes. The implementation of the quasi-probability decomposition further includes estimating the outcome of the target quantum circuit, based on the sampled quantum circuit outcomes.

In addition to the above features, a computer implemented method for mitigating errors in a quantum circuit, according to this aspect of the presently disclosed subject matter, can optionally comprise one or more of features (i) to (xli) below, in any technically possible combination or permutation:

i. the set of basis operations $\{B_p\}$ includes at least two basis operation types.

ii. set of basis operations $\{B_p\}$ includes at least two basis operation types selected from a plurality of basis operation types $GS_i$, $S_jG$, $S_k GS_l$, $S_m$, where $S_i, \ldots, S_m$ are elements of the set of mitigation operations $\mathcal{S}$.

iii. replacing at least one occurrence of G in the quantum circuit, is performed by replacing each occurrence of G by a sample from the corresponding set of basis operations.

iv. the sampling is according to a probabilistic distribution defined by weights $$w_p = \frac{|c_p|}{W},$$

wherein $W=\Sigma_p|c_p|$.

v. computing the decomposition sampling overhead, wherein computing the sampling overhead includes computing the quasi-probability norm $W=\Sigma_p|c_p|$.

vi. computing a decomposition accuracy, wherein computing the decomposition accuracy includes computing a distance measure between the decomposition and the target version $G_0$.

vii. the distance measure is any one of the Frobenius distance, infidelity, or diamond distance.

viii. the target version $G_0$ is an ideal implementation of the quantum logic operation G.

ix. the target version $G_0$ is a noise-amplified implementation of the quantum logic operation G. Amplifying noise in the implementation of the quantum logic operation G can be beneficial, for example, when noise-analysis is applied, such as Zero Noise Extrapolation, Clifford or free-fermion Data Regression.

x. mid-circuit measurement operations are excluded from the set of mitigation operations $\mathcal{S}$.

xi. reset operations are excluded from the set of mitigation operations $\mathcal{S}$.

xii. ideally-non-unitary quantum logic operations are excluded from the set of mitigation operations $\mathcal{S}$.

xiii. idle operations are excluded from the set of mitigation operations $\mathcal{S}$.

xiv. the set of mitigation operations $\mathcal{S}$ consists of layers of single qubit operations.

xv. the set of mitigation operations $\mathcal{S}$ includes layers of multi-qubit operations.

xvi. the $S_i, \ldots, S_m$ are included, respectively, in sets $\mathcal{S}_1, \ldots, \mathcal{S}_5$, and at least one, preferably each, of the sets $\mathcal{S}_1, \ldots, \mathcal{S}_5$ include at least about $10^n$ linearly independent gate layers, wherein n is the number of qubits on which G is applied.

xvii. the set of mitigation operations $\mathcal{S}$ include linearly dependent gate layers.

xviii. at least some of the gate layers in the set of mitigation operations $\mathcal{S}$ ideally operate non-trivially on up to a predefined number of qubits r.

xix. each of the mitigation operations included in the set of mitigation operations $\mathcal{S}$ ideally operate non-trivially on up to the predefined number of qubits r. Further, at least one, and preferably each, of the sets $\mathcal{S}_1, \ldots, \mathcal{S}_5$ includes at least about $$\binom{n}{r}10^r$$

linearly independent gate layers.

xx. qubits interact according to a hypergraph.

xxi. the target version $G_0$ of said quantum logic operation G is a layer of gates acting on non-overlapping sets of qubits.

xxii. the target version $G_0$ of said quantum logic operation G comprises non-Clifford gates.

xxiii. the quantum logic operation G is twirled.

xxiv. the non-Clifford gates are twirled using gates that commute with $G_0$.

xxv. the twirling includes decomposing $G_0$ according to a KAK decomposition. Further, the twirling includes using gates that commute with the KAK decomposition.

xxvi. the set of basis operations $\{B_p\}$ further includes subcircuits $B_p$ comprising two or more occurrences of the quantum logic operation G, or comprising two or more mitigation operations chosen from set of mitigation operations $\mathcal{S}$.

xxvii. the subcircuits are shallow.

xxviii. the subcircuits are of depth lower than a predefined threshold.

xxix. the quantum logic operation G is a sub-circuit given by a sequence of sub-operations $G=\Xi_K \ldots \Xi_1$. In addition, the subcircuits $B_p$ include one or more sub-operations $\Xi_1, \ldots, \Xi_K$ included in the sequence of sub-operations. Further, the subcircuits $B_p$ include zero or more operations included in the set of mitigation operations $\mathcal{S}$.

xxx. obtaining a characterization of errors in the quantum logic operation G.

xxxi. comprising obtaining a characterization of errors in at least one of the operations included in the set of mitigation operations $\mathcal{S}$.

xxxii. obtaining a characterization of errors in at least one basis operation included in the set of basis operations $\{B_p\}$.

xxxiii. optimizing a tradeoff between a decomposition accuracy and a decomposition sampling overhead.

xxxiv. optimizing a tradeoff includes optimizing the decomposition accuracy by solving a least-squares problem, and minimizing the sampling overhead by solving a linear program.

xxxv. the least-squares problem is linearized, thereby achieving a running time of O(n) in the number of qubits.

xxxvi. the decomposition accuracy target includes a decomposition accuracy staying below a predefined accuracy threshold E.

xxxvii. the decomposition sampling overhead target includes a decomposition sampling overhead staying below a predefined sampling overhead threshold 11.

xxxviii. the decomposition sampling overhead target includes a maximum quasi-probability norm $$W \le \eta.$$

xxxix. computing a statistical error of the estimated outcome of the target quantum circuit.

xl. estimating the outcome of the target quantum circuit includes computing, for each sampled quantum circuit of the set of sampled quantum circuits, a corresponding sampled circuit sign. The sampled circuit sign equals to a sign of a product of the at least one coefficient corresponding to least one sampled operation which replaces the at least one occurrence of G in said sampled quantum circuit.

xli. estimating the outcome of the target quantum circuit includes computing an average of the sampled quantum circuit outcomes. The sampled quantum circuit outcomes are weighted by the corresponding sampled circuit sign and by a quasi-probability norm W.

In accordance with a second aspect of the presently disclosed subject matter, there is provided a computer implemented method, for mitigating errors in a quantum circuit. The quantum circuit comprises at least one occurrence of a quantum logic operation of a quantum processor, denoted G. The method includes computing a set of coefficients, denoted $\{c_p\}$. The set of coefficients $\{c_p\}$ is associated with a set of basis operations (that may be referred to as subcircuits), denoted $\{B_p\}$. Computing a set of coefficients is done in order to obtain a quasi-probability decomposition $G_0 \approx \Sigma_p c_p B_p$ on the set of basis operations $\{B_p\}$. The quasi-probability decomposition is of a target version of the quantum logic operation G, denoted $G_0$. The set of basis operations $\{B_p\}$ includes ideally-non-unitary basis operations and ideally-unitary basis operations. The decomposition is computed so as to reach a decomposition target. The decomposition target is based on a use target of ideally-non-unitary basis operations, and at least one of a decomposition accuracy target, a decomposition sampling overhead target, and a use target of ideally-unitary basis operations. The method further includes implementing the quasi-probability decomposition on the quantum processor. The implementation of the quasi-probability decomposition is to estimate an outcome of a target quantum circuit, in which the target version $G_0$ of the quantum operation G replaces the at least one occurrence of the quantum operation G.

According to an embodiment of the present disclosure, the use target of ideally-non-unitary basis operations is minimized by computing the quasi-probability decomposition, wherein the set of basis operations $\{B_p\}$ forms a multi-type basis. The multi-type basis is constructed from the quantum logic operation G, and ideally-unitary elements of a set of mitigation operations $\mathcal{S}$. Further, the use target of ideally-non-unitary basis operations is minimized by computing a set of complementary coefficients. The set of complementary coefficients is denoted $\{\check{c}_q\}$. The set of complementary coefficients is associated with a set of complementary basis operations (that may be referred to as complementary subcircuits). The set of complementary basis operations is denoted $\{\check{B}_q\}$. The computation is in order to obtain a quasi-probability decomposition for the residual error $G_0-\Sigma_p c_p B_p \approx \Sigma_q \check{c}_q \check{B}_q$. The set of complementary basis operations $\{\check{B}_q\}$ includes ideally-non-unitary operations. The method further includes a step of implementing the quasi-probability decomposition for the residual error on the quantum processor, in order to refine the estimate of the outcome of the target quantum circuit.

In addition to the above features, a computer implemented method for mitigating errors in a quantum circuit, according to this aspect of the presently disclosed subject matter, can optionally comprise one or more of features (i) to (iv) below, in any technically possible combination or permutation:

i. the set of complimentary basis operations $\{\check{B}_q\}$ forms a multi-type basis, constructed from the quantum logic operation G and elements of a complementary set $\check{\mathcal{S}}$ of mitigation operations.
ii. the set of basis operations $\{B_p\}$ includes basis operations selected from at least two basis operation types, from a plurality of basis operation types $GS_i$, $S_jG$, $S_kGS_l$, $S_m$. The $S_i, \ldots, S_m$ are included in the set of mitigation operations $\mathcal{S}$.
iii. the set of complimentary basis operations $\{\check{B}_q\}$ includes basis operations selected from at least two basis operation types, from a plurality of basis operation types $GS_i$, $S_jG$, $S_kGS_l$, $S_m$. The $S_i, \ldots, S_m$ are included in the set of complementary mitigation operations $\check{\mathcal{S}}$.
iv. the set of basis operations $\{B_p\}$ further includes subcircuits $B_p$. Alternatively, or in conjunction, set of complementary basis operations $\{\check{B}_q\}$ includes subcircuits $\check{B}_q$. The subcircuits, whether $B_p$ or $\check{B}_q$ (i.e., whether in $\{B_p\}$ or in $\{\check{B}_q\}$), include two or more occurrences of the quantum logic operation G, or include two or more mitigation operations chosen from the set of mitigation operations $\mathcal{S}$ and from the complementary set of mitigation operations $\check{\mathcal{S}}$, respectively. In other words, subcircuits, $B_p$ can include two or more mitigation operations chosen from the set of mitigation operations $\mathcal{S}$; Subcircuits $\check{B}_q$ can include two or more mitigation operations chosen from the complementary set of mitigation operations $\check{\mathcal{S}}$.

In accordance with a third aspect of the presently disclosed subject matter, there is provided a computer implemented method, for mitigating errors in a quantum circuit. The quantum circuit comprises at least one occurrence of a quantum logic operation of a quantum processor, denoted G. The method includes computing a set of coefficients, denoted $\{c_p\}$. The set of coefficients $\{c_p\}$ is associated with a set of basis operations (that may be referred to as subcircuits), denoted $\{B_p\}$. Computing a set of coefficients is done in order to obtain a quasi-probability decomposition $G_0 \approx \Sigma_p c_p B_p$ on the set of basis operations $\{B_p\}$. The quasi-probability decomposition is of a target version of the quantum logic operation G, denoted $G_0$. The quantum logic operation G is expressed as (i.e., given by) a sequence of sub-operations $G=\Xi_K \ldots \Xi_1$. $K \geq 1$, or in other words, the quantum logic operation G is a subcircuit that includes at least one sub-operation. The set of basis operations $\{B_p\}$ includes the quantum logic operation G, and basis operations selected from at least two basis operation types. The types are denoted $GS_i$, $S_jG$, $S_kGS_l$, $S_m$. The $S_i, \ldots, S_m$ are included in a set of mitigation operations $\mathcal{S}$. Alternatively to these types, or in conjunction with these types, the set of basis operations $\{B_p\}$ includes subcircuits that include two or more occurrences of the quantum logic operation G, or including two or more mitigation operations chosen from the set of mitigation operations $\mathcal{S}$. Alternatively to the basis operations already listed, or in conjunction with these basis operations, the set of basis operations $\{B_p\}$ includes one or more sub-operations $\Xi_1, \ldots, \Xi_K$ included in the sequence of sub-operations. The decomposition is computed so as to reach a decomposition target. The decomposition target is based on at least one of a decomposition accuracy target, and a decomposition sampling overhead target. The method further includes implementing the quasi-probability decomposition on the quantum processor. The implementation of the quasi-probability decomposition is to estimate an outcome of a target quantum circuit, in which the target version $G_0$ of the quantum operation G replaces the at least one occurrence of the quantum operation G.

In accordance with a fourth aspect of the presently disclosed subject matter, there is provided a computer implemented method, for mitigating errors in a quantum circuit. The quantum circuit comprises at least one occurrence of a quantum logic operation of a quantum processor, denoted G. The method includes computing a set of coefficients, denoted $\{c_p\}$. The set of coefficients $\{c_p\}$ is associated with a set of basis operations (that may be referred to as subcircuits), denoted $\{B_p\}$. Computing a set of coefficients is done in order to obtain a quasi-probability decomposition $G_0 \approx \Sigma_p c_p B_p$ on the set of basis operations $\{B_p\}$. The quasi-probability decomposition is of a target version of the quantum logic operation G, denoted $G_0$. The quantum logic operation G is expressed as (i.e., given by) a sequence of sub-operations $G=\Xi_K \ldots \Xi_1$. $K \geq 1$, or in other words, the quantum logic operation G is a subcircuit that includes at least one sub-operation. The set of basis operations $\{B_p\}$ includes ideally-non-unitary basis operations and ideally-unitary basis operations. The set of basis operations $\{B_p\}$ includes the quantum logic operation G, and basis operations selected from at least two basis operation types. The types are denoted $GS_i$, $S_jG$, $S_k GS_l$, $S_m$. The $S_i, \ldots, S_m$ are included in a set of mitigation operations, denoted $\mathcal{S}$. Alternatively to these types, or in conjunction with theses types, the set of basis operations $\{B_p\}$ includes subcircuits that include two or more occurrences of the quantum logic operation G, or including two or more mitigation operations chosen from the set of mitigation operations $\mathcal{S}$. Alternatively to the basis operations already listed, or in conjunction with these basis operations, the set of basis operations $\{B_p\}$ includes one or more sub-operations $\Xi_1, \ldots, \Xi_K$ included in the sequence of sub-operations. The decomposition is computed so as to reach a decomposition target. The decomposition target is based on a use target of ideally-non-unitary basis operations, and at least one of a decomposition accuracy target, a decomposition sampling overhead target, and a use target of ideally-unitary basis operations. The method includes computing a set of complementary coefficients. The set of complementary coefficients is denoted $\{\check{c}_q\}$. The set of complementary coefficients is associated with a set of complementary basis operations (that may be referred to as complementary subcircuits). The set of complementary basis operations is denoted $\{\check{B}_q\}$. Computing the set of complementary coefficients is in order to obtain a quasiprobability decomposition for the residual error $G_0-\Sigma_p c_p B_p \approx \Sigma_q \check{c}_q \check{B}_q$. The set of complementary basis operations $\{\check{B}_q\}$ include ideally-non-unitary operations. The set of complimentary basis operations $\{\check{B}_q\}$ includes the quantum logic operation G and basis operations selected from at least two basis operation types from the following basis operation types $GS_i$, $S_jG$, $S_kGS_l$, $S_m$. The $S_i, \ldots, S_m$ are included in a complementary set of mitigation operations, denoted $\check{\mathcal{S}}$. Alternatively to these types, or in conjunction with theses types, the set of complementary basis operations $\{\check{B}_q\}$ includes subcircuits that include two or more occurrences of the quantum logic operation G, or including two or more mitigation operations chosen from the complementary set of mitigation operations $\check{\mathcal{S}}$. Alternatively to the basis operations already listed, or in conjunction with these basis operations, the set of complementary basis operations $\{\check{B}_q\}$ includes one or more sub-operations $\Xi_1, \ldots, \Xi_K$ included in the sequence of sub-operations. The method further includes implementing the quasi-probability decomposition on the quantum processor. The implementation of the quasi-probability decomposition is to estimate an outcome of a target quantum circuit, in which the target version $G_0$ of the quantum operation G replaces the at least one occurrence of the quantum operation G. The method further includes a step of implementing the quasi-probability decomposition for the residual error on the quantum processor, in order to refine the estimate of the outcome of the target quantum circuit.

Methods according to the second, third, and fourth aspects, may be generalized. Instead of the distinction between (ideally) unitary and nonunitary operations, operations may be distinguished as 'easy' and 'hard', where 'easy' operations are preferred over 'hard' operations. That is, for example, it is preferred that the probability to sample a 'hard' operation is minimized. The distinction between 'easy' and 'hard' operations may, for example, be based on the duration, fidelity, availability as a native operation, or parallelizability of operations.

In accordance with a fifth aspect of the presently disclosed subject matter, there is provided a computer implemented method for mitigating errors in a quantum circuit. The quantum circuit includes at least one occurrence of a quantum logic operation G of a quantum processor. The method includes implementing a quasi-probability decomposition. The quasi-probability decomposition is implemented using basis operations that includes the quantum logic operation G, and basis operations selected from a multi-type basis $\mathcal{B}$.

According to an embodiment, the multi-type basis $\mathcal{B}$ includes at least two types from the types $GS_i$, $S_jG$, $S_kGS_l$, $S_m$, where $S_i, \ldots, S_m$ are elements of a set of mitigation operations $\mathcal{S}$. Alternatively to these types, or in conjunction with theses types, the set of basis operations $\{B_p\}$ includes subcircuits comprising two or more occurrences of the quantum logic operation G, or comprising two or more mitigation operations chosen from the set of mitigation operations $\mathcal{S}$.

According to an embodiment, the quantum logic operation G is expressed as (i.e., given by) a sequence of sub-operations $G=\Xi_K \ldots \Xi_1$. $K \geq 1$, or in other words, the quantum logic operation G is a subcircuit that includes at least one sub-operation. The multi-type basis $\mathcal{B}$ includes one or more sub-operations $\Xi_1, \ldots, \Xi_K$ included in the sequence of sub-operations.

In methods according to any aspect, the quantum operation G is not necessarily an ideally-unitary operation, e.g., the quantum operation G can be a state-preparation-and-measurement (SPAM) operation.

Generally, methods according to any aspect can be used to mitigate errors in linear combinations of outputs from a plurality of circuits, or more generally, functions that may require multiple circuits to be computed. The different circuits may be decomposed (according to different aspects, if preferred), the decompositions may be implemented on the quantum processor, and measurement results may then be processed to estimate a value of a function.

In accordance with a sixth aspect of the presently disclosed subject matter, there is provided a non-transient computer-readable storage-medium storing computer instructions, wherein the computer instructions are used for causing a computer to execute a method according to the first to fifth aspects of the presently disclosed subject matter.

In accordance with a seventh aspect of the presently disclosed subject matter, there is provided a computer program product, comprising a computer program, wherein the computer program, when executed by a computer, implements a method according to the first to fifth aspects of the presently disclosed subject matter.

In accordance with an eighth aspect of the presently disclosed subject matter, there is provided a computer system for mitigating errors in a quantum circuit. The computer system includes a classical processor that executes computer executable components stored in memory, and a quantum processor. The quantum processor includes at least one qubit and measuring apparatus. The quantum processor is configured to receive commands from the classical processor. The computer system is configured to implement a method according to the first to fourth aspects of the presently disclosed subject matter.

According to an embodiment, the computer system is configured to read a non-transient computer-readable storage-medium disclosed in the sixth aspect of the presently disclosed subject matter, and/or to run a computer program product disclosed in the seventh aspect of the presently disclosed subject matter.

In accordance with a nineth aspect of the presently disclosed subject matter, there is provided computer system comprising a quantum processor and a classical processor. The classical processor is configured to execute computer executable components stored in memory, wherein the computer executable components comprise a decomposition component and an implementation component. The decomposition component computes a set of coefficients $\{c_p\}$ associated with a set of basis operations (that may be referred to as subcircuits) $\{B_p\}$, in order to obtain a quasi-probability decomposition $G_0 \approx \Sigma_p c_p B_p$ of a target version $G_0$ of the quantum logic operation G on the set of basis operations $\{B_p\}$. The set of basis operations $\{B_p\}$ forms a multi-type basis, constructed from the quantum logic operation G and elements of a set of mitigation operations $\mathcal{S}$. The decomposition is computed so as to reach a decomposition target based on at least one of a decomposition accuracy target and a decomposition sampling overhead target. The implementation component implements the quasi-probability decomposition on the quantum processor, in order to estimate an outcome of a target quantum circuit in which the target version $G_0$ of the quantum operation G replaces at least one occurrence of the quantum operation G.

In the present disclosure, the following terms and their derivatives may be understood according to the below explanations: The term "un-biased estimator" may refer to a random variable X meant to approximate, or estimate, a quantity x, such that X reproduces x in expectation, $$E[X]=x.$$

The term "ideal" may refer to "in the absence of implementation errors, or noise". Therefore, the term "ideally-unitary" may refer to a quantum operation or gate, that can be represented by a unitary matrix, in the absence of noise. Similarly, the term "ideally-non-unitary" may refer to a quantum operation or gate that cannot be represented by a unitary matrix, even in the absence of noise.

When referring to the qubits that a quantum logic operation may be applied (act) upon, these qubits may include qubits that are affected (or expected to be affected) by the operation, but that the operation is not configured (intended) to affect. Such unintended action can arise due to implementation errors, and in particular crosstalk errors.

The term "Pauli gate" may refer to any quantum gate that is represented by a matrix included in the Pauli group $\mathcal{P}_n$, where n is the number of qubits that the gate acts upon. The Pauli group is defined as the subgroup of the unitary group that includes tensor-products of the Pauli matrices, with possible multiplication by integral powers of the imaginary unit. In formula: $\mathcal{P}_n=\{\pm 1, \pm i\}\times\{\hat{I}, \hat{\sigma}_x, \hat{\sigma}_y, \overline{\sigma}_z\}^{\otimes n}$. Quantum gates that may be represented by a subgroup of the Pauli group that are commuting with a quantum gate Q, may be denoted $\mathcal{P}_Q$. The number of qubits and the quantum gate Q can be implicit, in which case the subscript may be omitted, i.e., the Pauli group may be denoted by $\mathcal{P}$.

The term "Clifford gate" may refer to any quantum gate that is represented by a matrix included in the Clifford group $\mathcal{C}_n$, where n is the number of qubits that the gate acts upon. The Clifford group $\mathcal{C}_n$ is the group of unitary matrices that map the Pauli group to itself, when acting via the similarity transformations. In formula: $\mathcal{C}_n=\{U|\forall M\in \mathcal{P}_n,\ UMU^\dagger\in \mathcal{P}_n\}$. The number of qubits can be implicit, in which case the subscript may be omitted, i.e., the Clifford group may then be denoted by $\mathcal{C}$.

The term "hypergraph" may refer to a generalization of a graph in which edges can join any number of vertices.

The notation P·Q, where P, Q are operators, may denote the super-operator acting by left- and right-multiplication, $\rho\mapsto P\rho Q$.

The notation $\mathcal{S}\mathcal{S}'$, where $\mathcal{S}$ and $\mathcal{S}'$ are sets of (super-) operators, may denote the set of products $SS'$, such that $S\in\mathcal{S}$, $S'\in\mathcal{S}'$. Similarly, the notation $\mathcal{S}G$, where G is a (super-) operator, may denote the set of products SG, such that $S\in\mathcal{S}$. This notation is applicable for combinations of three or more operators/sets, such as $\mathcal{S}\mathcal{S}'\mathcal{S}''$.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2A-2B schematically illustrate features of sets of quantum gates according to embodiments of the present disclosure.

FIG. 3A-3E illustrate features of a quantum logic operation and basis operations according to embodiments of the present disclosure.

FIG. 4 schematically illustrates further features of the method for mitigating errors according to embodiments of the present disclosure.

FIG. 5 shows a flowchart illustrating some steps of a method according to embodiments of the present disclosure.

FIG. 6 shows a flowchart illustrating a variant of the method for mitigating errors according to embodiments of the present disclosure.

DETAILED DESCRIPTION OF EMBODIMENTS

Figure 1:
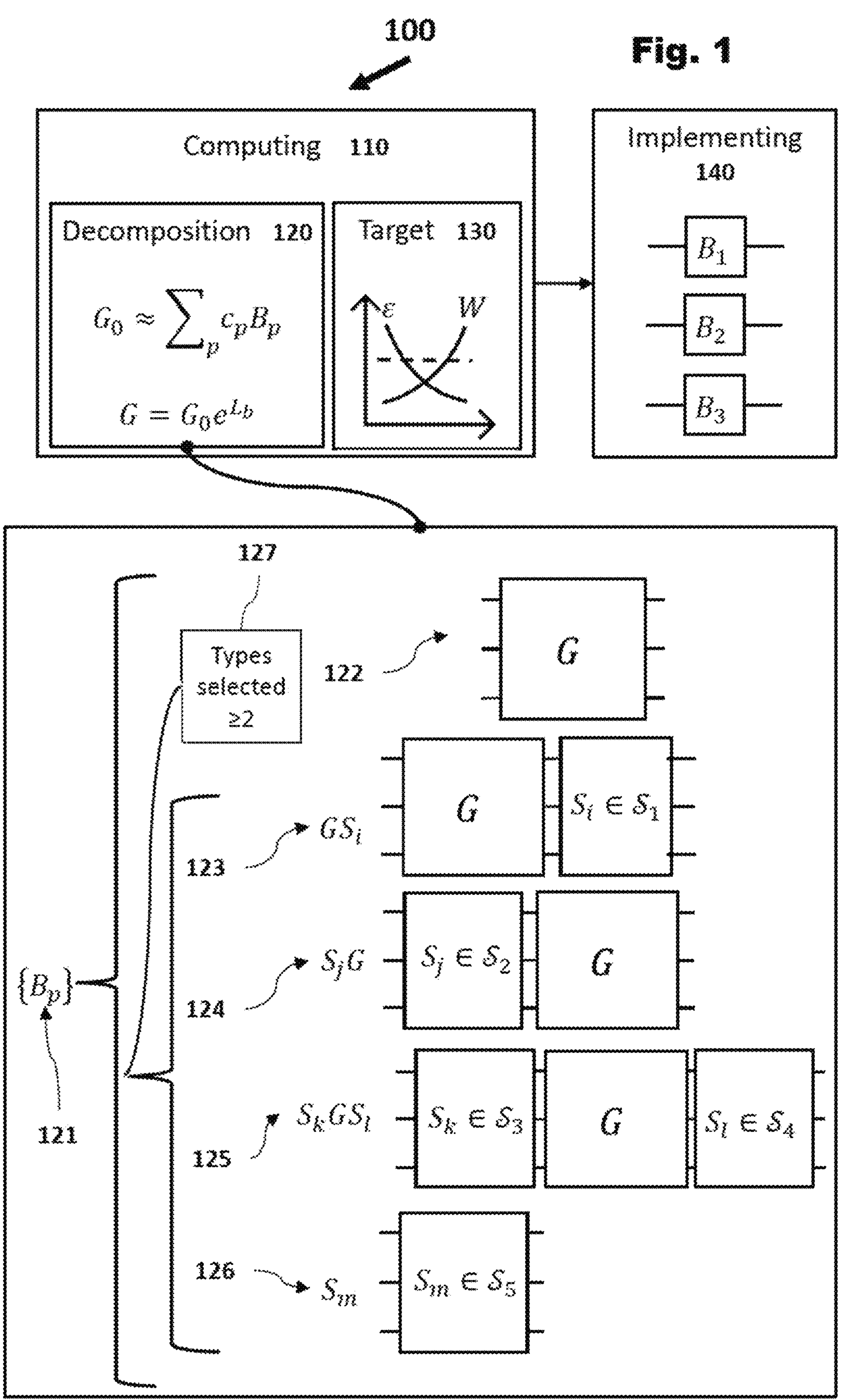
FIG. 1 shows a flowchart illustrating a method for mitigating errors according to embodiments of the present disclosure.

Described herein are some examples of systems and methods useful for mitigating errors in quantum circuits.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrases "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure or characteristic is included in at least one example of the subject matter, but the appearance of the same term does not necessarily refer to the same example.

It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "computing", "determining", "running", "implementing", "using", "performing", or the like, may refer to the action(s) and/or process(es) of any combination of software, hardware and/or firmware. For example, these terms may refer in some cases to the action(s) and/or process(es) of a programmable machine, that manipulates and/or transforms data represented as physical, such as electronic quantities, within the programmable machine's registers and/or memories into other data similarly represented as physical quantities within the programmable machine's memories, registers and/or other such information storage, transmission and/or display element(s).

Mathematical Formalism

The quantum operations $G_0$ (with noisy version G) and $B_p$ in Eq. 1 may be described as super-operators, mapping density operators (describing quantum states) to density operators. In particular, such super-operators are hermiticity-preserving, and may therefore be represented by $4^n \times 4^n$ real matrices, where n is the number of qubits. These matrices may be explicitly written in e.g., the Pauli basis, where a super-operator A, acting by $\rho \mapsto A[\rho]$, is represented as $A_{P,P'} \stackrel{\text{def}}{=} \langle\langle P|A|P'\rangle\rangle \stackrel{\text{def}}{=} \mathrm{Tr}(PA[P'])/2^n$ where $P,P' \in \mathcal{P}$. Eq. 1 is therefore a linear equation for the coefficients $c_p \in \mathbb{R}$ over a $16^n$-dimensional real vector space. The assumption of trace-preservation (TP) fixes $A_{I,P}=\delta_{I,P'}$, where I is the identity operator and $\delta$ denotes the Kronecker symbol. If all operations in Eq. 1 are TP, the equation reduces to a linear equation on a $4^n(4^n-1)$-dimensional real vector space, along with the constraint $\Sigma_p c_p=1$. In particular, $W=\|c\|_1 \geq 1$.

n corresponds to the number of qubits on which the noisy gate G acts non-trivially, where all errors to be mitigated are accounted for, as opposed to e.g., the number of qubits on which $G_0$ acts non-trivially. For example, assume $G_0$ is a 2-qubit gate acting on qubits $q_1$, $q_2$, which suffers a cross-talk error coupling $q_2$ to qubit $q_3$. In this case, the noisy gate G acts on n=3 qubits, and a 3-qubit QP decomposition may be required to mitigate the latter cross-talk error. Similarly, assume $G_0=g_{1,2} \otimes g_{3,4}$ is a layer of 2-qubit gates acting on the qubit pairs $q_1$, $q_2$ and $q_3$, $q_4$, which suffers a cross-talk error between $q_2$ and $q_3$. While separate 2-qubit decompositions suffice in the absence of cross-talk, an n=4 decomposition may be required in its presence.

Sampling Overhead and Accuracy of OP Decompositions

Given an 'ideal' quantum circuit containing a desired but un-available ideal operation $G_0$, and a QP decomposition Eq. 1, error mitigation may be performed by replacing $G_0$ with an available noisy operation $B_p$, randomly sampled with probability $w_p=|c_p|/W$, and multiplying the corresponding circuit outcome by the 'QP norm' $W=\|c\|_1=\Sigma_p|c_p|$ and sign $s_p=\mathrm{sgn}(c_p)$. Averaging over N such replacements gives an un-biased estimator for the 'ideal' circuit outcome, but with a statistical error that may be as high as $W/\sqrt{N}$, to be contrasted with the bound $1/\sqrt{N}$ obtained by running a single noisy circuit N times (shots). We see that W quantifies a sampling overhead in terms of the number of distinct circuits and the total number of shots required to ensure a fixed statistical error.

Grouping the coefficients $c_p$ into positive and negative parts, $$c_p^{\pm} = \Theta(\pm c_p)|c_p|$$

(where $\Theta(x)$ is the Heavyside-function), and defining the positivity and negativity $$W^{\pm} = \Sigma_p c_p^{\pm},$$

the following relations hold:

$$\sum_p c_p = W^+ - W^- = 1,$$

$$W^+ \geq 1,$$

$$W = W^+ + W^- = 2W^+ - 1 = 1 + 2W^- \geq 0.$$

The last equality relates the QP norm W, and hence the sampling overhead, to the negativity $W^-$. The terms 'sampling overhead' and 'negativity' are often used interchangeably in the literature to refer to the QP norm W or to closely related quantities such as $W^2$.

It can be shown that Eq. 1 implies an 'overhead-infidelity' bound, which is a lower bound on W in terms of the (entanglement) infidelity $IF_e(G)=IF_e(G, G_0) \in [0, 1]$ between the noisy G and ideal $G_0$, $$W \geq e^{2IF_e(G)} \geq 1 + 2IF_e(G) \tag{3.1}$$

The 'entanglement infidelity' is given by $$IF_e(G) = 1 - F_e(G) = 1 - Tr\left(GG_0^{-1}\right)/4^n,$$

where the trace refers to the Pauli basis representation. The 'average gate infidelity' is simply related to the entanglement infidelity, $IF_{avg}(G)=IF_e(G)/(1+2^{-n})$. In Eq. 3.1, the operation G is mathematically defined as the basis element $B_p \in \mathcal{B}$ with the highest fidelity $F_e$ relative to $G_0$. The overhead-infidelity bound therefore shows that the available noisy operation G closest to $G_0$ should be included in $\mathcal{B}$ in order to minimize the sampling overhead. The bound in Eq. 3.1 is 'first-order tight', in the sense that various QP representations (some described hereinbelow) attain $W=e^{2IF_e}(G)+O(IF_e(G)^2)=1+2IF_e(G)+O(IF_e(G)^2)$.

The QP norm W is multiplicative, so when the method is applied to an ideal circuit with $V_G$ instances of $G_0$, the total QP norm is $W_{tot}=W^{V_G} \geq e^{2V_G IF_e(G)}$ (this relation generalizes trivially to the case of multiple distinct $$G_0^{[j]}).$$

This shows that the method requires a worst-case exponential overhead in the number of circuits and shots. Nevertheless, the method is applicable to circuits where the 'total infidelity' $V_G\, IF_e(G)$ is not too large. The complexity of the QP method may be contrasted with the complexity of classical simulation of quantum circuits, which is $\sim e^{min(n_{tot},D)C}$, where $n_{tot}$ is the total number of qubits in the circuit, D is the total number of layers, and C~1. Assuming a dense square circuit, where $V_G \sim nD \sim n^2$, the complexity is $\sim e^{\sqrt{VGC}}$ As a result, for a small enough infidelity, practically below $10^{-3}$-$10^{-4}$, and volumes $V_G \sim 1/IF_e(G)$ which are possible with the QP method, become extremely demanding (intractable) classically. For example, problems where $n_{tot}$=35 are already believed to be intractable for commercial use, while problems where $n_{tot}$=100 are believed to be completely intractable. For such problems, simulation is unavailable, necessitating the use of quantum processors.

An exact implementation of the ideal gate $G_0$ is a very strict requirement, and approximate QP representations, $$G_0 \approx G_{QP} = \sum_p c_p B_p,$$

may be considered. A distance of $G_{QP}$ from $G_0$ in an appropriate distance measure, e.g., fidelity, diamond distance or Frobenius distance, may be defined. The distance of $G_0$ from $G_{QP}$ may be referred to as the inaccuracy of the QP representation. This inaccuracy controls systematic errors in the QP method, to be distinguished from the statistical errors discussed above. For an approximate QP representation, the infidelity in the RHS of Eq. 3.1 is reduced to the infidelity eliminated by mitigation:

$$W \geq e^{2[IF_e(G)-IF_e(G_{QP})]}, \tag{3.2}$$

demonstrating the trade-off between inaccuracy and sampling overhead, corresponding respectively to systematic and statistical errors, involved in constructing (approximate) QP representations.

Eq. 3.2 is also applicable when one is intentionally eliminating the noise only partially or even adding noise, as may be relevant when using QP decompositions with various QEM methods, such as Zero Noise Extrapolation, Clifford or free-fermion Data Regression, error detection, symmetry-based post-selection or plurality voting. In the case of adding noise, where $IF_e(G_{QP})>IF_e(G)$, the overhead-infidelity bound goes below the trivial bound $W\geq 1$, implying that the addition of noise may be performed with no sampling overhead, as opposed to the removal of noise. Therefore, methods disclosed herein are directly applicable with any target quantum logic operation and any target quantum circuit (whether noise-reduced, noise amplified, noise-shaped etc.), and not only with a requested ideal quantum logic operation. In other words, the methods disclosed herein are applicable to any requested quantum logic operation and any requested quantum circuit. For convenience and brevity, the disclosure shall refer to examples where an ideal quantum logic operation is the target quantum logic operation, with generalization to any target quantum logic operation implied.

The main challenge involved in error mitigation with the QP method is the construction of QP bases, and corresponding representations, which minimize both inaccuracy and sampling overhead as much as possible, and prioritize these according to a given specification when minimizing both is not possible. Generally speaking, good accuracy requires that the basis $\mathcal{B}$ spans a large enough subspace in the space of super-operators. To identify the required subspace, it is useful to factor out the ideal gate so that the noisy gate may be represented as the ideal gate multiplied by a before-error, i.e., $G=G_0 e^{L_b}$. Here, $L_b$ is a before-error generator, e.g., a Lindbladian. An after-error can equivalently be used instead of a before-error. Eq. 1 may be rephrased as:

$$e^{-L_b} = \sum_p c_p B'_p, \tag{4}$$

wherein $$B'_p = G^{-1} B_p.$$

This expression shows that the QP method may be viewed as dealing with the inversion of error channels. As opposed to the $B_p$, the operations $$B'_p$$

involve the inverse of a noisy gate and are therefore not completely positive—they are not physical quantum operations that can be applied on the QPU. Eq. 4 implies that the basis $$\mathcal{B}' = \{\mathcal{B}'_i\}$$

should span a subspace that includes, or is as close as possible to, the inverse noise channel $e^{-L_b}$, and Span($\mathcal{B}'$) can interpreted as the space of 'mitigatable error channels'.

The condition number of the basis $\mathcal{B}'$ (when viewed as a matrix whose columns are the vectorized basis elements) determines the efficiency with which $\mathcal{B}'$ spans the space of mitigatable errors, and controls the QP norm W, and therefore the sampling overhead. Generally speaking, a large condition number implies a large W. As an example for the basis $\mathcal{B}'$ in the multi-type case, Eq. 2 may be rephrased as:

$$\mathcal{B}' = \{I\} \cup G^{-1}\mathcal{S} \cup \mathcal{S} \cup G^{-1}\mathcal{S}G \cup G^{-1}\mathcal{S}G\mathcal{S}, \tag{5}$$

and we ma take $\mathcal{S}$ to be a large enough set of ideal layers of single-qubit unitary gates. Single-qubit unitary gates span a 10-dimensional vector subspace containing all unital and trace-preserving super-operators, of the form $$\begin{pmatrix} * & 0 & 0 & 0 \\ 0 & * & * & * \\ 0 & * & * & * \\ 0 & * & * & * \end{pmatrix}$$

in the Pauli basis. An example for a basis for this subspace is given by:

$$s = \{I, X_\pi, Y_\pi, Z_\pi, X_{\pi/2}, Y_{\pi/2}, Z_{\pi/2}, Z_{\pi/2}X_\pi, Y_{-\pi/2}X_\pi, X_{\pi/2}Y_\pi\}.$$

With multiple qubits, $\mathcal{S} = s^{\otimes n}$ may be taken as the size-$10^n$ set of layers (n-fold tensor products) of these operations, spanning the corresponding $10^n$-dimensional tensor-product subspace. To note, this subspace is much smaller than the $16^n$-dimensional space of all super-operators (and from the space of TP super-operators). It follows that each of the types in Eq. 5 which contains a single $\mathcal{S}$, namely $G^{-1}\mathcal{S}$, $\mathcal{S}$, $G^{-1}\mathcal{S}G$, spans a $10^n$-dimensional subspace. Each type alone is insufficient to mitigate a generic error channel $e^{L_b}$. However, these $10^n$ dimensional subspaces are rotated w.r.t to each other by the conjugation and multiplication by $G^{-1}$, so the multi-type basis $G^{-1}\mathcal{S} \cup \mathcal{S} \cup G^{-1}\mathcal{S}G$ generically spans a much larger space. Examples of this are shown in numerical simulations. To note, since in this example all basis elements $B_p$ are ideally-unitary, they cannot (efficiently) span non-unital or non-trace-preserving operations, implying a maximal dimension $(4^n-1)^2+1$ for the space of (efficiently) mitigatable errors.

Applicants have found that the QP method may be improved in accordance with the presently disclosed subject matter. In some embodiments as disclosed in more details herein, the improved QP method may be referred to as a 'multi-type QP' method. In some embodiments, as described in more details herein, the improved QP method may reduce the use of (ideally) non-unitary operations and multi-qubit operations. In some embodiments, the improved QP method may substitute the use of non-unitary operations and multi-qubit operations with a QP basis involving subcircuits with multiple types of subcircuit-structures.

FIG. 1 shows a flowchart illustrating steps of a broad aspect of a computer implemented method 100 for mitigating errors in a quantum circuit, according to embodiments of the present disclosure. The quantum circuit may comprise at least one occurrence of a quantum logic operation G of a quantum processor. The quantum logic operation G may be noisy, i.e., it may deviate from an intended ideal operation $G_0$. This deviation may include coherent errors (e.g., a $$\frac{\pi}{2}-$$

rotation gate may rotate the state of a qubit through an angle different than $$\left.\frac{\pi}{2}\right)$$

and incoherent, or dissipative, errors (e.g., $T_1$ and $T_2$ decay processes occurring during the operation G). The method 100 may comprise a step of computing 110, wherein a set of coefficients $\{c_p\}$ may be computed. The set of coefficients $\{c_p\}$ may be associated with a set of basis operations $\{B_p\}$ 121, that is, for every coefficient $c_p$ there may be a corresponding basis operation $B_p$. The computing step 110 may comprise computing a quasi-probability decomposition 120 of the ideal version $G_0$ of the quantum logic operation G on the set of basis operations $\{B_p\}$ 121. That is, a decomposition $G_0 \approx \Sigma_p c_p B_p$ where the ideal version of the quantum logic operation $G_0$ may be approximated by a weighted sum of operations taken from the set of basis operations $\{B_p\}$ 121. The set of basis operations $\{B_p\}$ 121 may comprise the quantum logic operation $G_0$ itself 122 and may include base operations selected from at least two base operation types 127. The base operation types may include the following types:

1. $GS_i$—a quantum operation where $G_0$ may be preceded by quantum gates included in a set of quantum gates $\mathcal{S}_1$ 123,
2. $S_jG$—a quantum operation where $G_0$ may be succeeded by quantum gates included in a set of quantum gates $\mathcal{S}_2$ 124,
3. $S_kGS_l$—a quantum operation where $G_0$ may be both preceded and succeeded by quantum gates included in sets of quantum gates $\mathcal{S}_3$ and $\mathcal{S}_4$, respectively 125,
4. $S_m$—a quantum operation, included in a set of quantum gates $\mathcal{S}_5$, wherein the quantum logic operation $G_0$ may be absent 126.

To note, the base operations types may follow the representation given in Eq. 5, i.e., the base operation types may include:

$$\{\mathcal{B}'_p\} = \{I\} \cup \mathcal{S}_1 \cup G^{-1}\mathcal{S}_2 G \cup G^{-1}\mathcal{S}_3 G \mathcal{S}_4 \cup G^{-1}\mathcal{S}_5 \quad (6)$$

The use of multiple base operation types may beneficially enable to avoid using resource expensive operations in the decomposition. For example, usage of (ideally) non-unitary operations, such as reset operations or mid-circuit measurements may beneficially be avoided or reduced. The absence of such resource expensive operations may be compensated by the plurality of basis operation types, providing operations that linearly span an equivalent or similar subspace in the space of quantum operations. Additionally, a non-optimal compilation of multi-qubit non-Clifford gates onto multi-qubit Clifford gates and single-qubit gates may be avoided.

The union of the sets of quantum operations $\mathcal{S}=\mathcal{S}_1 \cup \mathcal{S}_2 \cup \mathcal{S}_3 \cup \mathcal{S}_4 \cup \mathcal{S}_5$ may be referred to as the set of mitigation operations. The mitigation operations (operations included in the set of mitigation operations) may be gate layers. Each gate layer may comprise a set of quantum gates acting (ideally) on non-overlapping sets of qubits. The sets of quantum operations $\mathcal{S}_1 \ldots \mathcal{S}_5$ may or may not have elements that are common to at least two sets, for example, the sets of quantum operations $\mathcal{S}_1 \ldots \mathcal{S}_5$ may all be equal or conversely, mutually exclusive.

The decomposition 120 may be computed so as to reach a decomposition target 130. The decomposition target may be based on a decomposition accuracy target, may be based on a decomposition sampling overhead target, or may be based on both targets. In other words, the decomposition accuracy target may include a condition that a decomposition accuracy may stay below (may not exceed) a predefined accuracy threshold E. Alternatively, or in conjunction, the decomposition sampling overhead target may include a condition that a decomposition sampling overhead may stay below (may not exceed) a predefined sampling overhead threshold $\eta$. In some embodiments, the decomposition sampling overhead target may include a condition that the quasi-probability norm may be less than a predefined sampling overhead threshold $\eta$, i.e., $W \leq \eta$.

The method 100 may comprise a step of implementing 140 the quasi-probability decomposition on the quantum processor. The step of implementing 140 the quasi-probability decomposition may be in order to estimate an outcome of an ideal quantum circuit wherein the ideal version $G_0$ of the quantum logic operation G replaces at least one occurrence of the quantum logic operation G. In particular, the step of implementing 140 the quasi-probability decomposition may be in order to estimate the outcome of the quantum circuit in which $G_0$ replaces G preferably for each occurrence of G in said quantum circuit. The step of implementing 140 the quasi-probability decomposition may include running on the quantum processor quantum logic operations that are included in the set of base operations $\{B_p\}$ 121.

In some embodiments, the step of implementing 140 the quasi-probability decomposition may comprise randomly sampling operations from the set of basis operations $\{B_p\}$ 121. Sampling the set of basis operations may include computing a set (i.e., a list) of operations, wherein said operations may be selected from the set of basis operations $\{B_p\}$ 121. This set (list) of operations may include several occurrences of the same basis operation. The sampling may be based on the set of coefficients $\{c_p\}$. In some embodiments, the sampling may be according to a probability distribution defined by probabilities, or weights, $$w_p = \frac{|c_p|}{W},$$

wherein $W=\Sigma_p|c_p|$. In some embodiments, the sampling may be performed for each occurrence of the quantum logic operation G in the quantum circuit e.g., a corresponding set may be compiled for each occurrence of the quantum logic operation G in the quantum circuit. Sampling the set of basis operations $\{B_p\}$ 121 may be in order to obtain a set of sampled circuits. The set of sampled quantum circuits may be determined by replacing the at least one occurrence of the quantum logic operation G in the quantum circuit by one sampled operation from the corresponding set of sampled operations. The step of implementing 140 the quasi-probability decomposition may further include running a set of sampled quantum circuits on the quantum processor. The running of the sampled quantum circuits may be in order to obtain sampled quantum circuit outcomes. The step of implementing 140 the quasi-probability decomposition may further comprise estimating the outcome of the ideal quantum circuit based on the sampled quantum circuit outcomes. In some embodiments, the replacing of at least one occurrence of the quantum logic operation G in the quantum circuit may be performed by replacing each occurrence of the quantum logic operation G by a sample from the corresponding set of basis operations.

In some embodiments, the method 100 may include computing a statistical error of the estimated ideal operation outcome.

In some embodiments, the method 100 may comprise a step of characterizing errors (not shown). The step of characterizing errors may comprise obtaining a characterization of errors in the quantum logic operation G, in order to find an error model of the quantum logic operation G. In other words, the quantum logic operation G may be characterized in order to find how it deviates from the ideal version $G_0$. The characterization step may comprise obtaining a characterization of errors in at least one of the basis operations $\{B_p\}$, in order to find an error model for (at least one of) the basis operations $\{B_p\}$. The characterization of (at least one of) the basis operations $\{B_p\}$ may comprise obtaining a characterization of errors in at least one mitigation operation in the set $\mathcal{S}$. The characterization of errors in the quantum logic operation G, the set of basis operations $\{B_p\}$, or the mitigation operations $\mathcal{S}$ may be required if the error-models of these may not already be known to sufficient detail or accuracy, e.g., the quantum processor is yet to be (sufficiently) characterized, or if noise in the processor is suspected to have changed since the latest characterization due to e.g. naturally occurring fluctuations or drift, or technical changes, such as re-calibration. The characterization step may utilize, for example, characterization protocols such as randomized-benchmarking, cycle-benchmarking, process tomography, state tomography, measurement tomography or gate set tomography. In some embodiments, the characterization may comprise training the coefficients of the QP decomposition. That is, a model of the noise may be found using an iterative process of refinement of a candidate model. The iterative process may use techniques such as machine-learning tools, and may use known-outcome noise-sensitive circuits. The known-outcome noise-sensitive circuits may be referred to as training circuits, or characterization circuits.

The method 100 may be extended to a quantum circuit comprising multiple quantum logic operations $\{G^{[q]}\}$, having corresponding ideal versions $$\{G_0^{[q]}\}.$$

Extending the method 100 may be summarized as repeating the method 100 for each $G^{[q]}$. The computing 110 may be repeated for each $G^{[q]}$, that is, decompositions $$G_0^{[q]} \approx \sum_p c_p^{[q]} B_p^{[q]}$$

may be computed, where each $$G_0^{[q]}$$

may be approximated by a (corresponding) linear combination of operations taken from a set of basis operations $$\{B_p^{[q]}\}$$

121. The set of basis operations $$\{B_p^{[q]}\}$$

121 may, in some embodiments, be different for each $G^{(q)}$. For each $G^{[q]}$, the decomposition 120 may be computed so as to reach a decomposition target 130 (e.g., as described above), where the decomposition target 130 may or may not depend on any specific feature or characteristic of the $G^{[q]}$. The step 140 of implementing the quasi-probability decompositions may be performed in order to estimate an outcome of an ideal quantum circuit wherein the ideal versions $$\{G_0^{[q]}\}$$

replace the corresponding $\{G^{[q]}\}$. In embodiments where sampled quantum circuits may be used, the sampled quantum circuits may be determined by replacing the at least one occurrence (and preferably each occurrence) of at least one of (and preferably each of) the quantum logic operation $G^{[q]}$ in the quantum circuit by one sampled operation of the corresponding set of sampled operations. In some embodiments, recompiling of the sampled operations may be performed. The recompiling may comprise replacing adjacent operations (that should be run immediately one after the other) by equivalent operations, in order to reduce the number of operations that may be run on the quantum processor. For example, if two layers of single qubit gates are adjacent, they may be replaced by a single, equivalent layer of single qubit gates. For another example, if an $X_\pi$ operation operating on a qubit (included in a first mitigation operation) is adjacent to a $Y_\pi$ operation operating on the same qubit (included in a second mitigation operation), they may be replaced by a $Z_\pi$ operation operating on that qubit.

FIG. 2A depicts further properties of the set of mitigation operations $\mathcal{S}$ 210 in some embodiments of the present disclosure. In some embodiments, the set of mitigation operations $\mathcal{S}$ 210 may exclude mid-circuit measurements 215. In some embodiments, the set of mitigation operations $\mathcal{S}$ 210 may exclude adaptive operations 217. An adaptive operation 217 is a quantum gate controlled by classical logic applied to the result of a mid-circuit measurement. For example, a reset operation may be implemented by a classically controlled $X_\pi$ gate, that may be applied to a qubit if after mid-circuit measurement of that qubit in the computational basis, the outcome of measurement is $|1\rangle$. In some embodiments, the set of mitigation operations $\mathcal{S}$ 210 may exclude reset operations 220. In some embodiments, the set of mitigation operations $\mathcal{S}$ may exclude post-selected measurements 222, which may be performed mid-circuit or at the end of a quantum circuit. Post-selection corresponds to discarding the output of a quantum circuit based on the result of a (mid-circuit or final) measurement. In some embodiments, the set of mitigation operations $\mathcal{S}$ 210 may exclude any ideally-non-unitary quantum logic operations 230. Ideally non-unitary quantum logic operations 230 generalize mid-circuit measurements 215, adaptive operations 217, reset operations 220, and post-selected measurements 222. In some embodiments, the set of mitigation operations $\mathcal{S}$ 210 may exclude (ideally) identity operations, such as idling gates 230. Excluding identity operations 230 may prevent redundancy between the types of base operations (see FIG. 1 for depiction of the types of base operations). For example, if the identity operation 230 may be included, the base operation type $\mathcal{S}_3 G \mathcal{S}_4$ 125 may overlap with the base operation types $G\mathcal{S}_i$ 123 and $\mathcal{S}_2 G$ 124. Such overlap may not be wanted, as it adds degrees-of-freedom to the computations without adding value, thus merely burdening the computation of quasi-probabilities $\{c_p\}$. In some embodiments, the set of mitigation operations $\mathcal{S}$ 210 may exclude multi-qubit operations 235, that is, the mitigation operations are layers or more generally sub-circuits consisting of only single-qubit operations. In some other embodiments, the set of mitigation operations $\mathcal{S}$ 210 may include multi-qubit operations.

FIG. 2B illustrates further properties of the set of mitigation operations $\mathcal{S}$ and the sets $\mathcal{S}_1, \ldots, \mathcal{S}_5$ in some embodiments of the present disclosure. In some embodiments, at least one of the sets $\mathcal{S}_1, \ldots, \mathcal{S}_5$ may include about $10^n$ elements (different operations) or more 240. Here, n is the number of qubits on which G is assumed to act on. This includes qubits on which G is ideally meant to act non-trivially, and additional qubits on which G is known or assumed to un-intentionally act on due to noise (i.e. cross-talk). Preferably, the (about) $10^n$ elements or more may be linearly independent. Preferably, each of the sets $\mathcal{S}_1, \ldots, \mathcal{S}_5$ may have about $10^n$ elements or more. As described above, ideally-non-unitary operations and multi-qubit operations may, in some embodiments, be excluded from the sets $\mathcal{S}_1, \ldots, \mathcal{S}_5$. Thus, when G is applied on a single qubit, the operations that are included in each of the sets $\mathcal{S}_1, \ldots, \mathcal{S}_5$ may span at most a 10-dimensional vector-space, instead of the full 16-dimensional space of single-qubit quantum operations. For more than one qubit, the dimension may be at most $10^n$ instead of $16^n$. In some embodiments, at least one of the sets $\mathcal{S}_1, \ldots, \mathcal{S}_5$ may have linearly dependent elements, that is, span a vector space having a dimension lower than the number of elements 245. To note, the linear dependence is defined in terms of super-operators, as described hereinabove. Having linearly dependent set(s) $\mathcal{S}_1, \ldots, \mathcal{S}_5$ may have the benefit of allowing for (affine-spaces of) degenerate quasi-probability decompositions $$c_p \neq c'_p$$

generating the same mitigated operation $$G_{QP} = \sum_p c_p B_p = \sum_p c'_p B_p$$

(and in particular having the same decomposition accuracy), which can be used to minimize the decomposition sampling overhead for a fixed mitigated operation $G_{QP}$. In some embodiments, some of the mitigation operations may (ideally) be supported on up to a predefined number of qubits r 250, or in other words, can be decomposed as a tensor product of an identity operation on n−m qubits and a non-identity operation (non-trivial operation) on m≤r qubits. In some embodiments, each of the operations in the sets $\mathcal{S}_1, \ldots, \mathcal{S}_5$ may operate non-trivially on up to the predefined number of qubits r, and at least one of the sets $\mathcal{S}_1, \ldots, \mathcal{S}_5$, preferably each of the sets $\mathcal{S}_1, \ldots, \mathcal{S}_5$, may include at least about $$\binom{n}{r} 10^r$$

linearly independent operations 255. The restriction of the mitigation operations to operate on up to r qubits may be motivated by the physical implementation of the quantum processor, for example, if qubits are physically arranged on the vertices of some planar graph, a nearest-neighbor model of unwanted interactions (cross-talk) on the edges of that graph may be assumed. More generally, the interaction between qubits can be represented by a hypergraph. The vertices of the interaction hypergraph may represent the qubits in the QPU, while the hyperedges may correspond to subsets of multiple qubits that may interact, or are suspected to be interacting (via implementation errors, or crosstalk). In some embodiments, the interaction hypergraph may be specified by a user. In some embodiments, the hypergraph may be defined such that hyperedges correspond to subsets of multiple qubits on which native multi-qubit gates exist in the QPU. Given an interaction hypergraph, the set $\mathcal{S}$ may be restricted to include mitigation operations supported within hyperedges. Another motivation for restricting to r-qubit mitigation operations $\mathcal{S}$ 210 is the size of the set $\mathcal{S}$, and hence the number of coefficients $c_p$. If each mitigation operation may operate on up to r qubits, the number of coefficients $\{c_p\}$ may be polynomial in n rather than exponential in n, and the problem of computing the optimal coefficients may remain tractable for large n.

Figure 3C:
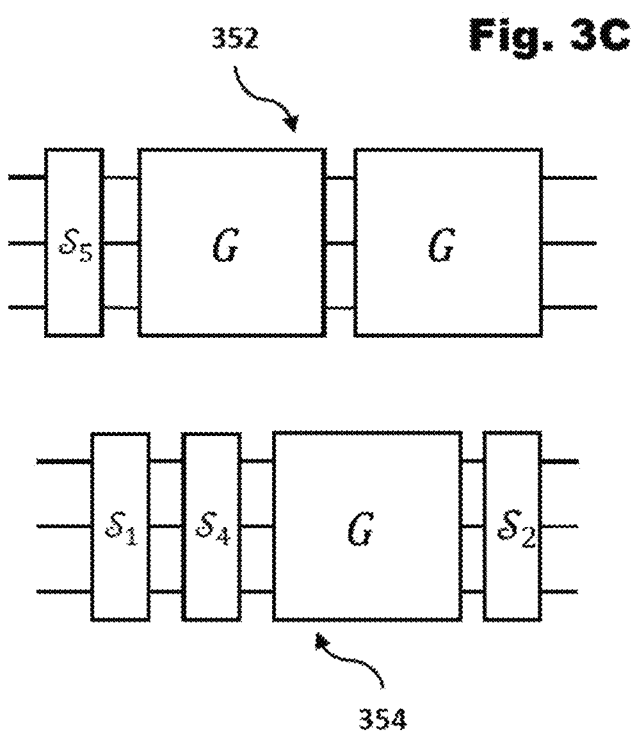

FIG. 3A-3E illustrate further features that the quantum logic operation G, and the set of basis operations $\{B_p\}$, may assume in some embodiments of the present disclosure. With reference to FIG. 3A, in some embodiments, the quantum logic operation G 305 may be a layer of gates acting on non-overlapping sets of qubits (i.e., quantum gates that can by compiled to act in parallel), e.g., having a single-qubit gate $\hat{\alpha}$ 306 acting in parallel to the two-qubit gate $\hat{\beta}$ 307 where both $\hat{\alpha}$ and $\hat{\beta}$ act in parallel to a three-qubit gate $\hat{\delta}$ 308.

With reference to FIG. 3B, in some embodiments, the ideal version of the quantum logic operation $G_0$ 310 may comprise gates 315 that may be non-Clifford, i.e., the unitary operator that represents the gate my not be included in the Clifford group 316. As indicated above, the Clifford group $\mathcal{C}_n$ is the group of unitary matrices that map the Pauli group to itself, when acting via the similarity transformations. The Pauli group $\mathcal{P}$ on n qubits is the group of matrices generated by the set of $4^n$ 'Pauli strings' $\mathcal{P}_s$, which are tensor products of the four single-qubit Pauli matrices (including the identity). Elements of the Pauli group are Pauli strings up to multiplication by a phase $\pm i$ or $\pm 1$.

With reference to FIG. 3C, in some embodiments, the set of basis operations $\{B_p\}$ may include subcircuits $B_p$ constructed from any number of occurrences of the quantum logic operation G and any number of mitigation operations chosen from the set of mitigation operations $\mathcal{S}$. That is, including types, or subcircuit structures, having two or more occurrences of the quantum logic operation G or having two or more mitigation operations, that are not of the types described hereinabove (i.e., those shown in FIG. 1). For example, a basis operation 352 may consist of two consecutive applications of the quantum logic operation G preceded by operations from the set $\mathcal{S}$. The basis operation 354 may consist of two consecutive applications of operations from the set $\mathcal{S}$, followed by application of the quantum logic operation G followed by another operation from the set $\mathcal{S}$. In yet another example, a basis operation (not shown) may consist of two consecutive applications of mitigation operations included in the set $\mathcal{S}$. In some embodiments, the subcircuits $B_p$ may be restricted in size by requiring that a certain metric of the subcircuit, such as subcircuit depth or volume, may be less than a predefined threshold. The sub-circuit depth may be defined as the number of layers in the sub-circuit, while the sub-circuit volume may be defined as the total number of gates in the sub-circuit. For example, assuming each operation in the figure corresponds to a single layer, the subcircuit 352 has a depth of 3, while the subcircuit 354 has a depth of 4. Certain characteristics of layers or gates may be incorporated into these metrics, e.g. only multi-qubit gates or layers of multi-qubit gates may be counted. For example, if the mitigation operations in $\mathcal{S}$ are layers of single-qubit gates, which are ignored in the definition of the depth, while G involves one multi-qubit operation, then the subcircuit 354 has a depth of 2, while the subcircuit 352 has a depth of 1.

Figure 3D:
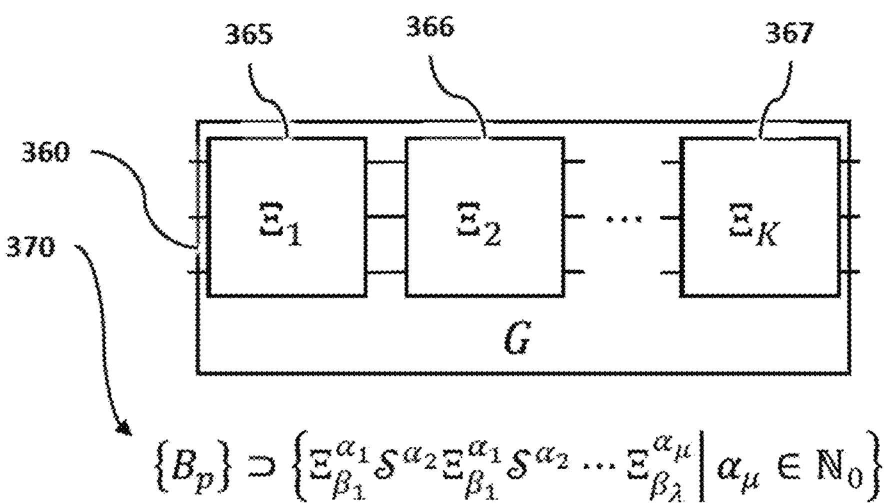

With reference to FIG. 3D, in some embodiments, the quantum logic operation G 360 may be a sub-circuit given by a sequence of sub-operations, that is, $G=\Xi_K \ldots \Xi_1$. In other words, the quantum logic operation G 360 may consist of an operation $\Xi_1$ 365, followed by an operation $\Xi_2$ 366 etc. where the last operation may be $\Xi_K$ 367. The set of basis operations $\{B_p\}$ may include subcircuits (see hereinabove regarding FIG. 3C) that may comprise one or more operations $\Xi_1, \ldots, \Xi_K$ included in said sequence of sub-operations and may comprise one or more operations included in the set of mitigation operations $\mathcal{S}$ 370. In other words, comparing the set of basis operations $\{B_p\}$ to a "language", the subcircuits $B_p$ may be seen as "words", formed from an "alphabet" consisting of operations included in the union of the set of mitigation operations $\mathcal{S}$ and $\{\Xi_1, \ldots, \Xi_K\}$. $\alpha_1, \ldots \alpha_\mu$ may denote the number of consecutive applications of an operation and $\beta_1 \ldots \beta_\lambda$ may denote indexing of $\{\Xi_1, \ldots, \Xi_K\}$ so that $\beta_1$ may represent the first (applied earliest) sub-operation included in a subcircuit included in $\{B_p\}$, $\beta_2$ the second sub-operation included in a subcircuit included in $\{B_p\}$ and so on up to $\beta_\lambda$ that may be the last sub-operation included in a subcircuit included in $\{B_p\}$.

To note, the quantum logic operation G 360 can, in some embodiments, consist of a single sub-operation (e.g., an operation natively available for the QPU). If the quantum logic operation G 360 includes any two sub-operations $\xi_1, \xi_2$ that may operate in parallel, the combined operation $\xi_1 \otimes \xi_2$ can be represented as: $(\xi_1 \otimes I)\cdot(I \otimes \xi_2)$. This representation trivially extends to three or more sub-operations that may operate in parallel. Therefore, it is noted that any quantum logic operation can be given by a sequence of sub-operations.

Twirling and Restricted Pauli Twirl

Assuming both the operation G and the mitigation operations in $\mathcal{S}$ are (ideally) unitary, a multi-type basis constructed from G and $\mathcal{S}$ will not allow for the efficient mitigation of the non-unital, or trace non-preserving, errors included in the error generator $L_b$, see Eq. 5. More generally, a chosen basis $\mathcal{B}$ may not (efficiently) span the space of all n-qubit super-operators, resulting in certain types of errors that cannot be (efficiently) mitigated. In this scenario, it is useful to restrict the noise channel to be mitigated, which is commonly done by 'twirling' the noisy gate. In some embodiments, the quantum logic operation G 320 may be twirled. Mathematically speaking, twirling may be seen as 'averaging over a group action', further elaborated hereinbelow.

Given the super-operator representation $g \mapsto \hat{g}=g\cdot g^\dagger$ of a subgroup $\mathcal{G} \subset U(n)$ (where $\hat{g}$ acts on density-operators by $\rho \mapsto g\rho g^\dagger$), the corresponding twirl is a 'super-duper operator' (an operator that maps super-operators to super-operators):

$$A \mapsto tw_{\mathcal{G}}(A) = \frac{1}{|\hat{\mathcal{G}}|} \sum_{\hat{g} \in \hat{\mathcal{G}}} \hat{g} A \hat{g}^{-1}, \tag{7}$$

where, $\hat{\mathcal{G}}=\{\hat{g} | g \in \mathcal{G}\}$ is the image of the representation. This is mathematically useful since $\mathbf{tw}_{\mathcal{G}}(A)$ commutes with every $\hat{g} \in \hat{\mathcal{G}}$ an therefore has a simple form in terms of irreducible representations, due to Schur's lemma and its generalizations. The most well-known example in the context of quantum computing is the case where $\mathcal{G}=\mathcal{C}_n$, that is, $\mathcal{G}$ is the Clifford group. In this example, $\mathbf{tw}_{\mathcal{C}}(A)$ is a depolarizing channel for any trace-preserving A, a fact that forms the mathematical basis for randomized benchmarking (RB).

When twirling with the Pauli group, that is, $\mathcal{G}=\mathcal{P}_n$ the twirled operation $\mathbf{tw}_{\mathcal{P}}(A)$ is a Pauli channel, i.e., a diagonal super-operator, in both Pauli and Choi bases for super-operators. The Pauli basis is given by super-operators $|P\rangle\rangle\langle\langle Q|$ acting on density operators by $\rho \mapsto \mathrm{Tr}(Q\rho)P$, where $P, Q \in \mathcal{P}$ are Pauli strings. The Choi basis is given by super-operators $\chi_{P,Q}=P\cdot Q$ acting by $\rho \mapsto P\rho Q$. Note that $\chi_{P,P}=\hat{P}$ is a Pauli super-operator, and that there's a one-to-one correspondence between the set of $4^n$ Pauli strings $\mathcal{P}$ and the group of Pauli super-operators $\hat{\mathcal{P}}$. Representing a super-operator A in both bases as $$A = \sum_{P,Q \in \mathcal{P}_s} A_{P,Q} |P\rangle\rangle\langle\langle Q| = \sum_{P,Q \in \mathcal{P}_s} A'_{P,Q} \chi_{P,Q},$$

the Pauli twirled super-operator is given by the diagonal parts $$tw_{\mathcal{P}}(A) = \sum_{P\in\mathcal{P}_s} A_{P,P}\,|P\rangle\rangle\langle\langle P| = \sum_{P\in\mathcal{P}_s} A'_{P,P}\,\chi_{P,P}. \tag{5}$$

Assuming $A=e^{L}$ is a trace-preserving error channel, generated by the error-generator L, the generator may be written in the Lindblad basis (closely related to the Choi basis), $$L = \sum_{P\in\mathcal{P}_s-\{I\}} h_P i\,[P,\,\cdot\,] + \sum_{P,Q\in\mathcal{P}_s-\{I\}} \gamma_{P,Q}\left(P\cdot Q - \frac{1}{2}\{QP,\,\cdot\,\}\right),$$

where the sums run over all non-identity n-qubit Pauli strings. Here $h_P$ is a Hamiltonian vector and $\gamma_{P,Q}$ is a dissipation matrix. To first order, Pauli twirling eliminates the Hamiltonian vector and the off-diagonal dissipation matrix in L, $$tw_{\mathcal{P}},(A) = I + tw_{\mathcal{P}}(L) + O\left(L^2\right) = I + \sum_{P\in\mathcal{P}_s-\{1\}} \gamma_{P,P}\left(\hat{P} - \hat{I}\right) + O\left(L^2\right).$$

Consider an ideally-Clifford gate (or layer, or subcircuit) $G=G_0e^{L_b}$, where $G_0\in\mathcal{C}_n$ is the ideal gate and $$L_b = \log\left(G_0^{-1}G\right)$$

is a before-error generator, e.g. a Lindbladian (an after-error generator $$L_a = \log\left(GG_0^{-1}\right)$$

may equally well be used). We refer to $e^{L_b}$ as the before-error, or before-error channel. Denoting $$\hat{P}' = G_0\hat{P}G_0^{-1} \in \hat{\mathcal{P}},$$

$$G_{tw} = \frac{1}{4^n}\sum_{\hat{P}\in\hat{\mathcal{P}}} \hat{P}'G\hat{P} = G_0\frac{1}{4^n}\sum_{\hat{P}\in\hat{\mathcal{P}}} \hat{P}G_0^{-1}G\hat{P} = G_0 tw_{\mathcal{P}}\left(e^{L_b}\right). \tag{8}$$

The operation on the left-hand side may be referred to as the Pauli twirling of the (ideally-Clifford) gate G, and may be implemented by randomly replacing the noisy gate G with $\hat{P}'G\hat{P}$, where $\hat{P}$, viewed as a layer of single-qubit Pauli gates, is uniformly sampled from $\hat{\mathcal{P}}$, assuming Pauli gates are ideal. The latter is a reasonable assumption if e.g., G is a 2-qubit gate, since single-qubit gates, including Pauli gates, are significantly less noisy than two-qubit gates for most types of quantum hardware. Thus, the Pauli twirling of G leads to the Pauli twirling of the before-error, reducing it to a Pauli channel. The latter can be mitigated using a single-type QP basis $\mathcal{B}=G\hat{\mathcal{P}}$, where the set of mitigation operations is the Pauli group, $\mathcal{S}=\hat{\mathcal{P}}$. Mitigation of errors in (ideally) Clifford gates using the above single-type basis may be referred to as 'Clifford mitigation'.

Consider now the n-qubit Pauli-rotation gate $G_0=R_Q(\alpha)$, with generator $Q\in\mathcal{P}$, which is the super-operator corresponding to the operator $e^{i\alpha Q/2}$. For a not a multiple of $\pi/2$, the ideal gate $G_0$ is non-Clifford and $$\hat{P}' = G_0\hat{P}G_0^{-1}$$

is not generally a layer of Pauli gates, or even single-qubit gates. Thus, Pauli twirling of the corresponding noisy gate G may not be possible. However, twirling with Pauli gates $\hat{P}$ such that P commutes with Q, i.e., with the commutant sub-group $\mathcal{P}_Q\subset\mathcal{P}$, is possible in general, $$G_{tw} = \frac{2}{4^n}\sum_{\hat{P}\in\hat{\mathcal{P}}_Q} \hat{P}G\hat{P} = G_0\frac{2}{4^n}\sum_{\hat{P}\in\hat{\mathcal{P}}_Q} \hat{P}e^{L_b}\hat{P} = G_0 tw_{\mathcal{P}_Q}\left(e^{L_b}\right),$$

where $4^n/2=|\mathcal{P}_Q|$. Twirling with the commutant $\mathcal{P}_Q$ may be referred to as a 'restricted Pauli twirl', and leads to a before-error channel of the 2×2 block-diagonal form:

$$\begin{aligned} tw_{\mathcal{P}_Q}(A) &= \sum_{P\in\mathcal{P}_s} (A_{P,P}\,|P\rangle\rangle\langle\langle P| + A_{P,P_Q}\,|P\rangle\rangle\langle\langle P_Q|) \\ &= \sum_{P\in\mathcal{P}_s} \left(A'_{P,P}\chi_{P,P} + A'_{P,P_Q}\chi_{P,P_Q}\right), \end{aligned} \tag{9}$$

where $P_Q$ is the unique Pauli string equal to the product PQ up to a phase ±i or ±1, and it is noted that $(P_Q)_Q=P$. Further noted is that the twirled noise channel has the same non-vanishing entries (P, P) and (P, $P_Q$) in both the Pauli and Choi bases, though the values of these entries are generally different. In the Lindblad basis, the restricted Pauli twirl reduces the Hamiltonian vector to its entry $h_Q$ and the dissipation matrix to its entries $\gamma_{P,P}$ and $\gamma_{P,\bar{P}}$, $$tw_{\mathcal{P}}(L) = h_Q i[Q,\,\cdot\,] + \sum_{P\in\mathcal{P}_s-\{I\}} \gamma_{P,P}\left(\hat{P} - \hat{I}\right) + \sum_{P\in\mathcal{P}_s-\{I,Q\}} \gamma_{P,\bar{P}}\left(P\cdot P_Q - \frac{1}{2}\{P_QP,\,\cdot\,\}\right).$$

An important example is given by n=2 qubit Pauli rotation gates, e.g., $G_0=R_{ZZ}(\alpha)$, where $Q=ZZ=Z\otimes Z$. The super-operator representation $\hat{\mathcal{P}}_{ZZ}$ of the commutant has 8 elements, corresponding to the Pauli strings II, ZZ, XX, YY, XY, YX, IZ, ZI. Twirling with $\hat{\mathcal{P}}_{ZZ}$ leads to an X-shaped super operator (in both Pauli and Choi bases), that is, non-vanishing diagonal and anti-diagonal entries. More explicitly:

$$tw_{\mathcal{P}_{ZZ}}(A)=\begin{pmatrix} A_{1,1} & 0 & 0 & \dots & \dots & 0 & 0 & A_{1,16} \\ 0 & A_{2,2} & 0 & \dots & \dots & 0 & A_{2,15} & 0 \\ 0 & 0 & \ddots & 0 & 0 & \iddots & 0 & 0 \\ \vdots & \vdots & 0 & A_{8,8} & A_{8,9} & 0 & \vdots & \vdots \\ \vdots & \vdots & 0 & A_{9,8} & A_{9,9} & 0 & \vdots & \vdots \\ 0 & 0 & \iddots & 0 & 0 & \ddots & 0 & 0 \\ 0 & A_{15,2} & 0 & \dots & \dots & 0 & A_{15,15} & 0 \\ A_{16,1} & 0 & 0 & \dots & \dots & 0 & 0 & A_{16,16} \end{pmatrix},$$

in the Pauli basis, where the indices correspond to an alphabetic ordering II, XI, . . . , ZZ of Pauli strings, and similarly in the Choi basis with $$A'_{i,j}$$

in place of $A_{i,j}$. By appropriately permuting rows and columns, the 2×2 block-diagonal structure can be made manifest. In the Lindblad basis, the dissipation matrix has a similar X-shaped form, corresponding to the lower-right 15×15 block of the above matrix.

Thus, twirling of the gate $R_{ZZ}(\alpha)$ with the commutant $\mathcal{P}_{ZZ}$ leads to an X-shaped before-error $\mathbf{tw}_{\mathcal{P}_{ZZ}}(e^{L_b})$, which is (generically) not a Pauli channel. This twirled before-error cannot be mitigated with only before-Pauli-layers ($B_p=G\hat{P}_p$) or even before-single-qubit layers ($B_p=GS_p$). Here comes the benefit of multi-type mitigation, that can handle various non-Pauli before-errors, without using mitigation operations apart from e.g. Pauli layers, as demonstrated hereinbelow.

Generalizing the above example, consider any (ideally-unitary) 2-qubit gate G, which is generically non-Clifford. In the absence of noise, the gate may be written in terms of its 'KAK decomposition', $G_0=\hat{S}_1G_{\alpha,\beta,\gamma}\hat{S}_2$, where $G_{\alpha,\beta,\gamma}$ corresponds to the unitary $$e^{\left(\frac{i}{2}\right)(\alpha XX+\beta YY+\gamma ZZ)},$$

with some parameters $\alpha, \beta, \gamma\in\mathbb{R}$, and $\hat{S}_1$, $\hat{S}_2$ are layers of single-qubit gates. It follows that $$\hat{S}_1^{-1}G\hat{S}_2^{-1}$$

is ideally-equal to $G_{\alpha,\beta,\gamma}$, and may therefore be twirled with the joint commutant $\mathcal{P}$ of Q={II, XX, YY, ZZ}. The super-operator group $\hat{\mathcal{P}}$ has four elements, corresponding to the Pauli strings in Q. A generic noisy 2-qubit gate, parameterized as $G=G_0=G_0e^{L_b}=\hat{S}_1G_{\alpha,\beta,\gamma}\hat{S}_2e^{L_b}$, may therefore be twirled as $$\begin{aligned} G_{fw} &= \frac{1}{4}\sum_{\hat{P}\in\hat{\mathcal{P}}_Q}\left(\hat{S}_1\hat{P}\hat{S}_1^{-1}\right)G\left(\hat{S}_2^{-1}\hat{P}\hat{S}_2\right) \\ &= G_0\frac{1}{4}\sum_{\hat{P}\in\hat{\mathcal{P}}_Q}\left(\hat{S}_2^{-1}\hat{P}\hat{S}_2\right)e^{L_b}\left(\hat{S}_2^{-1}\hat{P}\hat{S}_2\right) \\ &= G_0tw_{S_2^{-1}\mathcal{P}_QS_2}\left(e^{L_b}\right). \end{aligned}$$

A general $\mathcal{P}$-twirled super-operator takes the 4×4 block-diagonal form $$\begin{aligned} tw_{\mathcal{P}_Q}(A) &= \sum_{P\in\mathcal{P}_s,Q\in Q}A_{P,P_Q}\,|P\rangle\rangle\langle\langle P_Q| \\ &= \sum_{P\in\mathcal{P}_s,Q\in Q}A'_{P,P_Q}\chi_{P,P_Q}, \end{aligned} \qquad (9)$$

and twirling with the rotated group $$S_2^{-1}\mathcal{P}_QS_2$$

results in the same form, in rotated Pauli or Choi super-operator bases, constructed from the operator basis $$S_2^{-1}\mathcal{P}_sS_2.$$

Notably, the above examples of twirling a noisy gate G can naturally be incorporated into the QP method, and are essentially 'free' in terms of the sampling overhead. More generally, this applies to any twirling of G, which may be broadly defined as the replacement of a single noisy operation G with (an expectation value w.r.t) a probability distribution $$G_{tw}=\sum_j a_jG_j$$

over noisy operations $G_j$. Here $G_{tw}$ may be referred to as a 'twirled operation', and $a_j\geq 0$, $\Sigma_j a_j=1$. The noisy operations $G_j$ may correspond to inequivalent implementations of the same ideal operation $G_0$, as in the examples described above, where $$G_j=g_j^{(L)}Gg_j^{(R)}$$

are all ideally-equal to the same operation $G_0$. To apply the QP method, a QP decomposition $G_0\approx\Sigma_pc_pB_p$ may first constructed, assuming the basis elements $B_p$ involve a noisy operation $G_{tw}$ (e.g., Eq. 2 with $G_{tw}$ in place of G). Then, in each basis operation $B_p$, every instance of $G_{tw}$ is replaced with $\Sigma a_jG_j$. This gives a new QP decomposition, but with unchanged QP-norm $W=\|c\|_1$. As an example, assume each $B_p$ involves a single instance of $G_{tw}$. In this case one obtains a product QP decomposition $G_0\approx\Sigma_{p,j}c_pa_jB_{p,j}$, where $B_{p,j}$ is $B_p$ with $G_{tw}$ replaced by $G_j$. The QP-norm is unchanged, $\Sigma_{p,j}|c_pa_i|=\Sigma_p|c_p|\Sigma_j|a_j|=W$. Operationally, when implementing a basis operation $B_p$ as part of the implementation of the QP decomposition $G_0\approx\Sigma c_pB_p$ on the quantum processor, at least one instance of $G_{tw}$ in $B_p$, preferably every instance of $G_{tw}$ in $B_p$, may be replaced with an operation $G_j$, sampled with probability $a_j$.

An implementation of the twirl, as described hereinabove, is illustrated in FIG. 3E. A set of gates $\{g_j\}$, that are ideally-unitary and form a group (subgroup of the unitary group) 330, may be combined with the quantum logic operation G 320 in order to form a set of intermediate operations 325. In some embodiments, the set of gates $\{g_j\}$ may commute 335 with the quantum logic operation G 320. The intermediate operations 325 may be the quantum logic operation G 320 preceded by a gate from the set $\{g_j\}$ and succeeded by the inverse (Hermitian conjugate) of the gate preceding the quantum logic operation G 320. In other words, the set of intermediate operations 325 may be represented by a set of similarity transformations of quantum logic operation G 320, wherein the transformation matrices may form a subgroup of the unitary group. A probability $a_j$ may be assigned to each intermediate operation 340, which defines a twirled operation $G_{tw}$. In each basis operation $B_p$, the quantum logic operation G 320 may be replaced by one of the intermediate operations $$g_j G g_j^\dagger$$

345 with probability $a_j$, forming a modified set of basis operations $\{B_{p,j}\}$, with corresponding QP coefficients $\{c_p a_j\}$ 350.

In a different view, the set of intermediate operations 325 may be combined (by recompilation) with a set of "raw" basis operations, to be included in the set of basis operations $\{B_p\}$. In this view, twirling may be seen as a part in a method of building the set of basis operations $\{B_p\}$.

Computing Multi-Type OP Decompositions

FIG. 4 depicts features of the computation of the decomposition coefficients $\{c_p\}$, for a chosen multi-type basis $\{B_p\}$. In pursuing a decomposition target 410, the computation may include a constraint that the sum of the coefficients may be equal to one, thereby the decomposition may be trace-preserving 420. The computation may include computing the quasi-probability norm 430. Computing the quasi-probability norm 430 may be in order to compute the decomposition sampling overhead. Computing the decomposition sampling overhead may be in order to fulfil the decomposition sampling overhead target. The computation may include optimizing a tradeoff between the accuracy and the quasi-probability norm 440, i.e., a cost function that may depend on the quasi-probability norm and the accuracy, may be minimized. In some embodiments, said optimizing a tradeoff may comprise optimizing the decomposition accuracy by solving a least-squares problem. In some embodiments, said optimizing a tradeoff may comprise minimizing the sampling overhead by solving a linear program. The computation may include computation of a distance measure 450 between the decomposition and the ideal version of the quantum logic operation $G_0$. Exemplary distance measures that may be used to define the accuracy of the decomposition include, but not limited to, the infidelity 460, the Frobenius distance 470, the diamond distance 480, or any of the distance measures induced by the $\ell_p$ operator norms 490.

FIG. 5 shows a flowchart illustrating in detail an algorithm 500 that in some embodiments, may be used to compute the decomposition coefficients $\{c_p\}$. The input 505 to the algorithm may include the before-error generator $$L_b = \log\left(G_0^{-1} G\right)$$

510 and the set of basis operations $\{B_p\}$ 515. The error generator 510 may be provided by characterization of the quantum logic operation G. In embodiments where the quantum logic operation G may be twirled, the error generator $L_b$ 510 may correspond to the twirled error, that is, $$L_b = \log\left[G_0^{-1} G_{tw}\right].$$

In some embodiments, the set of basis operations $\{B_p\}$ 515 may be provided as the set of mitigation operations $\mathcal{S}$, and a list of basis element types, that may be used to construct the set of basis operations 515. In some embodiments, the elements of the set of mitigation operations $\mathcal{S}$ may be assumed ideal. In some embodiments, the set of basis operations $\{B_p\}$ 515 may be provided according to the representation according to Eq. 6, that is, as $$\{B'_p\}.$$

Hereinbelow, we describe an algorithm for choosing the decomposition coefficients $c_p$, given a fixed multi-type basis $\{B_p\}$, and a characterization of the noisy operation $G=G_0 e^{L_b}$ and of the set $\mathcal{S}$ of mitigation operations used to construct $\{B_p\}$. The noisy operation may be twirled, and the corresponding before-error $e^{L_b}$ is in this case the twirled error. In the simplest case the mitigation operations in $\mathcal{S}$ may be assumed to be ideal, but this is not a requirement. The goal may be solving the linear equation Eq. 1 for the set of coefficients $\{c_p\}$, given the error generator $L_b$, 510 and the set of basis operations $\{B_p\}$ 515. A more robust approach may be minimizing an appropriate distance measure between the two sides of Eq. 1. The distance measure may be the Frobenius distance, and minimizing the distance measure may involve solving a least-squares problem:

$$\min_{\{c_p\}} \left\| \sum_p c_p B_p - G_0 \right\|_F, \tag{10.1}$$

or similarly, using the representation of Eq. 4:

$$\min_{\{c_p\}} \left\| \sum_p c_p B'_p - e^{-L_b} \right\|_F. \tag{10.2}$$

The above least-squares problems may be solved as-is only for a small number of qubits, since the vector space of super-operators on n qubits is $16^n$-dimensional. In order to obtain a least-squares problem with poly(n) complexity, an expansion in $L_b$ to some chosen order may be performed. Assuming locality of $L_b$, the resulting super-operators will then be elements of a subspace with poly(n) dimension.

As an example, the expansion to the first order may be considered, wherein $$e^{-L_b} = I - L_b + O\left(L_b^2\right) \text{ and } G = G_0(I + L_b) + O\left(L_b^2\right).$$

Here, $O(L^k)$ is shorthand for $O(\|L\|^k)$, where $\|\cdot\|$ is a suitable norm on an error generator L. Denoting by index p=0 the basis element corresponding to the noisy gate, $B_0=G$ (or $$B'_0 = I),$$

the coefficients may satisfy $c_p=\delta_{p,0}+O(L_b)$, since in the absence of noise $G=G_0$ (or $e^{-L_b}=I$). It follows that, to first order, $L_b$ may be set to zero in $B_p$ (or $$B'_p),$$

for $p\neq 0$. Similarly, the errors on the mitigation operations $\mathcal{S}$ in $B_p$ may be ignored. The least-squares problems in Eqns. 10.1-10.2 may then be approximated by:

$$\min_{\{\tilde{c}_p\}}\left\|\sum_p \tilde{c}_p B'_{p,0} + L_b\right\|_F, \tag{11}$$

where $$B'_{p,0}$$

may be the ideal version of $$B'_p,$$

and $\tilde{c}_p=c_p-\delta_{p,0}$. The approximation in Eq. 11 may be referred to as linearization of the least-squares problem. Similarly, a consistent second order expansion of Eq. 10.2 may lead to:

$$\min_{\{\tilde{c}_p\}}\left\|\sum_p \tilde{c}_p B'_{p,1} + L_b - \frac{1}{2}L_b^2\right\|_F,$$

where $$B'_{p,1}$$

may indicate the first order expansion and truncation of $$B'_p$$

in $L_b$ (and in the errors in the mitigation operations $\mathcal{S}$). Expansion to higher orders is possible, and should be chosen according to the decomposition accuracy target. Case studies of the expansion to first order (Eq. 11) are described hereinbelow.

In order to show that the least-squares problem in Eq. 11 may be of complexity poly(n), the error generator $L_b$ may be assumed r-local, that is, may be assumed to be a sum of $k<r$-qubit terms, each term acting in tensor product with the identity on a subset of $n-k$ qubits. The set of qubits on which a k-qubit super-operator A acts non-trivially on may be referred to as the support of A, and may be denoted by supp(A). The set of r-local super-operators forms a vector space $V_r \subset \mathbb{R}^{4^n\times 4^n}$ with poly(n) dimension $$d_r = dim(V_r) = \binom{n}{r}16^r = O(n^r).$$

The expression obtained for $d_r$ is composed of the factor $16^r$ that represents the dimension of the space of r-qubit super-operators supported on any specific subset of r qubits, and the factor $$\binom{n}{r}$$

representing the number of such subsets. Physical considerations may often restrict the subsets of qubits assumed to interact via $L_b$, as may be described by an interaction hypergraph that may be incorporated in the definition of $V_r$. As an example, one may assume that only subsect of qubits on which native multi-qubit gates exist may interact. As a further example, if native 2-qubit gates correspond to the edges of a planar lattice (whose vertices correspond to qubits), the dimension of $V_{r=2}$ may be $d_2=O(n)$ as opposed to $O(n^2)$. In general, physical considerations incorporated in the definition of $V_r$ may significantly reduce $d_r$ below $$\binom{n}{r}16^r.$$

When the assumption of r-local $L_b$ holds, and the expansion is to the first order (Eq. 11), the basis $$\{B'_{p,0}\} = \{B'_{p,0}\}_{p=0}^{d-1}$$

may be restricted to r-local operations, or more generally, r'-local operations with $r'\geq r$. This gives an r'-local basis with $d\leq d_{r'}=O(n^{r'})$ elements. In some embodiments, a further restriction to r'-qubit basis elements may be done. When both the ideal operation $G_0$ and the mitigation operations $\mathcal{S}$ are composed of a small number of layers of few-qubit gates, the locality of each basis element may easily be determined. As an example, if the ideal operation $G_0$ is a layer of m-qubit operations, and the (ideal) mitigation operations $\mathcal{S}$ are layers of single-qubit operations, the types of basis elements $$B'_{p,0}$$

in Eq. 5, and more generally any type of subcircuit constructed from $G_0$ and $\mathcal{S}$ (and $$G_0^1),$$

are all tensor products of m-qubit operations, whose support is simply determined by the supports of the layers involved. Each of these basis elements is an r'-qubit operation, with r' a multiple of m. To simplify the notation, we assume below that r'=r. The algorithm 500 may include a step of constructing a set of basis vectors 520 that may span the relevant sub-space of super-operators. For example, the space $V_r$ may be spanned in the Choi basis: $V_r=\mathrm{span}\{\chi_{P,Q}|\mathrm{supp}(P)\cup\mathrm{supp}(Q)|\leq r\}$. That is, Choi basis elements satisfying $|\mathrm{supp}(P)\cup\mathrm{supp}(Q)|\leq r$. This basis may be ordered as $$\{\chi_{P_q,Q_q}\}_{q=0}^{d_r-1},$$

where $\chi_{P_0,Q_0}=\chi_{I,I}=\hat{I}$ is the identity super-operator.

The algorithm 500 may include a step of generating data for a least squares problem 530. The Choi basis (obtained in the step of constructing a set of basis vectors 520) is orthonormal in the Hilbert-Schmidt inner-product. Thus, Eq. 11 may be rewritten as:

$$\min_{\tilde{c}}\|M\tilde{c}-\tilde{b}\|_2, \tag{12}$$

where $\tilde{c}$ may be the set $\{\tilde{c}_p\}$ represented in a vector form, and where M, $\tilde{b}$ may be expressed as projections on the basis vectors:

$$M_{q,p}=\langle\chi_{P_q,Q_q},B'_{p,0}\rangle\in\mathbb{R}^{d_r\times d},$$

$$\tilde{b}_q=-\langle\chi_{P_q,Q_q},L_b\rangle\in\mathbb{R}^{d_r}.$$

If r-locality may not be assumed, or if $e^{-L_b}$ may not be expanded (approximated to a finite order), Eq. 10.2 may be similarly written, but where A, b may be expressed as:

$$M_{q,p}=\langle\chi_{P_q,Q_q},B'_p\rangle\in\mathbb{R}^{16^n\times d},$$

$$\tilde{b}_q=-\langle\chi_{P_q,Q_q},e^{-L_b}\rangle\{\in\mathbb{R}^{16^n},$$

where q runs over all $16^n$ Choi basis elements. Similar expressions may be written for Eq. 10.1.

The algorithm 500 may include a step of computing the singular value decomposition (SVD) of the matrix M 535. The algorithm 500 may include a step 540 of solving the least squares problem Eq. 12 via $\tilde{c}^{(-1)}=M^{-1}\tilde{b}$, where $M^{-1}$ denotes the pseudo-inverse of M. The pseudo-inverse of A may be computed with the aid of the SVD (obtained in the step of computing the SVD 535). Computing the pseudo-inverse 535 may be numerically sensitive to a tolerance E defining which singular values of M are treated as "zero", i.e., not inverted in computing the pseudo-inverse via the SVD. In some embodiments, the tolerance E may be included in the input to the algorithm 500. The choice of E corresponds to the trade-off between the decomposition accuracy and the sampling overhead involved in constructing QP decompositions (see hereinabove in the description relating to FIG. 4). To demonstrate this, consider a singular value σ so that $0<\sigma<\epsilon$. The corresponding right singular vector v will be treated as an element of the kernel of M, and we discuss the implication of this below. The corresponding left singular vector u will be treated as orthogonal to the image of M, i.e., declared as a noise direction that cannot be mitigated with the chosen basis $\{B_p\}$, potentially leading to an inaccurate QP decomposition, with error $\sim\langle u, L_b\rangle$. Lowering $\epsilon$ such that $\epsilon<\sigma$ leads to a mitigation of the left singular vector, but with potentially large QP coefficients $$\langle c,v\rangle=\frac{\langle u,L_b\rangle}{\sigma},$$

which may lead to a large QP norm, and therefore a potentially large sampling overhead.

The matrix M may have a non-trivial kernel ker(M), that is, one or more singular values that equal zero, or, numerically, are below the threshold E. If M may have a non-trivial kernel, any vector of the form $\tilde{c}^{(-1)}+\zeta$ with $\zeta\in\ker(M)$ solves Eq. 12. The set of all such vectors defines an affine space. The solution $\tilde{c}^{(-1)}$ minimizes the $\ell_2$ norm over this affine space. In other words, denoting $\tilde{b}'=M\tilde{c}^{(-1)}=MM^{-1}\tilde{b}$ as the projection of $\tilde{b}$ onto Image(M), then $\tilde{c}^{(-1)}$ is the solution to:

$$\min_{\tilde{c}:\,A\tilde{c}=\tilde{b}'}\|\tilde{c}\|_2. \tag{13}$$

The algorithm 500 may include a test 550 of whether the $\ell_2$-optimal solution $\tilde{c}^{(-1)}$ (found in the step of computing least-squares 540) is adequate, or optimization of the QP norm is required. In some embodiments, the test may account characteristics of $\tilde{c}^{(-1)}$, for example, by whether the decomposition sampling overhead target may be reached by $\tilde{c}^{(-1)}$ or not. In some embodiments, the decision may be predetermined, i.e., supplied as an input to the algorithm 500, e.g., as a Boolean variable (a value of true may indicate that optimization of the QP norm is required, or vice-versa) or as an enumeration constant.

If the result of the decision 550 is that the $\tilde{c}^{(-1)}$ found is adequate, then the output 580*a* may be the set of coefficients $$c_p=\tilde{c}_p^{(-1)}+\delta_{p,0}.$$

If the result of the test 550 is that the $\tilde{c}^{(-1)}$ found is inadequate, the current goal of the algorithm 500 may be minimizing the QP norm $\|c\|_1=|1+\tilde{c}_{p=0}|+\Sigma_{p\neq 0}|\tilde{c}_p|$ rather than $\|\tilde{c}\|_2$.

The algorithm 500 may include a step of projecting 560, where b may be projected onto Image(A), i.e., $\tilde{b}'=M\tilde{c}^{(-1)}$ may be computed.

The algorithm 500 may include a step of solving a linear program 570. Minimizing the sampling overhead $\|c\|_1$ may be identified as a linear program, and therefore may be solved efficiently (in the dimensions of M). In terms of c, the constraint $M\tilde{c}=\tilde{b}'$ (see Eq. 13) may be written as $Mc=b'$ where $$b'_q=\tilde{b}'_q+M_{q,0}=b_q+\delta_{q,0}.$$

Minimizing the sampling overhead may be expressed as a standard 'basis pursuit' problem:

$$\min_{c:\,Ac=b'}\|c\|_1,$$

that may be mapped to a linear program using the positive and negative parts $$c_p^{\pm} = \Theta(\pm c_p)|c_p|:$$

$$\min_{c^+, c^-} \sum_p \left(c_p^+ + c_p^-\right) \text{ subject to } M(c^+ - c^-) = b',\ c^+ \geqslant 0,\ c^- \geqslant 0.$$

This may be alternatively expressed as:

$$\min_{c^+, c^-} (1\ \ 1) \cdot \begin{pmatrix} c^+ \\ c^- \end{pmatrix} \text{ subject to } (M\ \ -M) \cdot \begin{pmatrix} c^+ \\ c^- \end{pmatrix} = b',\ \begin{pmatrix} c^+ \\ c^- \end{pmatrix} \geqslant \begin{pmatrix} 0 \\ 0 \end{pmatrix},$$

where 0 (1) may denote a column or row vector where all entries are zero (one), and ≥ may denote the element-wise inequality. It is noteworthy that while the linear program may not explicitly account for the non-linear constraint $$\forall\ p:\ c_p^+ c_p^- = 0$$

(each $c_p$ is either positive or negative), this constraint may be satisfied by any solution because the transformation $$c_p^{\pm} \mapsto c_p^{\pm} - \min\left(c_p^+, c_p^-\right)$$

may maintain the constraints of the linear program and lower its cost function $\|c\|_1$ if $$\min\left(c_p^+, c_p^-\right) > 0$$

for some p. The linear program may take an almost identical form in terms of $\tilde{c}$:

$$\min_{\tilde{c}^+, \tilde{c}^-} \tilde{c}_0^+ - \tilde{c}_0^- + \sum_{p \neq 0} \left(\tilde{c}_p^+ + \tilde{c}_p^-\right) \text{ subject to } M\left(\tilde{c}_p^+ - \tilde{c}_p^-\right) = \tilde{b}',\ \tilde{c}^+ \geqslant 0,\ \tilde{c}^- \geqslant 0.$$

To note, the above linear program may be invariant to the transformation $$\tilde{c}_0^{\pm} \mapsto \tilde{c}_0^{\pm} - \min\left(\tilde{c}_0^+, \tilde{c}_0^-\right),$$

which may require applying this transformation to obtained solutions. The benefit of solving the linear program for $\tilde{c}$ instead of $c$ may include better numerical stability since the entries of $\tilde{b}_q$ may satisfy $$\tilde{b}_q' = O(L_b)$$

for all q, whereas $$b_q' = \delta_{q,0} + O(L_b)$$

may contain two scales.

Given a solution $$\tilde{c}_p^* = \tilde{c}_p^+ - \tilde{c}_p^-$$

to the linear program, the output 580*b* may be the set of coefficients $$c_p = \tilde{c}_p^* + \delta_{p,0}.$$

In some embodiments, the algorithm 500 may include sanity checks (not shown in the figure), that is, checks that that results of the intermediate computations and/or final computations may be reasonably considered as correct, by verifying that some general properties, that theoretically must hold, may in fact hold. Sanity checks may be required, for example, due to numerical stability limitations of subroutines that may be incorporated in the algorithm 500. Sanity checks may also help verify that the algorithm 500 is implemented correctly. The sanity checks may include verifying the following properties: (1) $\|\tilde{b}'\|_2 \leq \|\tilde{b}\|_2$ (2) $\|\tilde{c}^*\|_1 \leq \|\tilde{c}^{(-1)}\|_1$ (3) $\|\tilde{c}^*\|_2 \geq \|\tilde{c}^{(-1)}\|_2$ (4) $M\tilde{c}^* = M\tilde{c}^{(-1)} = \tilde{b}'$. In some embodiments, failure of at least one sanity check may trigger an error signal. May any of the sanity checks result in a failure, the failure may be analyzed in order to repeat the algorithm 500 with modified input that may not cause failure of (any of the) the sanity checks.

In some embodiments, the algorithm 500 may include a step of computing performance metrics 590. Performance metrics may estimate how much the performance of the decomposition computed by the algorithm 500 may improve over an existing QP decomposition, or over the performance of the quantum logic operation G, when the decomposition may be implemented on a quantum processor. Given a QP decomposing $G_{QP} = \Sigma c_p B_p$, with QP norm $W = \|c\|_1$, the performance metrics may include:

- Improvement (lowering) of the infidelity $IF_e(G_{QP}, G_0)/IF_e(G, G_0)$,
- Improvement of the Frobenius distance $\|G_{QP} - G_0\|_F / \|G - G_0\|_F$,
- QP norm relative to the minimal QP norm, $W/e^{2IF_e(G,G_0)}$,
- Residual before-error $$L_{b,res} = \log\left(G_0^{-1} \sum\nolimits_p c_p B_p\right).$$

In some embodiments, the algorithm 500 may repeat according to the results 595 of the step of computing performance metrics 590. Repetition of the algorithm 500 may be required if the performance metrics may not be satisfying, e.g., the QP norm may not satisfy the decomposition sampling overhead target, or the distance measures may not satisfy the decomposition accuracy target. In some embodiments, the algorithm 500 may repeat if any of the sanity checks has failed.

In order to further reduce classical computational resources, a divide and conquer modification of the above first-order algorithm may be used. Since $L_b$ is assumed to be r-local, it may be written explicitly as a sum $$L_b = \sum\nolimits_\alpha L_b^{(\alpha)},$$

where each $$L_b^{(\alpha)}$$

is supported on a different subset $\sigma^{(\alpha)}$ of r qubits. A separate QP decomposition may then be considered for each $$L_b^{(\alpha)},$$

denoted $$\sum_p \tilde{c}_p^{(\alpha)} B_{p,0}^{(\alpha)\prime},$$

where $$B_{p,0}^{(\alpha)\prime}$$

are supported on subsets $\Sigma^{(\alpha)} \supseteq \sigma^{(\alpha)}$ of $r' \geq r$ qubits. The first-order problem in Eq. 11 may then be reduced to a polynomial number $$\left( \leq \binom{n}{r'} \right)$$

of r'-qubit problems via the triangle inequality, $$\min_{\{\tilde{c}_p^{(\alpha)}\}_{p,\alpha}} \left\| \sum_\alpha \left( \sum_p \tilde{c}_p^{(\alpha)} B_{p,0}^{(\alpha)\prime} + L_b^{(\alpha)} \right) \right\|_F \leq \sum_\alpha \min_{\{\tilde{c}_p^{(\alpha)}\}_p} \left\| \sum_p \tilde{c}_p^{(\alpha)} B_{p,0}^{(\alpha)\prime} + L_b^{(\alpha)} \right\|_F.$$

Since the sum of Frobenius distances achieved by solutions to the r'-qubit problems on the right-hand side bounds the Frobenius distance of the solution to the full first-order problem on the left-hand side, one may solve the r'-qubit problems using the above algorithm and determine whether the resulting n-qubit QP decomposition $$G_{QP} = G + \sum_\alpha \sum_p \tilde{c}_p^{(\alpha)} B_p^{(\alpha)}$$

is satisfactory in terms of the Frobenius performance metric described above. The QP norm for the n-qubit decomposition may be directly computed and compared to the optimal QP norm. Finally, one may eliminate the need to explicitly compute the before error generator $$L_b = \sum_\alpha L_b^{(\alpha)}$$

which is useful e.g. when working with during error generators) by replacing the linearized problems $$\min_{\{\tilde{c}_p^{(\alpha)}\}_p} \left\| \sum_p \tilde{c}_p^{(\alpha)} B_{p,0}^{(\alpha)\prime} + L_0^{(\alpha)} \right\|_F$$

with their non-linear versions, $$\min_{\{c_p^{(\alpha)}\}} \left\| \sum_p c_p^{(\alpha)} \left[ B_p^{(\alpha)} \right] - \left[ G_0^{(\alpha)} \right] \right\|_F.$$

Here $$\left[ B_p^{(\alpha)} \right] \text{ and } \left[ G_0^{(\alpha)} \right]$$

are defined by removing from the full $$B_p^{(\alpha)}$$

and $G_0$ all ideal and error generators that are not supported within $\Sigma^{(\alpha)}$. This simplifies the construction of each r'-qubit problem, and implies its solution can mitigate errors beyond the first order. Nevertheless, the full QP decomposition $$G + \sum_\alpha \sum_p \left( c_p^{(\alpha)} - \delta_{p,0} \right) B_p^{(\alpha)}$$

may still be a first-order decomposition, since the splitting into r'-qubit problems may only be valid only to first-order, as presented above.

In some embodiments of the present disclosure, it is possible to analytically (i.e., symbolically rather than numerically) solve some of the optimization problems described above, obtaining simple expressions for QP coefficient $c_p$ in terms of e.g. a parameterization of errors in G. In such cases the computation of QP decompositions according to the above algorithms may reduce to plugging said error parameters into said simple expressions.

Two-Step Multitype Mitigation

FIG. 6 shows a flowchart illustrating steps of a broad aspect of a variant computer implemented method 600 for mitigating errors in a quantum circuit, according to embodiments of the present disclosure. The quantum circuit may comprise at least one occurrence of a quantum logic operation G of a quantum processor. The quantum logic operation G may be noisy, that is, suffer implementation errors, including coherent and dissipative errors. The method 600 may comprise a step of computing 610, wherein a set of coefficients $\{c_p\}$ may be computed. The set of coefficients $\{c_p\}$ may be associated with a set of basis operations $\{B_p\}$, that is, for every coefficient $c_p$ there may be a corresponding basis operation $B_p$. The step of computing 610 may comprise computing a quasi-probability decomposition 611 of the ideal version $G_0$ of the quantum logic operation G on a set of basis operations $\{B_p\}$. That is, a decomposition $G_0 \approx \Sigma_p c_p B_p$ where the quantum logic operation G may be approximated by a weighted sum of operations taken from a set of basis operations $\{B_p\}$ 612. The set of basis operations $\{B_p\}$ may include ideally-non-unitary basis operations and may include ideally-unitary basis operations. The decomposition may be computed so as to reach a decomposition target 614 based on a use target of ideally-non-unitary basis operations 616, and at least one of a decomposition accuracy target 618, a decomposition sampling overhead target 619 and a use target of ideally-unitary basis operations 617.

The method 600 may comprise a step of implementing 620 the quasi-probability decomposition on the quantum processor. The step of implementing 620 the quasi-probability decomposition may be in order to estimate an outcome of an ideal quantum circuit wherein the ideal version $G_0$ of the quantum logic operation G replaces the at least one occurrence of the quantum logic operation G. In other words, the step of implementing 620 the quasi-probability decomposition may be in order to estimate the outcome of the quantum circuit in which $G_0$ replaces G. The step of implementing 620 the quasi-probability decomposition may include running on the quantum processor quantum logic operations that are included in the set of base operations $\{B_p\}$.

The decomposition target 614 may include optimizing 615 the decomposition, i.e., a cost function that may depend on any of the sampling overhead, the accuracy, a usage metric of ideally-non-unitary basis operations, and a usage metric of ideally-unitary basis operations, may be minimized. In some embodiments, the optimizing 615 may include minimizing the usage of ideally-non-unitary basis operations. E.g., minimizing the number of ideally-non-unitary basis operations included in the decomposition 611, or minimizing the relative weight of the one or more basis operations included in the decomposition 611, that are ideally-non-unitary. The relative weight of one or more basis operations included in the decomposition 611, may be defined as the sum of absolute values of the coefficients that correspond these basis operations, divided by the quasi-probability norm.

Minimizing the usage of ideally-non-unitary basis operations may comprise computing the quasi-probability decomposition 612, wherein the set of basis operations $\{B_p\}$ may comprise the quantum logic operation G, and basis operations selected from at least two basis operation types. The basis operation types may include the following types: $\{GS_i, S_jG, S_kGS_l, S_m\}$. That is, the base operation types may include the following types:

1. $GS_i$—a quantum operation where the quantum logic operation G may be preceded by quantum operations included in a set of quantum operations $\mathcal{S}_1$,
2. $S_jG$—a quantum operation where the quantum logic operation G may be succeeded by quantum operations included in a set of quantum operations $\mathcal{S}_2$,
3. $S_kGS_l$—a quantum operation where the quantum logic operation G may be both preceded and succeeded by quantum operations included in sets of quantum operations $\mathcal{S}_3$ and $\mathcal{S}_4$, respectively,
4. $S_m$—a quantum operation, included in a set of quantum operations $\mathcal{S}_5$, wherein the quantum logic operation G may be absent.

The union of the sets of quantum operations $\mathcal{S}=\mathcal{S}_1\cup\mathcal{S}_2\cup\mathcal{S}_3\cup\mathcal{S}_4\cup\mathcal{S}_5$ may be referred to as the set of mitigation operations. The set of mitigation operations $\mathcal{S}$ may be a set of layers of single qubit operations. In some embodiments, the set of mitigation operations $\mathcal{S}$ may include only ideally-unitary operations 612*a*, that is, exclude ideally-non-unitary operations.

Minimizing the usage of ideally-non-unitary basis operations may further comprise computing a set of complimentary coefficients $\{\check{c}_q\}$ associated with a set of complimentary basis operations $\{\check{B}_q\}$ to obtain a quasi-probability decomposition for the residual error $G_0-\Sigma_p c_p B_p \approx \Sigma_q \check{c}_q \check{B}_q$ 613, wherein the set of complimentary basis operations $\{\check{B}_q\}$ includes ideally-non-unitary operations 613*a*. The set of complimentary basis operations $\{\check{B}_q\}$ may form a multi-type basis, constructed from the quantum logic operation G and elements of a complementary set of mitigation operations $\check{\mathcal{S}}$. In some embodiments, the set of complimentary basis operations $\{\check{B}_q\}$ may comprise the quantum logic operation G and basis operations selected from at least two basis operation types from the following basis operation types $GS_i$, $S_jG$, $S_k GS_l$, $S_m$, where $S_i, \ldots, S_m$ may be included in a complementary set of mitigation operations $\check{\mathcal{S}}$. In other words, set of complimentary basis operations $\{\check{B}_q\}$ may include the same types of basis operations as of set of base operations $\{B_p\}$. The difference between the sets $\{B_p\}$, $\{\check{B}_q\}$ may be that the set of complimentary basis operations $\{\check{B}_q\}$ may be constructed from elements of the complementary set of mitigation operations $\check{\mathcal{S}}$, instead of elements of the set of mitigation operations $\mathcal{S}$.

In some embodiments, the step of implementing 620 the quasi-probability decomposition may comprise randomly sampling 622 the set of basis operations $\{B_p\}$, that is, compiling a set (i.e., a list) of operations, wherein said operations may be selected from the set of basis operations $\{B_p\}$. This set (list) of operations may include several occurrences of the same basis operation. The sampling 622 may be based on the set of coefficients $\{c_p\}$. In some embodiments, the sampling 622 may be according to a probability distribution defined by probabilities, or weights, $$w_p = \frac{|c_p|}{W},$$

wherein $W=\Sigma_p|c_p|$. In some embodiments, the sampling 622 may be for each occurrence of the quantum logic operation G in the quantum circuit e.g., a corresponding set may be compiled for each occurrence of the quantum logic operation G in the quantum circuit. In embodiments that include a set of complimentary coefficients $\{\check{c}_q\}$(associated with a set of complimentary basis operations $\{\check{B}_q\}$), the sampling 622 may include sampling the set of complimentary basis operations $\{\check{B}_q\}$. In such embodiments, sampling the set of basis operations $\{B_p\}$ may be according to a probability distribution defined by weights $$w_p = \frac{|c_p|}{W' + W},$$

and sampling the set of complimentary basis operations $\{B_q\}$ may be according to a probability distribution defined by weights $$w'_p = \frac{|\check{c}_q|}{W' + W},$$

wherein $W'=\Sigma_q|\check{c}_q|$. In other words, the method may include a step of implementing the quasi-probability decomposition for the residual error on the quantum processor. Implementing the quasi-probability decomposition for the residual error may be performed in order to refine the estimate of the outcome of an ideal quantum circuit. Implementing the quasi-probability decomposition for the residual error may be performed as a step separate from the step of implementing 620 the quasi-probability decomposition, or may be performed concurrently to the step of implementing 620 the quasi-probability decomposition (e.g., sampled basis operations $B_p$ and $\check{B}_q$ may be run intermixed in a random order). In embodiments that include sampling the set of complimentary basis operations $\{\check{B}_q\}$, and minimizing the usage of ideally-non-unitary basis operations comprises minimizing the relative weight of basis operations (included in the decomposition 611) that are ideally-non-unitary, minimizing this relative weight is equivalent to minimizing the probability that ideally-non-unitary basis operations may be sampled.

The step of implementing 620 the quasi-probability decomposition may further include running 626 a set of sampled quantum circuits on the quantum processor. The set of sampled quantum circuits may be determined by replacing 624 the at least one occurrence of the quantum logic operation G in the quantum circuit by one sampled operation of the corresponding set of sampled operations. The running 626 of the sampled quantum circuits may be in order to obtain sampled quantum circuit outcomes. The step of implementing 620 the quasi-probability decomposition may further comprise estimating 628 the outcome of the ideal quantum circuit based on the sampled quantum circuit outcomes. In some embodiments, the replacing 624 of at least one occurrence of the quantum logic operation G in the quantum circuit may performed by replacing each occurrence of the quantum logic operation G by a sample from the corresponding set of basis operations.

In some embodiments, the method 600 may include computing a statistical error of the estimated ideal operation outcome.

In some embodiments, the method 600 may comprise a step of characterizing (not shown). The step of characterizing may comprise obtaining a characterization of errors in the quantum logic operation G, in order to find an error model of the quantum logic operation G. In other words, the quantum logic operation G may be characterized in order to find how it is deviating from the ideal version $G_0$. The step of characterizing may comprise obtaining a characterization of errors in at least one basis operation of the set of basis operations $\{B_p\}$, in order to find the error model for the (at least one) basis operations $\{B_p\}$. The step of characterizing may comprise obtaining a characterization of errors in at least one operation included in the set of mitigation operations $\mathcal{S}$. In embodiments that include a set of complimentary basis operations $\{\check{B}_q\}$, the step of characterizing may include a characterization of errors in at least one basis operation of the set of complimentary basis operations $\{\check{B}_q\}$. The characterization of errors in the quantum logic operation $\mathcal{S}$ G, the set of basis operations $\{B_p\}$, the set of complimentary basis operations $\{\check{B}_q\}$, or the mitigation operations may be required if the error-models of these may not already be known to sufficient detail or accuracy, e.g., the quantum processor is yet to be (sufficiently) characterized, or if noise in the processor is suspected to have changed since the latest characterization due to e.g. naturally occurring fluctuations or drift, or technical changes, such as re-calibration. The characterization step may utilize, for example, characterization protocols such as randomized-benchmarking, cycle-benchmarking, process tomography, state tomography, measurement tomography or gate set tomography. In some embodiments, the characterization may comprise training the coefficients of the QP decomposition. That is, a model of the noise may be found using an iterative process of refinement of a candidate model. The iterative process may use techniques such as machine-learning tools, and may use known-outcome noise-sensitive circuits. The known-outcome noise-sensitive circuits may be referred to as training circuits.

The method 600 may be extended to multiple quantum logic operations $\{G^{[\beta]}\}$, having corresponding ideal versions $$\{G_0^{[\beta]}\}.$$

Extending the method 600 may be summarized as repeating the method 600 for each $G^{(\beta)}$. The computing 610 may be repeated for each $G^{[\beta]}$, that is, decompositions $$G_0^{[\beta]} \approx \sum_p c_p^{[\beta]} B_p^{[\beta]}$$

may be computed, where each $$G_0^{[\beta]}$$

may be approximated by a (corresponding) weighted sum of operations taken from a set of basis operations $$\{B_p^{[\beta]}\}.$$

In embodiments that include a set of complimentary coefficients $\{\check{c}_q\}$(associated with a set of complimentary basis operations $$\{\check{B}_q^{[\beta]}\}),$$

decompositions $$G_0^{[\beta]} - \sum_p c_p^{[\beta]} B_p^{[\beta]} \approx \sum_q \check{c}_q^{[\beta]} \check{B}_q^{[\beta]}$$

may be computed. The sets of basis operations $$\{\check{B}_p^{[\beta]}\}$$

(and the set of complimentary basis operations $$\{\check{B}_q^{[\beta]}\})$$

may, in some embodiments, differ for each $G^{[\beta]}$. For each $G^{[\beta]}$, the decomposition 611 may be computed so as to reach a decomposition target 614 (e.g., as described above), where the decomposition target 614 may or may not depend on any specific feature or characteristic of the $G^{[\beta]}$. The step of implementing 620 the quasi-probability decompositions may be in order to estimate an outcome of an ideal quantum circuit wherein the ideal versions $$\{G_0^{[\beta]}\}$$

replace at least one of, and preferably all, the corresponding $\{G^{[\beta]}\}$.

In some embodiments, the set of basis operations $\{B_p\}$ may further include subcircuits $B_p$. The subcircuits $B_p$ may include two or more occurrences of the quantum logic operation G, or include two or more mitigation operations chosen from the set of mitigation operations $\mathcal{S}$. In some embodiments, the set of complementary basis operations $\{\check{B}_q\}$ may further include subcircuits $B_q$. The subcircuits $\check{B}_q$ may include two or more occurrences of the quantum logic operation G, or include two or more mitigation operations chosen from the complementary set of mitigation operations $\check{\mathcal{S}}$.

Further features that some embodiments of the method 600 may assume, may be found hereinabove in the description relating to FIGS. 2A-5. To note, features that the set of basis operations $\{B_p\}$ may assume, can be assumed by the set of complimentary basis operations $\{\check{B}_q\}$, apart from excluding any (in the sense of all) ideally-non-unitary operations. For example, the set of complimentary basis operations $\{\check{B}_q\}$ may be r-local, or may exclude post-selection operations.

The method 600 may be generalized. Instead of the distinction between unitary operations and nonunitary operations, operations may be distinguished as 'easy' and 'hard'. 'Easy' operations are preferred over 'hard' operations. That is, for example, it is preferred that the probability to sample a 'hard' operation is minimized. This generalization is well understood on the basis that while in one QPU some operations may have negligible noise (or generally, not resource intensive), the same operations on a different QPU may be very noisy (or even unavailable natively).

Figure 7:
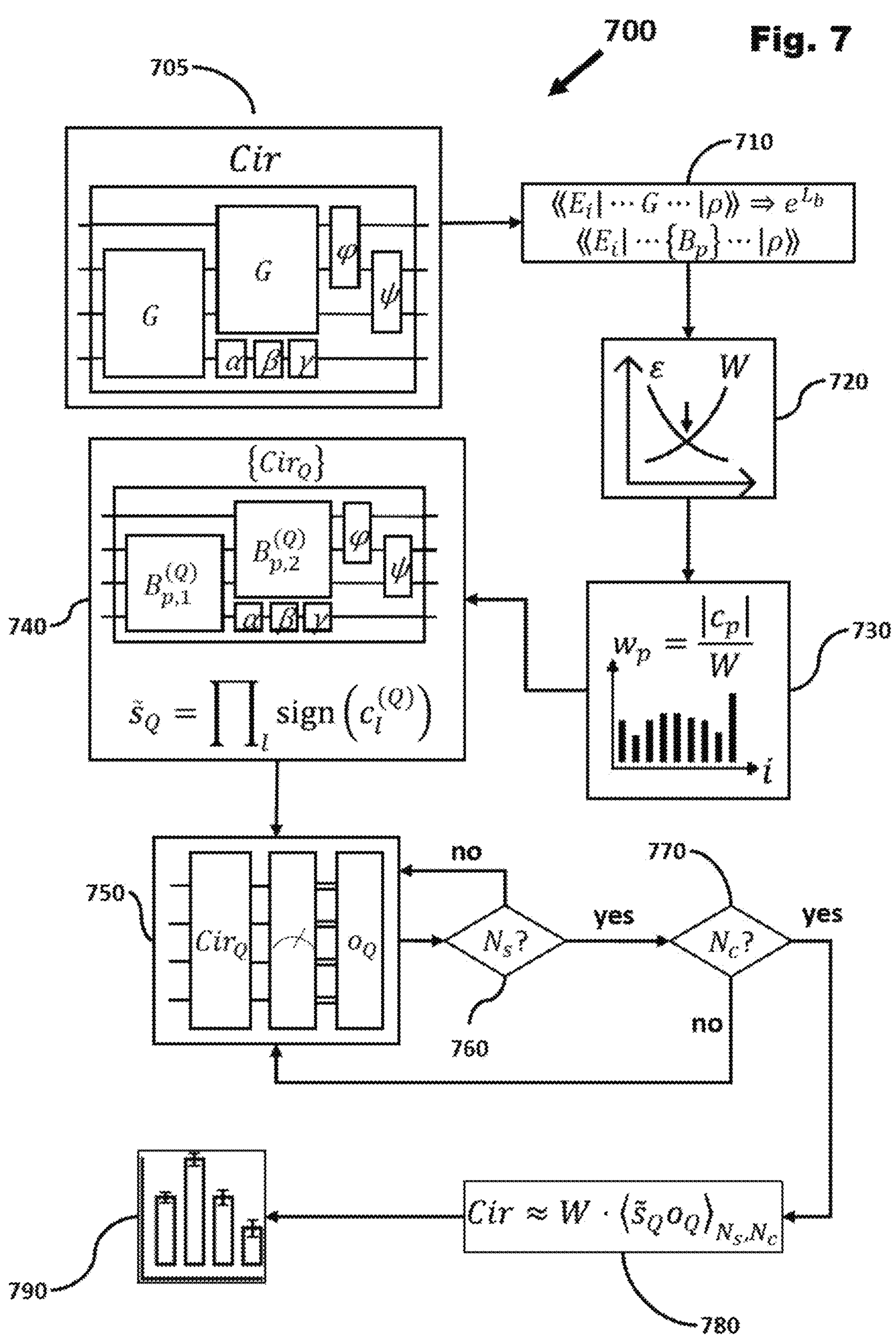
FIG. 7 shows a flowchart illustrating some steps of the method for mitigating errors according to embodiments of the present disclosure.

FIG. 7 shows a flowchart illustrating a computer implemented method 700 for mitigating errors in a quantum circuit, according to embodiments of the present disclosure. A quantum circuit Cir 705 may comprise at least one occurrence of a quantum logic operation G of a quantum processor, that may be noisy. The goal may be mitigating errors in the quantum circuit 705 that originate from G.

The method 700 may comprise a step of characterizing errors 710. The step of characterizing errors 710 may include characterizing errors in the quantum logic operation G and may include characterizing errors in a set of basis operations $\{B_p\}$.

The method 700 may comprise a step of computing coefficients 720. The step of computing coefficients 720 may receive as an input the quantum circuit 705 and characterization of errors, obtained in the step of characterizing errors 710. The step of computing coefficients 720 may include computing a set of coefficients $\{c_p\}$. The set of coefficients $\{c_p\}$ may be associated with a set of basis operations $\{B_p\}$. The set of coefficients $\{c_p\}$ may be coefficients of a quasi-probability decomposition $G_0 \approx \Sigma_p c_p B_p$. The step of computing coefficients 720 may include optimizing a tradeoff between a decomposition sampling overhead and a decomposition accuracy. Optimizing the tradeoff may be in conjunction with reaching a decomposition sampling overhead target and reaching a decomposition accuracy target. The step of computing coefficients 720 may include executing an algorithm for computing the set of coefficients $\{c_p\}$, e.g., an algorithm as described hereinabove in relation to FIG. 5.

The set of coefficients $\{c_p\}$ obtained in the step of computing coefficients 720, may be used for computing a probability measure 730. The probability measure may be defined by weights $$w_p = \frac{|c_p|}{W},$$

where $W = \Sigma_p |c_p|$.

The method 700 may comprise a step of generating a set of sampled quantum circuits $\{Cir_Q\}$ 740. The probability measure 730 may be used to generate a set of sampled quantum circuits $\{Cir_Q\}$ 740. The set of sampled quantum circuits $\{Cir_Q\}$ may be determined by replacing the at least one occurrence of G in the quantum circuit by one sampled operation of the corresponding set of sampled operations. The generation of the set of sampled circuits may be done in a representative way e.g., storing a list-of-lists of indexes, where each index points to samples, and each list corresponds to a sampled circuit. For each sampled quantum circuit of the set of sampled quantum circuits, a corresponding sampled circuit sign $\tilde{s}_Q$ may be computed. The sampled circuit sign $\tilde{s}_Q$ may be defined as the product of signs of the coefficients corresponding the basis operations that may be present in the sampled circuit $Cir_Q$. That is, denoting by $$\{c_l^{(Q)}\}$$

the set coefficients corresponding the basis operations that may be present in the sampled circuit $Cir_Q$, $$\tilde{s}_Q = \prod_l \operatorname{sign}(c_l^{(Q)}).$$

For example, the quantum circuit 705 may be G applied twice $G^2 = G \cdot G$. A sampled circuit may be $Cir_1$, where the first and second occurrences of G may be replaced, respectively, by $$\{B_{p,l}^{(1)}\} = \{B_1, B_2\},$$

having a corresponding $$\{c_l^{(1)}\} = \{c_1, c_2\}.$$

then $\tilde{s}_1 = \operatorname{sign}(c_1) \cdot \operatorname{sign}(c_2)$.

The method 700 may comprise a step of running the sampled circuits $\{Cir_Q\}$ on a quantum processor 750. The running of the sampled circuits $\{Cir_Q\}$ 750 may be in order to obtain sampled quantum circuit outcomes. For each sampled circuit $Cir_Q$, the qubits may be reset, the sampled circuit $Cir_Q$ may be run, the state of the qubits may be measured, and the measurement outcome $o_Q$ may be registered.

A first test 760 may be performed, whether a required number of repetitions ('shots') $N_s$ of running the sampled circuit $Cir_Q$ have been reached. May the first test 760 result negative, $Cir_Q$ may be run again (illustrated as returning to the step of running the sampled circuits $\{Cir_Q\}$ 750). May the first test 760 result positive, a second test 770 may be performed. The second test 770 may test whether all the sampled circuits have been run. May the second test result negative, a next sampled circuit may be run again (illustrated as returning to the step of running the sampled circuits $\{Cir_Q\}$ 750).

May the second test 770 result positive, the method may proceed to a step of estimating the outcome o of the ideal quantum circuit 780 based on the outcomes $o_Q$ of the sampled quantum circuits. The step of estimating the outcome o of the ideal quantum circuit 780 may include computing an average of the outcomes $o_Q$. The outcomes $o_Q$ may be weighted by the corresponding sign $\tilde{s}_Q$ and by W. The averaging may be done over all the sampled quantum circuits and over all the repetitions of each sampled circuit. The averaging may be formulated as $$o \approx \frac{W}{N_c N_s}\sum_{N_C}\sum_{N_s}\tilde{s}_Q o_Q = W \cdot \langle \tilde{s}_Q o_Q \rangle_{N_s,N_c}.$$

The method may proceed to a step of computing a statistical error 790 of the estimate obtained in the step of estimating the outcome o of the ideal quantum circuit 780. The step of estimating a statistical error 790 may include visually presenting the error, e.g., as error-bars.

Numerical Simulations

In order to demonstrate the advantage over the known art, of methods according to the present disclosure, Applicant simulated on a classical computer a plurality of methods for mitigating errors. Methods according to embodiments of the present disclosure, and methods that are known in the art, were simulated. In all methods, the gates to be mitigated are non-Clifford gates, and the allowed mitigation operations are ideally-unitary.

Figure 8A:
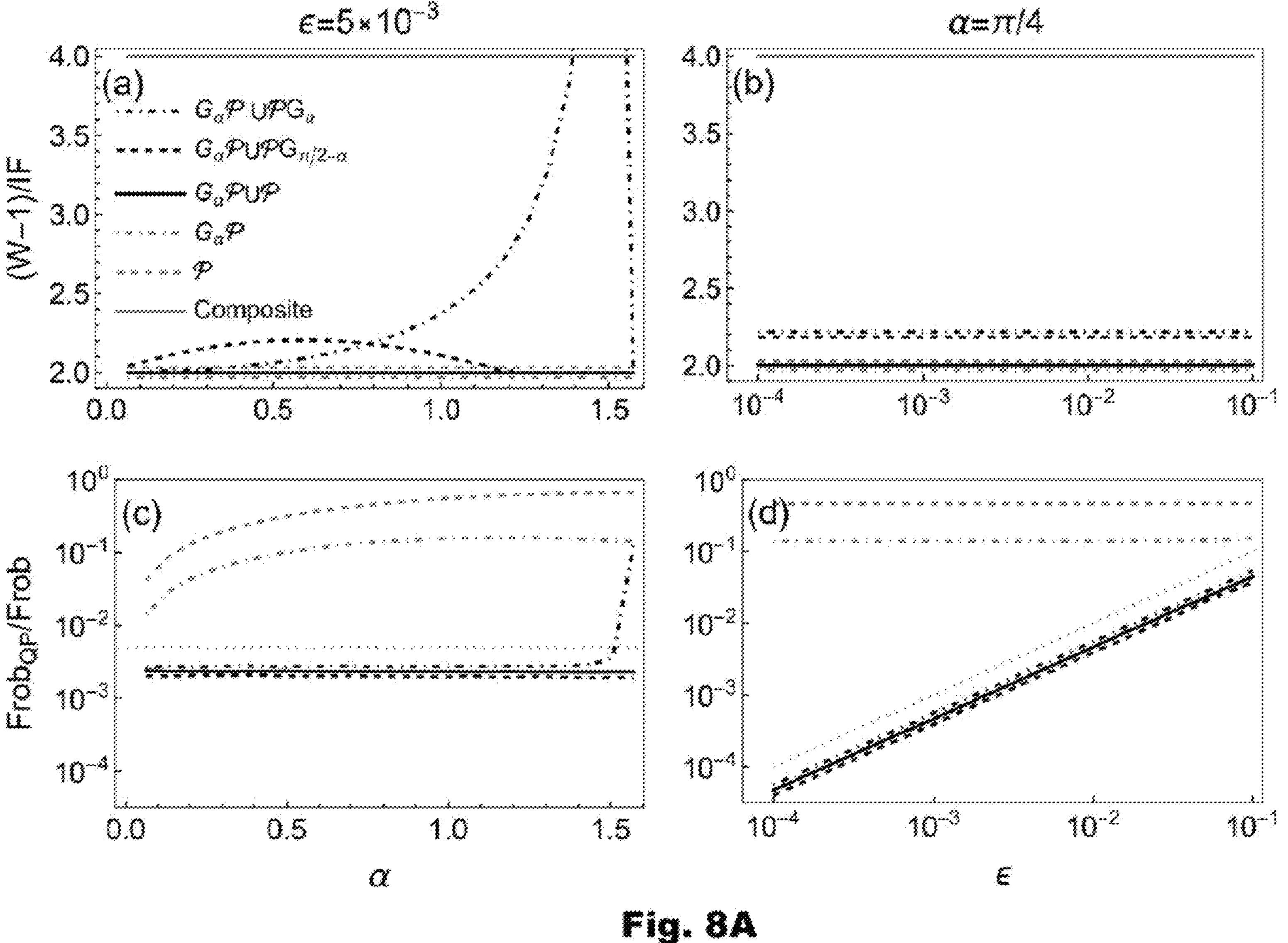
FIG. 8A-8B show graphs demonstrating the performance of a method for mitigating errors, according to embodiments of the present disclosure, in comparison to methods for mitigating errors, known in the art.
Figure 8B:
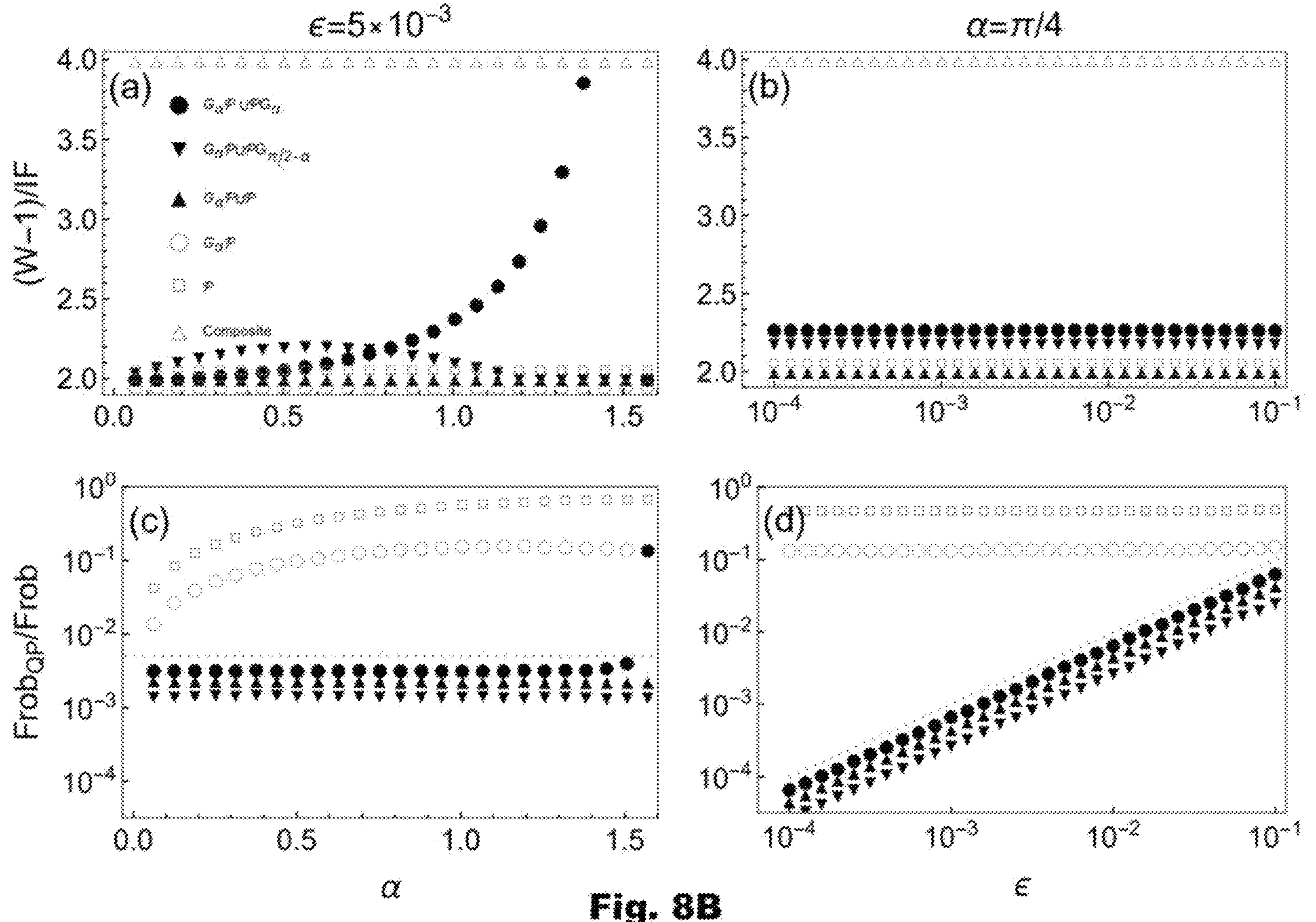

FIG. 8A-8B show graphs demonstrating the performance of the implemented methods for mitigating errors, according to embodiments of the present disclosure, in comparison to implemented methods for mitigating errors, that are known in the art.

The noisy quantum logic operation(s) simulated were a family of 2-qubit ZZ-rotation gates $G_\alpha=R_{ZZ}(\alpha)$, with rotation angle $\alpha\in(0, \pi/2)$. These are non-Clifford gates for $\alpha$ not a multiple of $\pi/2$. Gates with angles $\alpha=0, \pi/2$ were not simulated as these are Clifford gates. As described hereinabove, Clifford gates can be optimally mitigated using 'Clifford mitigation': twirling with the full Pauli group $\mathcal{P}$, and an optimal mitigation of the resulting Pauli before-error channel using the ideally-unitary single-type basis $\mathcal{B}=G_\alpha\hat{\mathcal{P}}$. Thus, $G_\alpha$ gates with angles $\alpha=0, \pi/2$ were of no interest for simulations.

Non-Clifford $R_{ZZ}(\alpha)$ gates are of interest because they commonly appear in quantum algorithms, and because they can be implemented as native gates on various types of QPU's. Indeed, $R_{ZZ}(\alpha)$ gates have been natively implemented in tunable-frequency-and-coupling transmon qubits, as well as trapped-ion qubits. Up to single-qubit basis changes, $R_{ZZ}(\alpha)$ gates also correspond to cross-resonance gates $R_{ZX}(\alpha)$ in fixed-frequency-and-coupling transmon qubits, and to Mølmer-Sorensen gates $R_{XX}(\alpha)$ in trapped-ion qubits.

In all the methods that were simulated, the basis operations $B_i$ in all the bases $\mathcal{B}$ considered, are constructed from the gate $G_\alpha$ to be mitigated, and an ideally-unitary set of mitigation operations $\mathcal{S}$. These mitigation operations are constructed from the set of 16 2-qubit Pauli layers $\hat{\mathcal{P}}$. (with similar results or any set of single-qubit layers), and in one case from an additional 2-qubit gate $G_{\alpha'}$ with $\alpha'\neq\alpha$. From these mitigation operations several multi-type bases are constructed (as according to the present disclosure), as well as single-type bases for reference (as known in the art).

The methods according to embodiments of the present disclosure that were implemented are:

a) Mitigation using the multi-type basis $\mathcal{B}=\mathcal{B}_a=\{G_\alpha\}\cup G_\alpha\mathcal{S}\cup\mathcal{S}\,G_\alpha$, including two nontrivial types $G_\alpha\mathcal{S}$ and $\mathcal{S}\,G_\alpha$, where the set of mitigation operations is given by the set (and in this case, group) of 16 Pauli layers, $\mathcal{S}=\hat{\mathcal{P}}$..

b) Mitigation using the multi-type basis $\mathcal{B}=\mathcal{B}_b\{=G_\alpha\}\cup G_\alpha\mathcal{S}_1\cup\mathcal{S}_2$, including two non-trivial types $G_\alpha\mathcal{S}_1$ and $\mathcal{S}_2$. The set of mitigation operations is given by $\mathcal{S}=\mathcal{S}_1\cup\mathcal{S}_2$, where $\mathcal{S}_1=\hat{\mathcal{P}}$. and $\mathcal{S}_2=\hat{\mathcal{P}}$. $G_{\pi/2-\alpha}$ is a set of subcircuits obtained by first applying a Pauli layer $\hat{P}\in\hat{\mathcal{P}}$. and subsequently applying the two-qubit gate $G_{\pi/2-\alpha}$.

c) Mitigation using the multi-type basis $\mathcal{B}=\mathcal{B}_c=\{G_\alpha\}\cup G\mathcal{S}\cup\mathcal{S}$, including two non-trivial types $G\mathcal{S}$ and $\mathcal{S}$, where the set of mitigation operations is $\mathcal{S}=\hat{\mathcal{P}}$..

In the above methods according to this disclosure that were simulated, QP decompositions for multi-type bases were computed according to a first-order algorithm described hereinabove (in section 'Computing multi-type OP decompositions'). To enable a simple comparison to methods known in the art, the same algorithm was applied to the single-type bases in methods (d) and (e) below.

The methods known in the art that were implemented are:

d) Mitigation using a single nontrivial type $G\hat{\mathcal{P}}$, i.e., $\mathcal{B}=\mathcal{B}_d=\{G_\alpha\}\cup G_\alpha\hat{\mathcal{P}}$.

e) Mitigation using a single nontrivial type $\hat{\mathcal{P}}$, i.e., $\mathcal{B}=\mathcal{B}_e=\{G_\alpha\}\cup\hat{\mathcal{P}}$.

f) A mitigation scheme that may be referred to as 'composite mitigation', and is briefly described hereinbelow.

The mitigation scheme 'composite mitigation' is briefly as follows. A known approach to the mitigation of errors in the non-Clifford family $G_\alpha$ is to compile a composite $G_\alpha$. That is, implement $G_\alpha$ as a sub-circuit including 2-qubit Clifford gates and single-qubit gates. 'Clifford mitigation', described above, is then applied to each of the 2-qubit Clifford gates, while ignoring the commonly negligible errors in single-qubit gates. As an example, the composite implementation:

$$G_\alpha^{comp} := CXR_{IZ}(\alpha)CX$$

is considered. That is, two CX gates and a single-qubit Z rotation $R_{IZ}(\alpha)$ acting on the target qubit of the CX gates. The downside of composite mitigation is that $$G_\alpha^{comp}$$

will generically have a significantly larger infidelity than a directly implemented $G_\alpha$. The reason is that CX is equal to $G_{\pi/4}$ up to single-qubit gates. Assuming the infidelity IF of the direct implementation $G_\alpha$ is independent of a implies that $IF_{comp}\approx 2IF$, where $IF_{comp}$ is the infidelity of $$G_{\alpha}^{comp}.$$

This is a very conservative assumption. It is in fact expected, and has been experimentally reported, that the infidelity of $G_{\alpha}$ can be made proportional to the rotation angle. That is, $IF \propto \alpha$. This leads to $IF_{comp} \approx \pi/\alpha IF$ which reduces to 2IF as $\alpha \to \pi/2$, but gives a much stronger advantage to the direct implementation at smaller angles.

The simulated noise model for $G_{\alpha}$ is given by the standard amplitude damping ($T_1$) and pure dephasing ($T_{\phi}$) dissipative processes occurring on each qubit during the gate operation, with rates $t_g/2T_1=t_g/T_{\phi}=\epsilon/3$ where $t_g$ is the gate duration. The rate of total dephasing ($T_2$) is given by $t_9/2T_2=t_g/2T_1+t_g/T_{\phi}=2\epsilon/3$. The parameter $\epsilon$ is essentially the 2-qubit gate (entanglement-) infidelity:

$$IF = \epsilon + O(\epsilon^2) \tag{14}$$

Generalizing to any single-qubit dissipative process occurring during the gate operation does not qualitatively change the results presented below.

The noisy $G_{\alpha}$ gates were twirled with the group $\mathcal{P}_{ZZ}$, that is, the group of Pauli layers that commute with ZZ (see hereinabove regarding twirling). For the composite implementation $$G_{\alpha}^{comp},$$

the conservative relation $IF^{comp}=2IF$ is assumed.

As indicated above, FIGS. 8A-8B show graphs demonstrating the performance of the implemented methods for mitigating errors, according to embodiments of the present disclosure, in comparison to implemented methods for mitigating errors, that are known in the art.

The difference between FIG. 8A and FIG. 8B is merely the marking of different datasets in the graphs. In FIG. 8A different datasets are marked by different line-forms (e.g., solid/dashed, gray/black). In FIG. 8B different datasets are marked by different markers (e.g., square/triangular/circle, solid/hollow). The two types of dataset marking are shown for the purpose of clarity. Due to this similarity, a shorthand FIG. 8 may refer either figure, when both figures can be referred.

Four panels are shown in FIG. 8. In panels (a) and (c) (upper-left and lower-left, respectively), $\epsilon$ is fixed to $\epsilon=5\times10^{-3}$, and $\alpha$ is veried in the range $\alpha\in(0, \pi/2)$. In panels (b) and (d) (upper-right and lower-right, respectively), $\alpha$ is fixed to $\alpha=\pi/4$, and $\epsilon$ is veried in the range $\epsilon\in(10^{-4}, 10^{-1})$.

The marking of the datasets, corresponding the enumeration of the simulated methods used hereinabove, is as follows:

a) Black uneven dashed line/solid circles.
b) Black even dashed line/solid triangles pointing downwards.
c) Black solid line/solid triangles pointing upwards.
d) Gray uneven dashed line/hollow circles.
e) Gray even dashed line/hollow squares.
f) Gray solid line/hollow triangles pointing upwards.

Note that methods according to embodiments of the present disclosure are indicated by black lines/solid symbols, while methods known in the art are indicated by gray lines/hollow symbols.

Panel (a) in FIG. 8 is furnished with a legend for the datasets. The order of the legend, from top to bottom, corresponds the enumeration of the simulated methods used hereinabove (e.g., the top entry corresponds to method (a) and the bottom entry to method (f)). The legend further explicitly indicates the mitigation operations (except $G_{\alpha}$) used in each method.

As a first performance metric for the QP decompositions, the QP norm W is used as a measure for the sampling overhead. It is shown in panels (a) and (b). In more detail, the 'blowup rate' (W−1)/IF is considered. The 'blowup rate' quantifies the exponential dependence of the QP-norm $W^V$ of a volume-V circuit on the 'total infidelity' IF×V. As discussed hereinabove, the blow-up rate has an optimal value of 2, which sets the lower limit for the y-axis in panels (a) and (b). To note, in both panels (a) and (b), overlapping lines are slightly separated vertically for better visibility. Panel (b) mealy demonstrates that, as expected, the blowup rate is independent of E IF.

As a second performance metric, the relative residual Frobenius distance, $Frob_{QP}/Frob=\|G_{QP}-G_0\|_F/\|G-G_0\|_F$, is used as a measure for the inaccuracy of a QP decomposition. It is shown in panels (c) and (d). This measure is $O(\epsilon)$ for a QP decomposition which mitigates all errors to first order. The dotted lines in panels (c) and (d) correspond to $Frob_{QP}/Frob=\epsilon$.

To demonstrate the advantages of multi-type mitigation, a number of single-type mitigation strategies are considered (methods (d)-(f)). The first single-type mitigation considered is the composite mitigation (described above, method (f)). This method can easily be applied non-linearly, and therefore gives a vanishing inaccuracy (which is why the corresponding dataset is absent in the panels (c) and (d)). Additionally, the method gives an optimal blowup rate $(W-1)/IF^{comp}=2$ in terms of the infidelity $IF^{comp}$ of $$G_{\alpha}^{comp}.$$

However, even under the conservative assumption $IF^{comp}=2IF$, this translates to a highly non-optimal $(W-1)/IF=4$ in terms of the infidelity IF of the direct implementation (panel (a)). This implies the possibility of an exponential advantage for a mitigation strategy based on the direct implementation $G_{\alpha}$, which may, in principle, have a blowup rate as low as $(W-1)/IF=2$. Indeed, both single-type bases $\mathcal{B}_d\{G_{\alpha}\}\cup G_{\alpha}\hat{\mathcal{P}}$ (method (d)) and $\mathcal{B}_e=\{G_{\alpha}\}\cup\hat{\mathcal{P}}$ (method (e)) produce this optimal blowup rate, as seen in panel (a). However, both bases cannot mitigate all errors to first order. For those bases, $Frob_{QP}/Frob>>\epsilon$ for small $\epsilon$, as seen in panels (c) and (d). As a minor note, the relative inaccuracy slightly decreases at small $\alpha$, where $G_{\alpha}$ approaches a noisy idle gate.

As discussed hereinbelow, multi-type mitigation allows for a full first-order mitigation of the noise model considered, while achieving an optimal blowup rate.

The performance of multi-type QP decompositions, as shown in FIGS. 8, may now be described in detail. The simplest multi-type QP basis considered is $\mathcal{B}_a=\{G_{\alpha}\}\cup G_{\alpha}\hat{\mathcal{P}}\cup\hat{\mathcal{P}}G_{\alpha}$ (method (a)). This method makes use of the simple addition of Pauli layers before or after the noisy gate $G_{\alpha}$. As seen in panel (a), the blowup rate of (associated with) Ba is close to the optimal value of 2 for small $\alpha$, with $(W-1)/IF<2.18$ for $\alpha<\pi/4$. In this range, one also obtains a full first-order mitigation, with relative error $Frob_{QP}/$ Frob<$\epsilon$, as seen in panels (c) and (d). The multi-type basis $\mathcal{B}_a$ therefore gives a near-optimal first-order mitigation for $\alpha<\pi/4$. However, as $\alpha\rightarrow\pi/2$ the blowup rate itself blows up, giving an increasingly non-optimal mitigation, until plummeting back to the optimum very near $\alpha=\pi/2$. As seen in panel (c), this plummeting is accompanied by a sharp spike in the inaccuracy. The correlated plummeting of the blowup rate and spike in the inaccuracy are due to the tradeoff between sampling overhead and inaccuracy incorporated into the decomposition algorithm. Linear combinations of noise parameters whose mitigation requires QP coefficients larger than a user-specified (relative) threshold are not mitigated, leading to a smaller QP norm, at the expanse of a larger inaccuracy.

The excessive QP norm obtained for the basis $\mathcal{B}_a$ as $\alpha\rightarrow\pi/2$ is due to the angle $\alpha$, which appears in both types of basis elements included. This leads to a QP basis which (when viewed as a matrix) has a high condition number, essentially spanning its space of mitigatable errors inefficiently. Indeed, at $\alpha=\pi/2$ the gate $G_\alpha=G_{\pi/2}$ is (ideally) a Clifford gate, mapping the Pauli group to itself via conjugation. As a result, $G_{\pi/2}\mathcal{P}=\mathcal{P}G_{\pi/2}$, effectively reducing the multi-type basis $\mathcal{B}_a$ to a single-type basis at $\alpha=\pi/2$. A solution to this issue is to include additional 2-qubit gates $G_{\alpha'}$ as mitigation operations. As an example, the basis $\mathcal{B}_b=\{G_\alpha\}\cup G_\alpha\hat{\mathcal{P}}\cup\hat{\mathcal{P}}G_{\pi/2-\alpha}$ (method (b)), utilizing $\alpha'=\pi/2-\alpha$, is considered. As can be seen in FIGS. 8, this basis produces a near optimal first-order mitigation for any angle $\alpha\in(0, \pi/2)$ and for angles $\alpha>\pi/4$ in particular. For $\alpha>\pi/4$, the basis $\mathcal{B}_b$ produces a significant improvement in the blow-up rate relative to basis $\mathcal{B}_1$. For $\alpha<\pi/4$, the blowup rate of $\mathcal{B}_b$ is slightly higher than that of $\mathcal{B}_a$, so it's clear that the two bases can be combined to further improve the blowup rate. To note, the use of $\mathcal{B}_b$ requires the additional (compared to $\mathcal{B}_2$) calibration of the gate $G_{\pi/2-\alpha}$, that may not be needed for the ideal quantum circuit(s) one is interested in. Nevertheless, for the purpose of generating first-order QP decompositions, the characterization of this additional gate isn't needed, as discussed hereinabove.

In the multi-type basis $\mathcal{B}_c=\{G_\alpha\}\cup G_\alpha\hat{\mathcal{P}}\cup\hat{\mathcal{P}}$, the second type $\hat{\mathcal{P}}$ is treated as a special case of $\hat{\mathcal{P}}G_{\alpha'}$ with $\alpha'=0$, corresponding to a Pauli layer $P\in\mathcal{P}$ followed by a noisy idle operation. As seen in FIGS. 8, this multi-type basis produces an optimal first-order mitigation, achieving both the lower bound $(W-1)/IF=2$ on the blowup rate and the inaccuracy $Frob_{QP}/Frob<\epsilon$, for any angle $\alpha\in(0, \pi/2)$.

To summarize, as opposed to single-type mitigation strategies known in the art, multi-type mitigation, according to embodiments of the present disclosure, enables an optimal first-order mitigation of non-Clifford ZZ-rotation gates with single-qubit dissipation occurring during the gate operation, without relying on non-unitary mitigation operations.

The results presented so far, qualitatively generalize to the larger family of gates $G_{\alpha,\beta,\gamma}=e^{h_{\alpha,\beta,\gamma}+L}$, where the ideal generator is $$h_{\alpha,\beta,\gamma}=\frac{i}{2}[\alpha XX+\beta YY+\gamma ZZ,\ \cdot],$$

and the during-error generator L corresponds to single-qubit dissipation. All gates in the family $G_{\alpha,\beta,\gamma}$ can be twirled with the subgroup $\{II, XX, YY, ZZ\}\subset\mathcal{P}$. The parameters $\alpha$, $\beta$, $\gamma$ can be assumed to take values in the range $[0, \pi/2]$. The case where two parameters vanish is excluded, as this special case was already discussed above. The case where all three parameters are equal to 0 or $\pi/2$ is also excluded, as in this case the gate is a Clifford gate, and single-type decompositions suffice. The fractional iSWAP gate $G_{\alpha,\alpha,0}$ is an important example which has been natively implemented in superconducting qubit platforms. The significance of the family $G_{\alpha,\beta,\gamma}$ stems from the KAK decomposition, stating that every two-qubit gate G is ideally equal to some $G_{\alpha,\beta,\gamma}$, up to multiplication by single-qubit layers from the left and right, that is: $G=S_1G_{\alpha,\beta,\gamma}S_2$.

Figure 9:
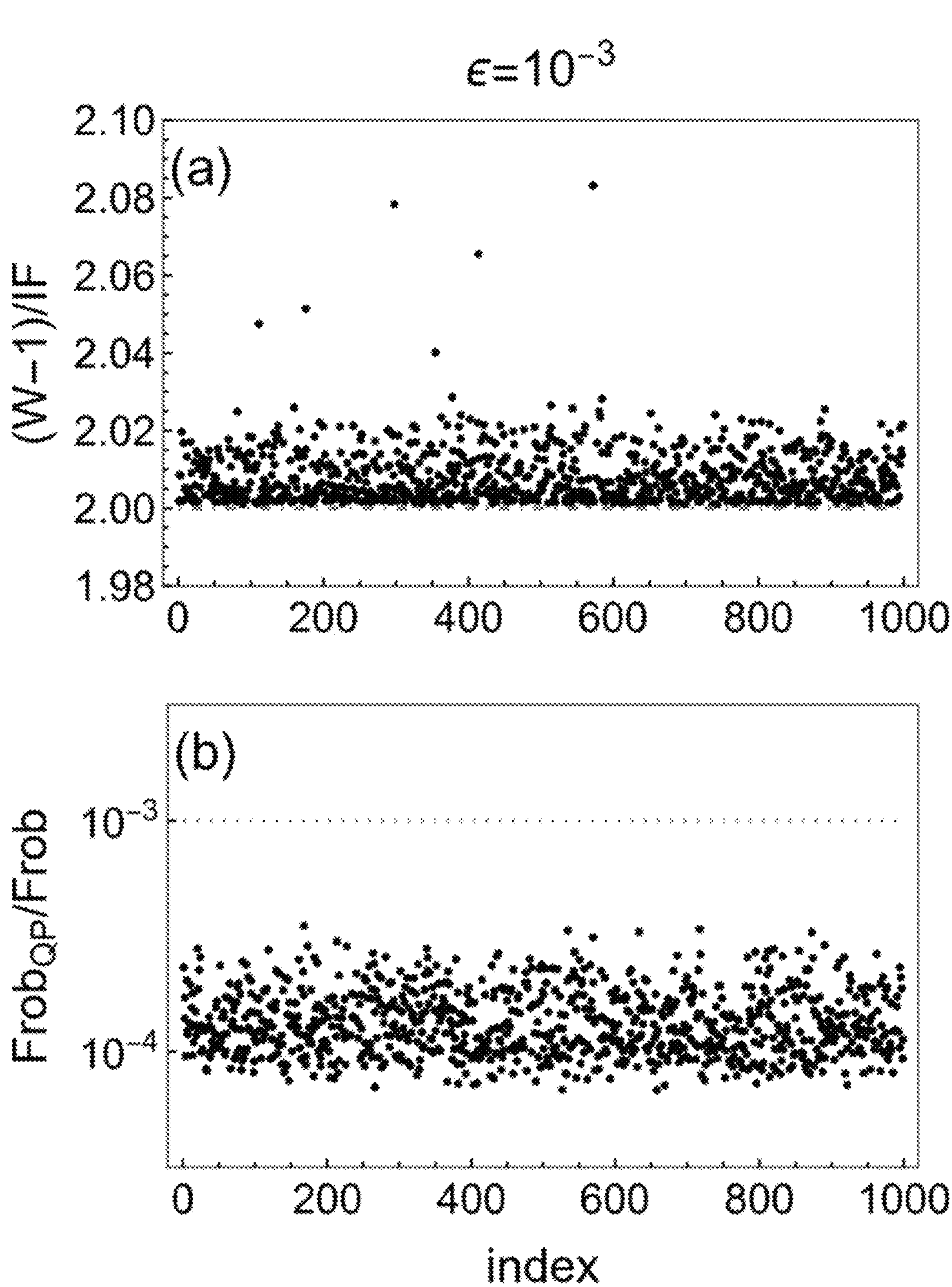
FIG. 9 shows graphs demonstrating the performance of a method for mitigating errors, according to embodiments of the present disclosure.

FIG. 9 shows graphs demonstrating the performance of a method for mitigating errors, according to embodiments of the present disclosure, applied to a plurality of gates from the $G_{\alpha,\beta,\gamma}$ family. One-thousand gates from the family $G_{\alpha,\beta,\gamma}$ were simulated on a classical computer. The parameters $$\{(\alpha_i, \beta_i, \gamma_i)\}_{i=1}^{1000}$$

were sampled uniformly from the cube $[0, \pi/2]^3$. In other words, the parameters are sampled uniformly from the range $\{\alpha\in[0, \pi/2]\}\times\{(\beta\in[0, \pi/2]\}\times\{\gamma\in[0, \pi/2]\}$. The error parameter $\epsilon$ is fixed to $\epsilon=10^{-3}$ (see Eq. 14). For each specific $G_{\alpha,\beta,\gamma}$, the multi-type basis is $\mathcal{B}=\{G_{\alpha,\beta,\gamma}\}\cup G_{\alpha,\beta,\gamma}\mathcal{S}\cup\mathcal{S}G_{\alpha,\beta,\gamma}\cup\mathcal{S}$, including three nontrivial types $G_{\alpha,\beta,\gamma}\mathcal{S}$, $\mathcal{S}G_{\alpha,\beta,\gamma}$ and $\mathcal{S}$, where the set of mitigation operations is given by the set (and in this case, group) of 16 Pauli layers, $\mathcal{S}=\hat{\mathcal{P}}$. The QP decompositions were computed according to a non-linearized version of the algorithm described hereinabove (in section 'Computing multi-type OP decompositions', using Eq. 10.2). All gates $G_{\alpha,\beta,\gamma}$ simulated were twirled with the subgroup $\{II, XX, YY, ZZ\}\subset\mathcal{P}$.

Two panels are shown in FIG. 9. In both panels, the x-axis—labeled 'index'—indexes the specific combinations of parameters, that is, the index i in $$\{(\alpha_i, \beta_i, \gamma_i)\}_{i=1}^{1000}.$$

In panel (a), the y-axis is the value of the 'blowup rate' $(W-1)/IF$. In panel (b), the y-axis is the relative residual Frobenius distance, $Frob_{QP}/Frob$.

Panel (a) shows that the QP decompositions have blow-up rates which are very close to the optimum 2. The slight non-optimality is attributed to numerical inaccuracies involved in the linear program included in the computation algorithm. Panel (b) shows that the multi-type decompositions also attain a better-than-first-order accuracy $Frob_{QP}/Frob<<\epsilon$.

The merits of methods according to the present disclosure may further be seen by considering again the $G_\alpha=R_{ZZ}(\alpha)$ family of non-Clifford gates, but with a completely general before error generator $L_b$. That is, the assumption of single-qubit dissipation during the gate is not assumed. In order to mitigate such a general noise model, a larger twirling group and a larger set of mitigation operations may be used, as compared to the simulations described above. In order to reduce the noise model as a much as possible, twirling may be done with the group generated by the Pauli operators in $\hat{\mathcal{P}}_{ZZ}$ as well as the non-Pauli (yet Clifford) single-qubit Z-rotations with angle $\pi/2$: $R_{ZI}(\pi/2)$, $R_{IZ}(\pi/2)$. Working to first order in $L_b$, this leaves only 16 Lindbladian parameters to mitigate in the twirled before-error $L_{b,tw}$ (as opposed to 30 with the simpler $\hat{\mathcal{P}}_{ZZ}$-twirl). The set of mitigation operations $\mathcal{S}$ may be a set of 100 linearly independent layers of single-qubit gates, spanning a 100-dimensional space (as opposed to the 16-dimensional space spanned by Pauli layers $\hat{\mathcal{P}}$). The multi-type basis $\mathcal{B}$ appearing in Eq. 2 then spans a 208-dimensional space Span($\mathcal{B}$) of mitigation directions (as opposed to only 24 mitigation directions obtained with $\mathcal{S}=\hat{\mathcal{P}}$). This space is a subspace of the 225-dimensional space of TP and unital super-operators on two qubits. The space Span($\mathcal{B}$) of mitigatable directions allows for the mitigation of all but 3 (out of 16) parameter combinations in the twirled before-error generator $L_{b,tw}$:

$$\gamma_1 = \mathrm{Im}(\gamma^{(b)}_{IY,ZX} - \gamma^{(b)}_{IX,ZY}),\quad (14)$$
$$\gamma_2 = \mathrm{Im}(\gamma^{(b)}_{YI,XZ} - \gamma^{(b)}_{XI,YZ}),$$
$$\gamma_3 = \mathrm{Im}(\gamma^{(b)}_{XX,YY} - \gamma^{(b)}_{XY,YX}).$$

The combinations $\gamma_1$, $\gamma_2$ involve Pauli operators not included in the commutant $\mathcal{P}_{ZZ}$, while $\gamma_3$ involves Pauli operators included in $\mathcal{P}_{ZZ}$. Nevertheless, all three parameter combinations correspond to super-operators which commute with $R_{ZZ}(\alpha)$, and can therefore be thought of as acting before, during, or after the ideal gate.

All three combinations in Eq. 14 correspond to 2-qubit dissipation. $\gamma_3$ can be generated by the twirling of coherent errors, while $\gamma_1$, $\gamma_2$ cannot. Assuming $\gamma_3$ is only due to twirled coherent errors, it is given (to leading order) by:

$$\gamma_3 = h_{XX}h_{YY} - h_{XY}h_{YX}$$

The sum $\gamma_1+\gamma_2$ determines the non-unital error in the ZZ direction, acting on density matrices as $\rho \mapsto \rho+(\gamma_1+\gamma_2)ZZ$. Since all elements in the basis $\mathcal{B}$ are (ideally-) unitary and hence unital, it is expected that this error remains unmitigated. There is no similar obstruction to the mitigation of $\gamma_1-\gamma_2$ or $\gamma_3$ with unitary gates. The latter may be achieved by constructing a multi-type QP basis for a sub-circuit $G=L_k \ldots L_1$ including $k>1$ algorithmic layers, as described hereinabove.

Further, as demonstrated by the above numerical simulations, a near-optimal QP norm $W \approx e^{2IF}$ can be ensured by adding $R_{ZZ}(\alpha')$ with $\alpha' \neq \alpha$ as mitigation operations.

Figure 10:
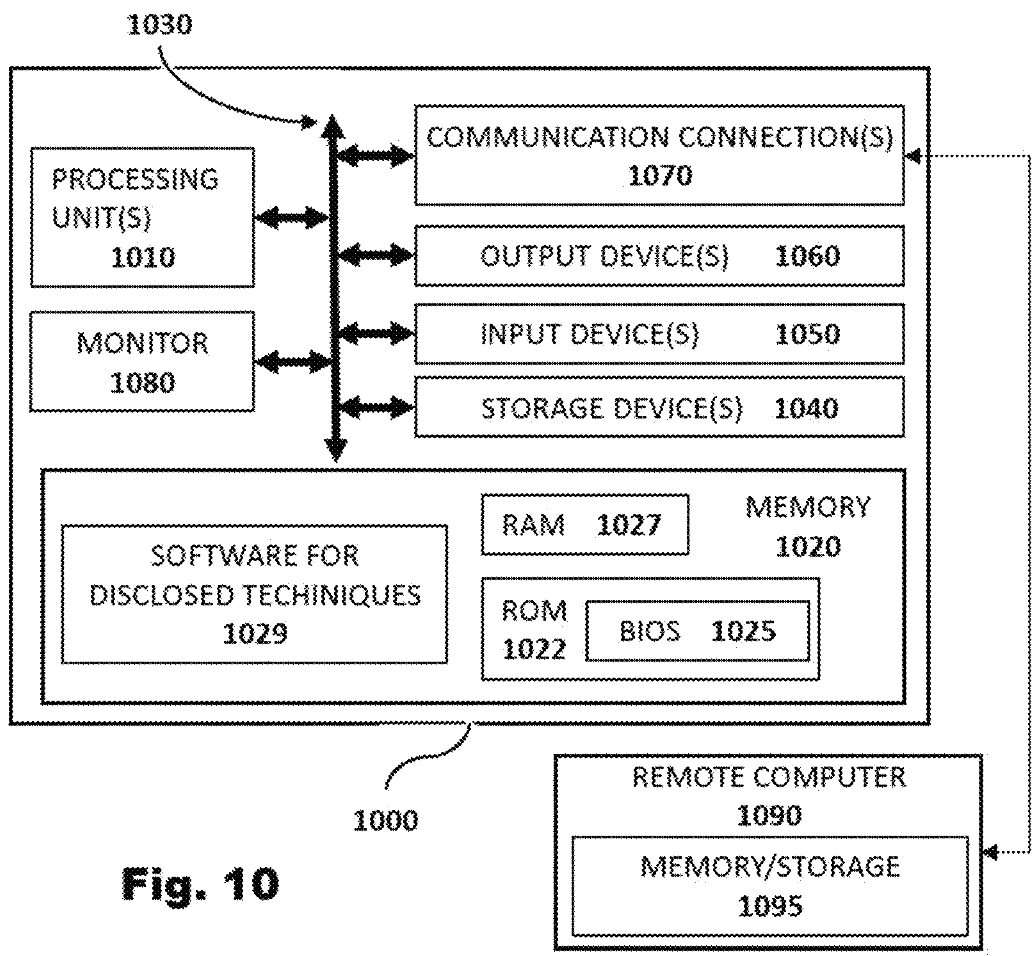
FIG. 10 schematically illustrates a computer implementing a method according to embodiments of the present disclosure.

FIG. 10 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including handheld devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 10, an exemplary system for implementing the disclosed technology includes a general purpose (classical) computing device in the form of an exemplary conventional PC 1000, including one or more processing units 1010, a system memory 1020, and a system bus 1030 that couples various system components including the system memory 1020 to the one or more processing units 1010. The system bus 1030 may be any of several types of bus structures including a memory bus or memory controller, a peripheral bus, and/or a local bus using any of a variety of bus architectures. The exemplary system memory 1020 includes read only memory (ROM) 1022 and random-access memory (RAM) 1027. A basic input/output system (BIOS) 1025, containing the basic routines that help with the transfer of information between elements within the PC 1000, is stored in ROM 1022. As shown in FIG. 10, the system memory 1020 may store computer-executable instructions for performing any of the disclosed techniques (e.g., sending instructions to quantum computer for applying characterization gate sequences and neighboring gate sequences to a subset of qubits, measuring outcomes, collecting frequencies, computing model parameters) in respective memory portions (shown generally as executable software 1029 for performing any embodiment of the disclosed synthesis techniques).

The exemplary PC 1000 further includes one or more storage devices 1040, such as a hard disk drive for reading from and writing to a hard disk, a magnetic disk drive for reading from or writing to a removable magnetic disk, and/or an optical disk drive for reading from or writing to a removable optical disk (such as a CD-ROM or other optical media). Such storage devices can be connected to the system bus 1030 by a hard disk drive interface, a magnetic disk drive interface, and/or an optical drive interface, respectively. The drives and their associated computer readable media provide nonvolatile storage of computer-readable instructions, data structures, program modules, and other data for the PC 1000. Other types of computer-readable media which can store data that is accessible by a PC, such as magnetic cassettes, flash memory, digital video disks, CDs, DVDs, RAMs, NVRAMs, ROMs, and the like, may also be used in the exemplary operating environment. As used herein, the terms storage, memory, and computer-readable media may not include or encompass propagating carrier waves or signals per se.

A number of program modules may be stored in the storage devices 1040, including an operating system, one or more application programs, other program modules, and program data. Storage of results of quantum measurements and instructions for obtaining such measurements (and/or instructions for performing any embodiment of the disclosed technology) can be stored in the storage devices 1040. A user may enter commands and information into the PC 1000 through one or more input devices 1050 such as a keyboard and a pointing device such as a mouse. Other input devices may include a digital camera, microphone, joystick, game pad, satellite dish, scanner, or the like. These and other input devices are often connected to the one or more processing units 1010 through a serial port interface that is coupled to the system bus 1030, but may be connected by other interfaces such as a parallel port, game port, or universal serial bus (USB). A monitor 1080 or other type of display device is also connected to the system bus 1030 via an interface, such as a video adapter. Other peripheral output devices 1060, such as speakers and printers (not shown), may be included. In some cases, a user interface is displayed so that a user can input a circuit for synthesis, and verify successful synthesis.

The PC 1000 may operate in a networked environment using logical connections to one or more remote computers, such as a remote computer 1090. In some examples, one or more network or communication connections 1070 are included. The remote computer 1090 may be another PC, a server, a router, a network PC, or a peer device or other common network node, and typically includes many or all of the elements described above relative to the PC 1000, although only a memory storage device 1095 has been illustrated in FIG. 10. The personal computer 1000 and/or the remote computer 1090 can be connected to a local area network (LAN) and a wide area network (WAN). Such networking environments are commonplace in offices, enterprise-wide computer networks, intranets, and the Internet.

When used in a LAN networking environment, the PC 1000 is connected to the LAN through a network interface. When used in a WAN networking environment, the PC 1000 typically includes a modem or other means for establishing communications over the WAN, such as the Internet. In a networked environment, program modules depicted relative to the personal computer 1000, or portions thereof, may be stored in the remote memory storage device or other locations on the LAN or WAN. The network connections shown are exemplary, and other means of establishing a communications link between the computers may be used.

Figure 11:
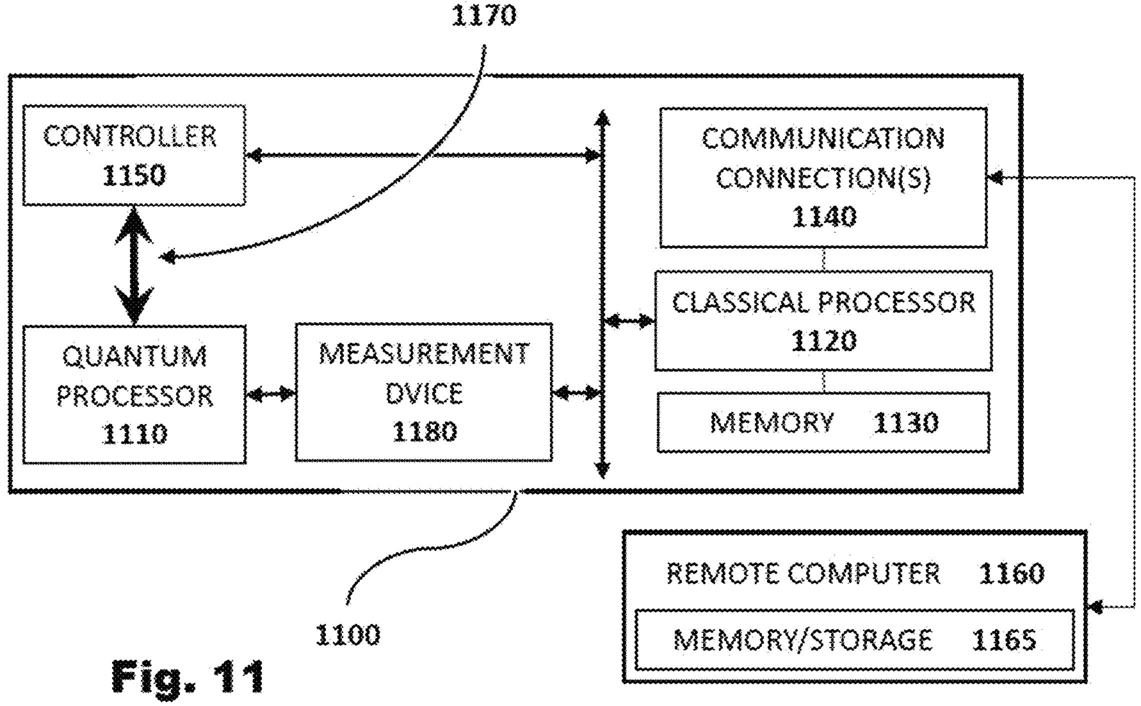
FIG. 11 schematically illustrates a system implementing a method according to embodiments of the present disclosure.

With reference to FIG. 11, an exemplary system for implementing the disclosed technology includes computing environment 1100, The environment includes one or more quantum processing unit(s) 1110 including one or more monitoring/measuring device(s). The quantum processing unit(s) execute quantum circuits that are provided by a classical processing unit 1120. The quantum circuits are downloaded into or used to program or configure the quantum processing unit(s) 1110 (e.g., via control lines (quantum bus) 1170). Procedures according to any of the disclosed embodiments (e.g., a high-level description of the set of quantum circuits to be applied to a qubit patch and neighboring qubits) may be stored in a memory 1130.

With reference to FIG. 11, the high-level description of a quantum software may be translated into quantum circuits (e.g., sequences of quantum gates, or layers of gates acting in parallel on different qubits). Such high-level descriptions may be stored, as the case may be, on one or more external computers 1160 outside the computing environment 1100 utilizing one or more memory and/or storage device(s) 1165, then downloaded as necessary into the computing environment 1100 via one or more communication connection(s) 1140. Quantum circuits (according to any of the disclosed embodiments) are coupled to the quantum processor 1110.

The quantum processing unit(s) can be one or more of, but are not limited to: (α) a superconducting quantum computer; (b) an ion trap quantum computer; (c) a topological quantum computer using e.g., Majorana zero modes; (d) a photonic quantum computer; or (e) a neutral atom quantum computer. The sets of gates (e.g., using any of the disclosed embodiments) can be sent into (or otherwise applied to) the quantum processing unit(s) via control lines 1170 at a controller 1150. In the illustrated example, the desired quantum computing process is implemented with the aid of one or more controllers 1150 that are specially adapted to control a corresponding one of the quantum processor(s) 1110. The classical processor 1120 can further interact with measuring/monitoring devices (e.g., readout devices) 1180 to help control and implement the desired quantum computing process (e.g., by reading or measuring out data results from the quantum processing units once available, etc.)

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The arrangements above are provided for convenient illustration, and other arrangements can be used.

Therefore, casting into a language of clauses, the present disclosure provides methods and systems according to, but not limited to, the following clauses:

Clause 1: A computer implemented method for mitigating errors in a quantum circuit comprising at least one occurrence of a quantum logic operation G of a quantum processor, the method comprising:

computing a set of coefficients $\{c_p\}$ associated with a set of basis operations $\{B_p\}$ to obtain a quasi-probability decomposition $G_0 \approx \Sigma_p c_p B_p$ of a target version $G_0$ of the quantum logic operation G on the set of basis operations $\{B_p\}$, wherein:

i) the set of basis operations $\{B_p\}$ forms a multi-type basis, constructed from the quantum logic operation G and elements of a set of mitigation operations $\mathcal{S}$; $\mathcal{S}$ ii) said decomposition is computed so as to reach a decomposition target based on at least one of a decomposition accuracy target and a decomposition sampling overhead target;

implementing said quasi-probability decomposition on the quantum processor to estimate an outcome of a target quantum circuit in which the target version $G_0$ of the quantum operation G replaces the at least one occurrence of the quantum operation G.

Clause 2: As recited in clause 1, wherein said set of basis operations $\{B_p\}$ comprises at least two basis operation types.

Clause 3: As recited in any one of the clauses 1 to 2, wherein said set of basis operations $\{B_p\}$ comprises at least two basis operation types selected from a plurality of basis operation types $GS_i$, $S_jG$, $S_k GS_l$, $S_m$, said $S_i, \ldots, S_m$ being elements of the set of mitigation operations $\mathcal{S}$.

Clause 4: As recited in any of the clauses 1 to 3, wherein implementing said quasi-probability decomposition on the quantum processor comprises:

i) for each of said at least one occurrence of the quantum operation G in the quantum circuit, sampling the set of basis operations $\{B_p\}$ based on said set of coefficients $\{c_p\}$ to obtain at least one corresponding set of sampled operations;

ii) running a set of sampled quantum circuits on the quantum processor wherein said set of sampled quantum circuits is determined by replacing the at least one occurrence of G in the quantum circuit by one sampled operation of said corresponding set of sampled operations so as to obtain sampled quantum circuit outcomes;

iii) estimating the outcome of the target quantum circuit based on the sampled quantum circuit outcomes.

Clause 5: As recited in clause 4, wherein said replacing at least one occurrence of G in the quantum circuit is performed by replacing each occurrence of G by a sample from said corresponding set of basis operations.

Clause 6: As recited in clause 4, wherein the sampling is according to a probabilistic distribution defined by weights $$w_p = \frac{|c_p|}{w},$$

wherein $W=\Sigma_p|c_p|$.

Clause 7: As recited in any former clause, further comprising computing the decomposition sampling overhead, wherein computing the sampling overhead includes computing the quasi-probability norm $W=\Sigma_p|c_p|$.

Clause 8: As recited in any former clause, further comprising computing a decomposition accuracy, wherein computing the decomposition accuracy includes computing a distance measure between said decomposition and the target version $G_0$.

Clause 9: As recited in clause 8, wherein said distance measure is any one of the Frobenius distance, infidelity, or diamond distance.

Clause 10: As recited in any former clause, wherein said target version $G_0$ is an ideal implementation of said quantum logic operation G.

Clause 11: As recited in any one of the clauses 1 to 9, wherein said target version $G_0$ is a noise-amplified implementation of said quantum logic operation G.

Clause 12: As recited in any former clause, wherein mid-circuit measurement operations are excluded from said set of mitigation operations $\mathcal{S}$.

Clause 13: As recited in any former clause, wherein reset operations are excluded from said set of mitigation operations $\mathcal{S}$.

Clause 14: As recited in any former clause, wherein ideally-non-unitary quantum logic operations are excluded from said set of mitigation operations $\mathcal{S}$.

Clause 15: As recited in any former clause, wherein idle operations are excluded from said set of mitigation operations $\mathcal{S}$.

Clause 16: As recited in any former clause, wherein said set of mitigation operations $\mathcal{S}$ consists of layers of single qubit operations.

Clause 17: As recited in any former clause, wherein said set of mitigation operations $\mathcal{S}$ comprises layers of multi-qubit operations.

Clause 18: As recited in an one of the clauses 3 to 17, wherein said $S_i, \ldots, S_m$ are respectively elements of the sets $\mathcal{S}_1, \ldots, \mathcal{S}_5$ an at east one, and preferably each, of the sets $\mathcal{S}_1, \ldots, \mathcal{S}_5$ includes at least about $10^n$ linearly independent operations, wherein n is the number of qubits on which G is applied.

Clause 19: As recited in any former clause, wherein the set of mitigation operations $\mathcal{S}$ includes linearly dependent operations.

Clause 20: As recited in any former clause, wherein at least some of the operations in the set of mitigation operations $\mathcal{S}$ ideally operate non-trivially on up to a predefined number of qubits r.

Clause 21: As recited in clause 20, wherein each of the mitigation operations included in the set of mitigation operations $\mathcal{S}$ ideally operates non-trivially on up to said predefined number of qubits r and at least one, and preferably each, of the sets $\mathcal{S}_1, \ldots, \mathcal{S}_5$ includes at least about $$\binom{n}{r}10^r$$

linearly independent operations.

Clause 22: As recited in any former clause, wherein said target version $G_0$ of said quantum logic operation G is a layer of gates acting on non-overlapping sets of qubits.

Clause 23: As recited in any former clause, wherein said target version $G_0$ of said quantum logic operation G comprises non-Clifford gates.

Clause 24: As recited in any former clause, wherein the quantum logic operation G is twirled.

Clause 25: As recited in clause 24 as dependent on clause 23, wherein said non-Clifford gates are twirled using gates that commute with $G_0$.

Clause 26: As recited in any former clause, wherein said set of basis operations $\{B_p\}$ further comprises subcircuits $B_p$ comprising two or more occurrences of the quantum logic operation G, or comprising two or more mitigation operations chosen from the set of mitigation operations $\mathcal{S}$.

Clause 27: As recited in clause 26, wherein said subcircuits are shallow.

Clause 28: As recited in any one of the clauses 26 to 27, wherein said subcircuits are of depth lower than a predefined threshold.

Clause 29: As recited in any former clause, wherein:

the quantum logic operation G is a sub-circuit given by a sequence of sub-operations $$G = \Xi_K \ldots \Xi_1;$$

said subcircuits $B_p$ comprise of zero or more sub-operations $\Xi_1, \ldots, \Xi_K$ included in said sequence of sub-operations and zero or more operations included in the set of mitigation operations $\mathcal{S}$.

Clause 30: As recited in any former clause, further comprising obtaining a characterization of errors in said quantum logic operation G.

Clause 31: As recited in any former clause, further comprising obtaining a characterization of errors in at least one of the operations included in said set of mitigation operations $\mathcal{S}$. Clause 32: As recited in any former clause, further comprising obtaining a characterization of errors in at least one basis operation included in said set of basis operations $\{B_p\}$.

Clause 33: As recited in any former clause, comprising optimizing a tradeoff between a decomposition accuracy and a decomposition sampling overhead.

Clause 34: As recited in clause 33, wherein said optimizing a tradeoff comprises optimizing the decomposition accuracy by solving a least-squares problem, and minimizing the sampling overhead by solving a linear program.

Clause 35: As recited in any former clause, wherein said decomposition accuracy target comprises a decomposition accuracy staying below a predefined accuracy threshold $\varepsilon$.

Clause 36: As recited in any former clause, wherein said decomposition sampling overhead target comprises a decomposition sampling overhead staying below a predefined sampling overhead threshold $\eta$.

Clause 37: As recited in any former clause, wherein said decomposition sampling overhead target comprises a maximum quasi-probability norm $W \leq \eta$.

Clause 38: As recited in any one of the clauses 4 to 37, further comprising computing a statistical error of said estimated outcome of said target quantum circuit.

Clause 39: As recited in any one of the clauses 4 to 37, wherein said estimating the outcome of said target quantum circuit comprises computing, for each sampled quantum circuit of the set of sampled quantum circuits, a corresponding sampled circuit sign equal to a sign of a product of the at least one coefficient corresponding to at least one sampled operation which replaces the at least one occurrence of G in said sampled quantum circuit.

Clause 40: As recited in clause 39, wherein said estimating the outcome of the target quantum circuit comprises computing an average of the sampled quantum circuit outcomes, said sampled quantum circuit outcomes being weighted by said corresponding sampled circuit sign and by a quasi-probability norm W.

Clause 41: A computer implemented method for mitigating errors in a quantum circuit comprising at least one occurrence of a quantum logic operation G of a quantum processor, the method comprising:

- computing a set of coefficients $\{c_p\}$ associated with a set of basis operations $\{B_p\}$ to obtain a quasi-probability decomposition $G_0 \approx \Sigma_p c_p B_p$ of a target version $G_0$ of the quantum logic operation G on the set of basis operations $\{B_p\}$ including ideally-non-unitary basis operations and ideally-unitary basis operations, wherein said decomposition is computed so as to reach a decomposition target based on a use target of ideally-non-unitary basis operations, and at least one of a decomposition accuracy target, a decomposition sampling overhead target, and a use target of ideally-unitary basis operations;
- implementing said quasi-probability decomposition on the quantum processor to estimate an outcome of a target quantum circuit in which the target version $G_0$ of the quantum operation G replaces the at least one occurrence of the quantum operation G.

Clause 42: As recited in clause 41, wherein the use target of ideally-non-unitary basis operations is minimized by:

- computing said quasi-probability decomposition, wherein the set of basis operations $\{B_p\}$ forms a multi-type basis, constructed from the quantum logic operation G and ideally-unitary elements of a set of mitigation operations $\mathcal{S}$;
- computing a set of complementary coefficients $\{\check{c}_q\}$ associated with a set of complementary basis operations $\{\check{B}_q\}$ to obtain a quasi-probability decomposition for the residual error $G_0 - \Sigma_p c_p B_p \approx \Sigma_q \check{c}_q \check{B}_q$, wherein the set of complementary basis operations $\{\check{B}_q\}$ includes ideally-non-unitary operations.
- implementing said quasi-probability decomposition for the residual error on the quantum processor, thereby refining said estimate of the outcome of an ideal quantum circuit.

Clause 43: As recited in clause 42, wherein the set of complimentary basis operations $\{\check{B}_q\}$ forms a multi-type basis, constructed from the quantum logic operation G and elements of a complimentary set of mitigation operations $\check{\mathcal{S}}$.

Clause 44: As recited in any one of the clauses 42 to 43, wherein the set of basis operations $\{B_p\}$ comprises basis operations selected from at least two basis operation types from a plurality of basis operation types $GS_i$, $S_jG$, $S_kGS_l$, $S_m$, said $S_i, \ldots, S_m$ included in the set of mitigation operation $\mathcal{S}$.

Clause 45: As recited in any one of the clauses 42 to 44, wherein the set of complimentary basis operations $\{\check{B}_q\}$ comprises basis operations selected from at least two basis operation types from a plurality of basis operation types $GS_i$, $S_jG$, $S_kGS_l$, $S_m$, said $S_i, \ldots, S_m$ included in the complimentary set of mitigation operations $\check{\mathcal{S}}$.

Clause 46: As recited in any one of the clauses 41 to 45, wherein the set of basis operations $\{B_p\}$ further comprises subcircuits $B_p$, or said set of complementary basis operations $\{\check{B}_q\}$ comprises subcircuits $\check{B}_q$, said subcircuits $B_p$, $\check{B}_q$ comprising two or more occurrences of the quantum logic operation G, or comprising two or more mitigation operations chosen from the set of mitigation operations $\mathcal{S}$ and from the complementary set of mitigation operations $\check{\mathcal{S}}$, respectively.

Clause 47: A computer implemented method for mitigating errors in a quantum circuit comprising at least one occurrence of a quantum logic operation G of a quantum processor, the method comprising implementing a quasi-probability decomposition using basis operations comprising the quantum logic operation G and basis operations selected from a multi-type basis $\mathcal{B}$.

Clause 48: As recited in clause 47, wherein said multi-type basis $\mathcal{B}$ comprises any of:

- at least two types from the types $GS_i$, $S_jG$, $S_k GS_l$, $S_m$, said $S_i, \ldots, S_m$ being elements of a set of mitigation operations $\mathcal{S}$;
- subcircuits comprising two or more occurrences of the quantum logic operation G, or comprising two or more mitigation operations chosen from the set of mitigation operations $\mathcal{S}$.

Clause 49: As recited in any one of the clauses 47 to 48, wherein the quantum logic operation G is a sub-circuit given by a sequence of sub-operations $G = \Xi_K \ldots \Xi_1$, and wherein at least one element of said multi-type basis $\mathcal{B}$ comprises one or more sub-operations $\Xi_1, \ldots, \Xi_K$ included in said sequence of sub-operations.

Clause 50: A computer implemented method for mitigating errors in a quantum circuit comprising at least one occurrence of a quantum logic operation G of a quantum processor, the method comprising:

- computing a set of coefficients $\{c_p\}$ associated with a set of basis operations $\{B_p\}$ to obtain a quasi-probability decomposition $G_0 \approx \Sigma_p c_p B_p$ of a target version $G_0$ of the quantum logic operation G on the set of basis operations $\{B_p\}$, wherein:
  - i) the quantum logic operation G is given by a sequence of sub-operations $G = \Xi_K \ldots \Xi_1$, where $K \geq 1$;
  - ii) the set of basis operations $\{B_p\}$ comprises the quantum logic operation G and basis operations selected from any of:
    - at least two basis operation types from a plurality of basis operation types $GS_i$, $S_jG$, $S_kGS_l$, $S_m$, said $S_i, \ldots, S_m$ being included in a set of mitigation operations $\mathcal{S}$;
    - subcircuits comprising two or more occurrences of the quantum logic operation G, or comprising two or more mitigation operations chosen from the set of mitigation operations $\mathcal{S}$;
    - one or more sub-operations $\Xi_1, \ldots, \Xi_K$ included in said sequence of sub-operations;
  - iii) said decomposition is computed so as to reach a decomposition target based on at least one of a decomposition accuracy target and a decomposition sampling overhead target; and implementing said quasi-probability decomposition on the quantum processor to estimate an outcome of a target quantum circuit in which the target version $G_0$ of the quantum operation G replaces the at least one occurrence of the quantum operation G.

Clause 51: A computer implemented method for mitigating errors in a quantum circuit comprising at least one occurrence of a quantum logic operation G of a quantum processor, the method comprising:

computing a set of coefficients $\{c_p\}$ associated with a set of basis operations $\{B_p\}$ to obtain a quasi-probability decomposition $G_0 \approx \Sigma_p c_p B_p$ of a target version $G_0$ of the quantum logic operation G on the set of basis operations $\{B_p\}$ including ideally-non-unitary basis operations and ideally-unitary basis operations, wherein:

i) said decomposition is computed so as to reach a decomposition target based on a use target of ideally-non-unitary basis operations, and at least one of a decomposition accuracy target, a decomposition sampling overhead target, and a use target of ideally-unitary basis operations;

ii) the quantum logic operation G is given by a sequence of sub-operations $G=\Xi_K \ldots \Xi_1$, where $K \geq 1$;

iii) the set of basis operations $\{B_p\}$ comprises the quantum logic operation G and basis operations selected from any of:

at least two basis operation types from a plurality of basis operation types $GS_i$, $S_jG$, $S_kGS_l$, $S_m$, said $S_i, \ldots, S_m$ being included in a set of mitigation operations $\mathcal{S}$;

subcircuits comprising two or more occurrences of the quantum logic operation G, or comprising two or more mitigation operations chosen from the set $\mathcal{S}$;

one or more sub-operations $\Xi_1, \ldots, \Xi_K$ included in said sequence of sub-operations;

computing a set of complementary coefficients $\{\check{c}_q\}$ associated with a set of complementary basis operations $\{\check{B}_q\}$ to obtain a quasi-probability decomposition for the residual error $G_0-\Sigma_p c_p B_p \approx \Sigma_q \check{c}_q \check{B}_q$, wherein the set of complementary basis operations $\{\check{B}_q\}$ include ideally-non-unitary operations, and wherein the set of complimentary basis operations $\{\check{B}_q\}$ comprises the quantum logic operation G and basis operations selected from any of:

i) at least two basis operation types from a plurality of basis operation types $GS_i$, $S_jG$, $S_kGS_l$, $S_m$, said $S_i, \ldots, S_m$ being included in a set of complementary mitigation operations $\check{\mathcal{S}}$;

ii) subcircuits comprising two or more occurrences of the quantum logic operation G, or comprising two or more mitigation operations chosen from the complementary set of mitigation operations $\check{\mathcal{S}}$;

iii) one or more sub-operations $\Xi_1, \ldots, \Xi_K$ included in said sequence of sub-operations;

implementing said quasi-probability decomposition on the quantum processor to estimate an outcome of a target quantum circuit in which the target version $G_0$ of the quantum operation G replaces the at least one occurrence of the quantum operation G.

implementing said quasi-probability decomposition for the residual error on the quantum processor, thereby refining said estimate of the outcome of an ideal quantum circuit.

Clause 52: A non-transient computer readable storage medium storing computer instructions, wherein the computer instructions are used for causing a computer to execute a method as recited in any one of the clauses 1 to 51.

Clause 53: A computer program product, comprising a computer program, wherein the computer program, when executed by a computer, implements a method as recited in any one of the clauses 1 to 51.

Clause 54: A computer system comprising a quantum processor and a classical processor, the classical processor being configured to execute the computer executable components stored in memory, wherein the computer executable components comprise:

a decomposition component that computes a set of coefficients $\{c_p\}$ associated with a set of basis operations $\{B_p\}$ to obtain a quasi-probability decomposition $G_0 \approx \Sigma_p c_p B_p$ of a target version $G_0$ of the quantum logic operation G on the set of basis operations $\{B_p\}$, wherein:

i) the set of basis operations $\{B_p\}$ forms a multi-type basis, constructed from the quantum logic operation G and elements of a set of mitigation operations $\mathcal{S}$;

ii) said decomposition is computed so as to reach a decomposition target based on at least one of a decomposition accuracy target and a decomposition sampling overhead target;

an implementation component that implements said quasi-probability decomposition on the quantum processor to estimate an outcome of a target quantum circuit in which the target version $G_0$ of the quantum operation G replaces the at least one occurrence of the quantum operation G.

The invention claimed is:

1. A computer implemented method for mitigating errors in a quantum circuit comprising at least one occurrence of a quantum logic operation G of a quantum processor, the computer implemented method comprising:

computing a set of coefficients $\{c_p\}$ associated with a set of basis operations $\{B_p\}$ to obtain a quasi-probability decomposition $G_0 \approx \Sigma_p c_p B_p$ of a target version $G_0$ of the quantum logic operation G on the set of basis operations $\{B_p\}$, wherein:

i) the set of basis operations $\{B_p\}$ forms a multi-type basis, constructed from the quantum logic operation G and elements of a set of mitigation operations $\mathcal{S}$, wherein said set of basis operations $\{B_p\}$ comprises at least two basis operation types selected from a plurality of basis operation types $GS_i$, $S_iG$, $S_kG_{SV}S_m$, said $S_i, \ldots, S_m$ being elements of the set of mitigation operations $\mathcal{S}$, wherein mid-circuit measurements operations are excluded from said set of mitigation operations $\mathcal{S}$;

ii) said decomposition is computed so as to reach a decomposition target based on at least one of a decomposition accuracy target and a decomposition sampling overhead target;

implementing said quasi-probability decomposition on the quantum processor to estimate an outcome of a target quantum circuit in which the target version $G_0$ of the quantum operation G replaces the at least one occurrence of the quantum operation G.

2. The computer implemented method according to claim 1, wherein implementing said quasi-probability decomposition on the quantum processor comprises:

i) for each of said at least one occurrence of the quantum operation G in the quantum circuit, sampling the set of basis operations $\{B_p\}$ based on said set of coefficients $\{c_p\}$ to obtain at least one corresponding set of sampled operations; wherein the sampling is according to a probabilistic distribution defined by weights $$w_p = \frac{|c_p|}{W},$$

wherein $W=\Sigma_p|c_p|$ ii) running a set of sampled quantum circuits on the quantum processor wherein said set of sampled quantum circuits is determined by replacing the at least one occurrence of G in the quantum circuit by one sampled operation of said corresponding set of sampled operations so as to obtain sampled quantum circuit outcomes; wherein said replacing at least one occurrence of G in the quantum circuit is performed by replacing each occurrence of G by a sample from said corresponding set of basis operations;

iii) estimating the outcome of the target quantum circuit based on the sampled quantum circuit outcomes.

3. The computer implemented method according to claim 1, further comprising computing the decomposition sampling overhead, wherein computing the sampling overhead includes computing the quasi-probability norm $W=\Sigma_p|c_p|$.

4. The computer implemented method according to claim 1, wherein said target version $G_0$ is an ideal implementation of said quantum logic operation G.

5. The computer implemented method according to claim 1, wherein said target version $G_0$ is a noise-amplified implementation of said quantum logic operation G.

6. The computer implemented method according to claim 1, wherein ideally-non-unitary quantum logic operations are excluded from said set of mitigation operations $\mathcal{S}$.

7. The computer implemented method according to claim 1, wherein said $S_i, \ldots, S_m$ are respectively elements of the sets $\mathcal{S}_1, \ldots, \mathcal{S}_5$ and at least one, and preferably each, of the sets $\mathcal{S}_1, \ldots, \mathcal{S}_5$ includes at least about $10^n$ linearly independent operations, wherein n is the number of qubits on which G is applied.

8. The method according to claim 1, wherein the set of mitigation operations $\mathcal{S}$ includes linearly dependent operations.

9. The computer implemented method according to claim 1, wherein at least some of the operations in the set of mitigation operations $\mathcal{S}$ ideally operate non-trivially on up to a predefined number of qubits r; wherein each of the mitigation operations included in the set of mitigation operations $\mathcal{S}$ ideally operates non-trivially on up to said predefined number of qubits r and at least one, and preferably each, of the sets $\mathcal{S}_1, \ldots, \mathcal{S}_5$ includes at least about $$\binom{n}{r}10^r$$

linearly independent operations.

10. The computer implemented method according to claim 1, wherein said target version $G_0$ of said quantum logic operation G is a layer of gates acting on non-overlapping sets of qubits.

11. The computer implemented method according to claim 1, wherein the quantum logic operation G is twirled.

12. The computer implemented method according to claim 11, wherein said target version $G_0$ of said quantum logic operation G comprises non-Clifford gates, and wherein said non-Clifford gates are twirled using gates that commute with $G_0$.

13. The computer implemented method according to claim 1, wherein said set of basis operations $\{B_p\}$ further comprises subcircuits $B_p$ comprising two or more occurrences of the quantum logic operation G, or comprising two or more mitigation operations chosen from the set of mitigation operations $\mathcal{S}$; wherein said subcircuits are of depth lower than a predefined threshold so as to be shallow.

14. The computer implemented method according to claim 1, wherein:

the quantum logic operation G is a sub-circuit given by a sequence of sub-operations $$G = \Xi_K \ldots \Xi_1;$$

said subcircuits $B_p$ comprise of zero or more sub-operations $\Xi_1, \ldots, \Xi_K$ included in said sequence of sub-operations and zero or more operations included in the set of mitigation operations $\mathcal{S}$.

15. The computer implemented method according to claim 1, comprising optimizing a tradeoff between a decomposition accuracy and a decomposition sampling overhead, wherein said optimizing a tradeoff comprises optimizing the decomposition accuracy by solving a least-squares problem, and minimizing the sampling overhead by solving a linear program.

16. The computer implemented method according to claim 1, wherein said decomposition accuracy target comprises a decomposition accuracy staying below a predefined accuracy threshold, and wherein said decomposition sampling overhead target comprises a decomposition sampling overhead staying below a predefined sampling overhead threshold $\eta$.

17. The computer implemented method according to claim 2, wherein said estimating the outcome of said target quantum circuit comprises computing, for each sampled quantum circuit of the set of sampled quantum circuits, a corresponding sampled circuit sign equal to a sign of a product of the at least one coefficient corresponding to at least one sampled operation which replaces the at least one occurrence of G in said sampled quantum circuit; and wherein said estimating the outcome of the target quantum circuit comprises computing an average of the sampled quantum circuit outcomes, said sampled quantum circuit outcomes being weighted by said corresponding sampled circuit sign and by a quasi-probability norm W.

18. A non-transient computer readable storage medium storing computer instructions, wherein the computer instructions are used for causing a computer to execute the computer implemented method according to claim 1.

19. A computer system comprising a quantum processor and a classical processor, the classical processor being configured to execute the computer executable components stored in memory, wherein the computer executable components comprise:

a decomposition component that computes a set of coefficients $\{c_p\}$ associated with a set of basis operations $\{B_p\}$ to obtain a quasi-probability decomposition $G_0 \approx \Sigma_p c_p B_p$ of a target version $G_0$ of the quantum logic operation G on the set of basis operations $\{B_p\}$, wherein:

i) the set of basis operations $\{B_p\}$ forms a multi-type basis comprising at least two basis operation types selected from a plurality of basis operation types $GS_i$, $S_iG$, $S_kGS_v$, $S_m$, said $S_v, \ldots, S_m$ being elements of a set of mitigation operations $\mathcal{S}$, wherein mid-circuit measurements operations are excluded from said set of mitigation operations $\mathcal{S}$;

ii) said decomposition is computed so as to reach a decomposition target based on at least one of a decomposition accuracy target and a decomposition sampling overhead target;

an implementation component that implements said quasi-probability decomposition on the quantum processor to estimate an outcome of a target quantum circuit in which the target version $G_0$ of the quantum operation G replaces the at least one occurrence of the quantum operation G.

* * * * *